United States Patent
Hinkle

(10) Patent No.: US 6,904,411 B2
(45) Date of Patent: Jun. 7, 2005

(54) MULTI-PROCESSING FINANCIAL TRANSACTION PROCESSING SYSTEM

(75) Inventor: William H. Hinkle, Denver, CO (US)

(73) Assignee: N_gine, LLC, Denver, CO (US)

( * ) Notice: Subject to any disclaimer, the term of this patent is extended or adjusted under 35 U.S.C. 154(b) by 115 days.

(21) Appl. No.: 10/085,596

(22) Filed: Feb. 26, 2002

(65) Prior Publication Data

US 2002/0138376 A1 Sep. 26, 2002

Related U.S. Application Data

(63) Continuation of application No. 09/181,698, filed on Oct. 28, 1998.
(60) Provisional application No. 60/063,714, filed on Oct. 29, 1997.

(51) Int. Cl.[7] .............................................. G06F 17/60
(52) U.S. Cl. ........................... 705/35; 705/30; 705/500; 705/1
(58) Field of Search .............................. 705/35, 1, 500, 705/30

(56) References Cited

U.S. PATENT DOCUMENTS

| | | | |
|---|---|---|---|
| 3,697,693 A | 10/1972 | Deschenes et al. ............. | 179/2 |
| 4,001,568 A | 1/1977 | Iizuka et al. ................. | 235/156 |
| 4,025,905 A | 5/1977 | Gorgens ................... | 340/172.5 |
| 4,321,672 A | 3/1982 | Braun et al. ................. | 364/408 |
| 4,412,287 A | 10/1983 | Braddock, III .............. | 364/408 |

(Continued)

FOREIGN PATENT DOCUMENTS

| | | | | |
|---|---|---|---|---|
| EP | 0 613 083 A2 | * | 8/1994 | ............. G06F/9/44 |
| EP | 0 735 482 A1 | * | 10/1996 | ............ G06F/12/08 |
| EP | 0 735 483 A1 | * | 10/1996 | ......... G06F/12/088 |
| EP | 0 735 484 A1 | * | 10/1996 | ............ G06F/12/08 |
| EP | 0 595 925 B1 | * | 9/1997 | ............ G06F/11/14 |
| EP | WO 99/22329 | * | 5/1999 | ............ G06F/17/60 |

OTHER PUBLICATIONS

Ferguson, eWeek, "Ellisons's "War" Perplexes Some", Aug. 6, 2000.
Edwards, Electronic Engineering Times, "Architects Wrestle with Multiprocessor Options", Aug. 6, 2001, pp. 48.

*Primary Examiner*—Tariq R. Hafiz
*Assistant Examiner*—Akiba Robinson-Boyce
(74) *Attorney, Agent, or Firm*—Merchant & Gould P.C.

(57) ABSTRACT

A financial transaction processing system is disclosed, wherein substantial processing efficiencies are provided with, additionally, a substantial decrease in the size of the executable code. Each transaction processed by the transaction processing system is described by a transaction data descriptor that includes a series of subtransaction data descriptions of actions that can be performed independently of one another. Thus, complex transaction processing logic is substantially removed from the executable code, and instead such transaction data descriptors are processed interpretatively. Moreover, the independence of the subtransactions allows the subtransactions of a transaction to be processed in parallel when performed on a multiprocessor computer. Additionally, the transaction processing system provides account balancing enhancements in that there are control columns in various data tables that are automatically updated during transaction processing so that by comparing control column totals, an indication of the integrity of current financial records is provided. Additionally, the transaction processing system provides full auditability in that any changes to financial data can be traced for any effective period of time into the past so that auditors can periodically perform a full audit of the financial transaction data retained by the transaction processing system.

13 Claims, 29 Drawing Sheets

U.S. PATENT DOCUMENTS

| | | | |
|---|---|---|---|
| 4,621,326 A | 11/1986 | Rawlins | 364/408 |
| 4,625,276 A | 11/1986 | Benton et al. | 364/408 |
| 4,713,761 A | 12/1987 | Sharp et al. | 364/406 |
| 4,727,243 A | 2/1988 | Savar | 235/379 |
| 4,774,664 A | 9/1988 | Campbell et al. | 705/38 |
| 4,948,174 A | 8/1990 | Thomson et al. | 283/58 |
| 4,994,964 A | 2/1991 | Wolfberg et al. | 364/408 |
| 5,025,373 A | 6/1991 | Keyser, Jr. et al. | 364/408 |
| 5,057,677 A | 10/1991 | Bertagna et al. | 235/381 |
| 5,093,787 A | 3/1992 | Simmons | 364/406 |
| 5,117,356 A | 5/1992 | Marks | 364/406 |
| 5,121,945 A | 6/1992 | Thomson et al. | 283/58 |
| 5,170,480 A | 12/1992 | Mohan et al. | 395/600 |
| 5,222,018 A | 6/1993 | Sharpe et al. | 364/406 |
| 5,262,942 A | 11/1993 | Earle | 364/408 |
| 5,287,501 A * | 2/1994 | Lomet | 707/202 |
| 5,390,113 A | 2/1995 | Sampson | 364/419.19 |
| 5,418,713 A | 5/1995 | Allen | 364/403 |
| 5,420,405 A | 5/1995 | Chasek | 235/379 |
| 5,438,509 A | 8/1995 | Heffron | 364/408 |
| 5,438,517 A | 8/1995 | Sennott et al. | 364/449 |
| 5,444,616 A | 8/1995 | Nair et al. | 364/405 |
| 5,448,471 A | 9/1995 | Deaton et al. | 364/401 |
| 5,448,729 A | 9/1995 | Murdock | 395/600 |
| 5,452,445 A | 9/1995 | Hallmark et al. | 395/600 |
| 5,455,407 A | 10/1995 | Rosen | 235/380 |
| 5,457,305 A | 10/1995 | Akel et al. | 235/379 |
| 5,465,328 A | 11/1995 | Dievendorff et al. | 395/182.13 |
| 5,496,991 A | 3/1996 | Delfer, III et al. | 235/379 |
| 5,500,513 A | 3/1996 | Langhans et al. | 235/380 |
| 5,517,406 A | 5/1996 | Harris et al. | 364/408 |
| 5,517,644 A | 5/1996 | Murdock | 395/650 |
| 5,555,503 A | 9/1996 | Kyrtsos et al. | 364/449 |
| 5,557,742 A | 9/1996 | Smaha et al. | 395/186 |
| 5,576,945 A | 11/1996 | McCline et al. | 364/131 |
| 5,581,749 A | 12/1996 | Hossain et al. | 395/600 |
| 5,612,883 A | 3/1997 | Shaffer et al. | 364/460 |
| 5,621,812 A | 4/1997 | Deaton et al. | 382/100 |
| 5,629,855 A | 5/1997 | Kyrtsos et al. | 364/460 |
| 5,630,072 A | 5/1997 | Dobbins | 399/222 |
| 5,630,073 A | 5/1997 | Nolan | 395/245 |
| 5,634,012 A | 5/1997 | Stefik et al. | 395/239 |
| 5,636,277 A | 6/1997 | Nagahama | 380/4 |
| 5,640,323 A | 6/1997 | Kleimenhagen et al. | 364/423.98 |
| 5,652,570 A | 7/1997 | Lepkofker | 340/573 |
| 5,657,226 A | 8/1997 | Shin et al. | 364/424 |
| 5,657,487 A | 8/1997 | Doner | 455/456 |
| 5,668,897 A * | 9/1997 | Stolfo | 382/283 |
| 5,774,879 A | 6/1998 | Custy et al. | 705/35 |
| 5,862,325 A | 1/1999 | Reed et al. | 709/201 |
| 5,864,685 A | 1/1999 | Hagan | 705/35 |
| 5,875,437 A * | 2/1999 | Atkins | 705/40 |
| 5,937,395 A | 8/1999 | Iwamura | 705/30 |

* cited by examiner

FIG. 4B

OBTAIN THE LIST (IF ANY) OF DESCRIPTIONS OF LICENSEE SERVICE RESELLERS, WHEREIN THE SERVICE RESELLERS PROVIDE _____ .

INSERT THIS INFORMATION INTO THE LICENSEE SERVICE RESELLERS MASTER TABLE.

↓

OBTAIN IDENTIFIERS INDICATING OBJECTIVES FOR THE ACCOUNTS HELD BY THE LICENSEE AND INSERT THESE IDENTIFIERS INTO AN ACCOUNT OBJECTIVES MASTER TABLE INDEXED BY LICENSEE.

↓

OBTAIN THE LIST (IF ANY) OF DESCRIPTIONS OF LEGAL CAPACITIES THAT THE LICENSEE SERVES FOR ITS ACCOUNTS, AND INSERT THIS INFORMATION INTO THE ACCOUNT LEGAL CAPACITY MASTER TABLE.

↓

OBTAIN IDENTIFIERS INDICATING LEGAL JURISDICTIONS OF ACCOUNTS HELD BY LICENSEE, AND INSERT THESE IDENTIFIERS INTO A LEGAL JURISDICTION MASTER TABLE INDEXED BY LICENSEE.

↓

OBTAIN IDENTIFIERS FOR ACCOUNT REPRESENTATIVES FOR ACCOUNTS HELD BY LICENSEE, AND INSERT THESE IDENTIFIERS INTO AN ACCOUNT REPRESENTATIVE MASTER TABLE INDEXED BY LICENSEE.

↓

OBTAIN THE LIST OF DESCRIPTIONS OF NAMES (IF ANY) THAT THE LICENSEE USES TO INTERNALLY GROUP INVESTMENTS. INSERT THIS INFORMATION INTO THE ACCOUNT REGISTRATION MASTER TABLE.

↓

FOR EACH ACCOUNT OF LICENSEE, GENERATE A ROW OF THE ACCOUNT MASTER TABLE 84 BY OBTAINING THE INFORMATION NECESSARY TO PROCESS TRANSACTIONS ON THE ACCOUNT.

↓

OBTAIN THE LIST OF _____ .

INSERT THIS INFORMATION INTO THE ACCOUNT COMMUNICATION LINKS MASTER TABLE.

↓

FOR EACH TRANSACTION TYPE DESIRED TO BE PERFORMED BY LICENSEE, OBTAIN: (A) AN IDENTIFIER IDENTIFYING THE TRANSACTION; (B) A DESCRIPTION OF THE TRANSACTION; (C) A POSTING CODE; (D) A VALUE INDICATIVE OF WHETHER THE TRANSACTION REQUIRES A PROCESSING OF A FINANCIAL INSTRUMENT; (E) A BOOLEAN VALUE INDICATING WHETHER A SETTLEMENT OF A BUY OR SELL WILL BE PENDING. INSERT THIS INFORMATION INTO THE TRANSACTION MASTER TABLE. FOR EACH TRANSACTION TYPE IDENTIFIED ABOVE, DETERMINE A TRANSACTION DECOMPOSITION INTO SUBTRACTIONS AND ENCODE THE SUBTRACTION ACTIONS TO BE PERFORMED. INSERT THE (TRANSACTION IDENTIFIER, SUBTRANSACTION ENCODING) PAIR INTO THE TRANSACTION PROCESSING MASTER TABLE.

OBTAIN THE LIST OF _____
_____
_____.

INSERT THIS INFORMATION INTO THE RECURRING TRANSACTIONS MASTER TABLE.

USING INFORMATION ON EACH ENTITY TO BE FINANCIALLY TRACKED, GENERATE AN ENTITY ATTRIBUTE SCHEMA FOR LICENSEE; INSERT THIS INFORMATION INTO THE ENTITY ATTRIBUTE MASTER TABLE 92.

DETERMINE THE LICENSEE'S TRANSACTIONS THAT ARE APPLICABLE TO EACH FINANCIAL ENTITY OF LICENSEE, AND INSERT THE INFORMATION INTO THE ENTITY TRANSACTION MASTER TABLE.

USING (A) THE ACCOUNT TYPE IDENTIFIERS FROM THE LICENSEE GENERAL LEDGER DEFINITIONS MASTER TABLE; AND (B) THE ACCOUNT SUBTYPES (ACNs) FROM THE LICENSEE ACCOUNT SUBTYPE DEFAULT DEFINITION MASTER TABLE, OBTAIN THE LICENSEE'S GENERAL LEDGER SCHEMA FOR ASSOCIATING ACCOUNT TYPES WITH ACCOUNT SUBTYPES (ACNs) FOR BOTH ASSETS AND LIABILITIES OF THE LICENSEE. INSERT THIS INFORMATION INTO THE SYSTEM GENERAL LEDGER TABLE.

GENERATE THE TRANSACTION JOURNAL USING _____
_____
_____.

GENERATE THE SYSTEM TRADE SETTLEMENT FROM _____
_____
_____.

GENERATE THE SYSTEM SUMMARY TABLE FROM _____
_____
_____.

GENERATE THE SYSTEM REJECT TABLE FROM _____
_____
_____.

GENERATE THE SYSTEM TRANSACTION COUNT TABLE FROM _____
_____
_____.

*FIG. 4D*

GENERATE THE CUSTOMER INCOME STATEMENT (INCOME/EXPENSE) TABLE FROM _____

GENERATE THE CUSTOMER CASH FLOW (RECEIPTS/DISBURSEMENTS) TABLE FROM _____

GENERATE THE CUSTOMER BALANCE SHEET TABLE FROM _____

GENERATE THE CUSTOMER CAPITAL GAIN TABLE FROM _____

GENERATE THE CUSTOMER PENDING INCOME TABLE FROM _____

GENERATE THE CUSTOMER CAPITAL ADJUSTMENTS TABLE FROM _____

GENERATE THE PERFORMANCE MEASUREMENTS TABLE FROM _____

( END )

ACCESS ENTITY ATTRIBUTE TABLE

USING "LICENSEE," AND THE ENTITY NUMBER (DENOTED "ENT.ID" HEREINAFTER) IN "TRANSACTION," RETRIEVE, INTO WORKING STORAGE, THE FOLLOWING CORRESPONDING VALUES FROM A ROW OF THE ENTITY ATTRIBUTE MASTER TABLE 92: ACN (ASSET); ACN (LIABILITY); DIVERSIFICATION: TYPE, GROUP, CLASS; PERFORMANCE MEASURE: TYPE, GROUP, CLASS; INVESTED INCOME; INVESTED PRINCIPAL; TOTAL UNITS. ADDITIONALLY, GET THE INDEX OF THIS ROW (DENOTED "EA_ENT_ROW_ID" HEREINAFTER) INTO WORKING STORAGE.

ACCESS THE ENTITY TRANSACTION TABLE

USING "LICENSEE" AND "ENT_ID" AND "TRANS_CODE," VERIFY THE EXISTENCE OF A CORRESPONDING ROW IN THE ENTITY TRANSACTION MASTER TABLE OF A TRANSACTION TO BE PERFORMED.

ACCESS THE ENTITY MASTER TABLE

USING "ENT_ID," RETRIEVE, INTO WORKING STORAGE, THE FOLLOWING CORRESPONDING VALUES FROM A ROW OF THE ENTITY MASTER TABLE: INCOME RATE, INCOME EX-DIVIDEND RATE, INCOME RECORD DATE, INCOME PAYMENT DATE, CAPITAL ADJUSTMENT RATE, CAPITAL ADJUSTMENT EX-ADJUSTMENT DATE, CAPITAL ADJUSTMENT RECORD DATE, CAPITAL ADJUSTMENT PAYMENT DATE.

TEST OTHER ASSETS

USING "LICENSEE," AND "ACCT_TYPE," AND ACN (ASSET) IN WORKING STORAGE, ASSIGN TO "GL_ROWID [ENT_ACN_ASSET]" THE INDEX (POINTER) OF THE CORRESPONDING ROW IN THE GENERAL LEDGER TABLE 88.

TEST OTHER LIABILITIES

USING "LICENSEE," AND "ACCT_TYPE," AND ACN (LIABILITY) IN WORKING STORAGE, ASSIGN TO "GL_ROWID [ENT_ACN_LIAB]" THE INDEX (POINTER) OF THE CORRESPONDING ROW IN THE GENERAL LEDGER TABLE 88.

TEST OTHER INVESTED INCOME

USING "LICENSEE," AND ACCT_TYPE" AND, THE ACCT_SUBTYPE (ACN) FOR LIABILITY INVESTED INCOME (II) IN THE TEMPORARY SUBTYPE TABLE, ASSIGN TO "GL_ROWID [II]" THE INDEX (POINTER) OF THE CORRESPONDING ROW IN THE GENERAL LEDGER TABLE 88.

TEST OTHER INVESTED PRINCIPAL

USING "LICENSEE," AND "ACCT_TYPE" AND, THE ACCT_SUBTYPE (ACN) FOR LIABILITY INVESTED PRINCIPAL (IP) IN THE TEMPORARY SUBTYPE TABLE, ASSIGN TO "GL_ROWID [IP]" THE INDEX (POINTER) OF THE CORRESPONDING ROW IN THE GENERAL LEDGER TABLE.

( END )

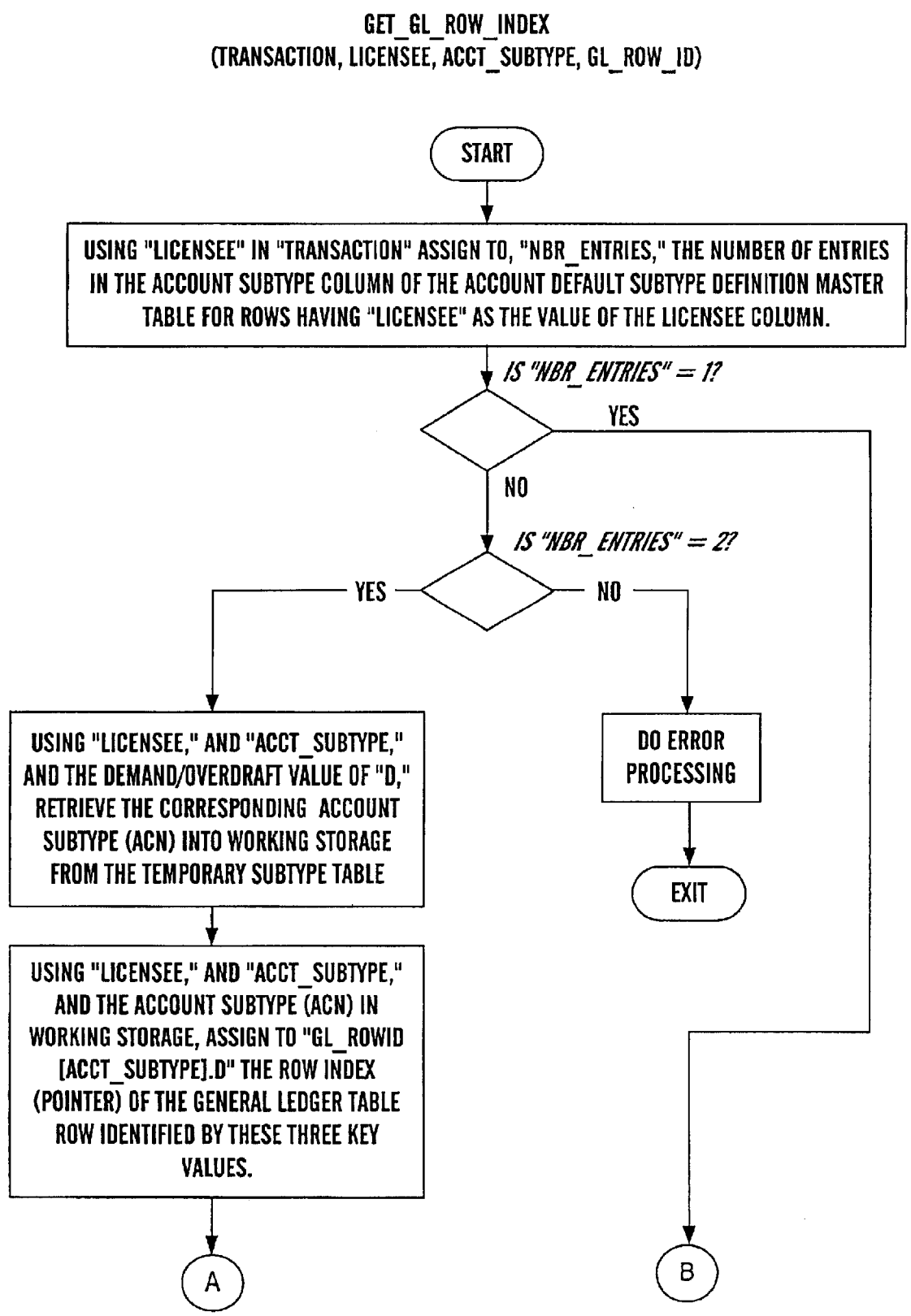

MULTI-PROCESSING FINANCIAL TRANSACTION PROCESSING SYSTEM

RELATED APPLICATION

This is a Continuation application of pending prior application No. 09/181,698 filed Oct. 28, 1998, which also claims priority from U.S. provisional patent application No. 60/063,714, filed Oct. 29, 1997, both of which are hereby incorporated by this reference.

FIELD OF THE INVENTION

The present invention relates to a financial transaction processing system, and in particular, to such a system that is capable of decomposing transactions into subtransactions and multi-processing subtransactions simultaneously.

BACKGROUND OF THE INVENTION

Computerized data processing systems for processing financial transactions have become increasingly more complex as further strides toward automation have occurred. Such complexity has generated a number of related difficulties for the financial data processing industry. In particular, complex financial transaction processing systems may have subtle programming defects or errors that may go unnoticed for long periods of time before the extent of the problems thereby generated are fully recognized. For example, the number of positions allotted for the dating of transactions has recently been problematic, wherein the dates for the millennium starting at the year 2000 can be problematic for many financial transaction processing systems.

In addition, such complex financial transaction processing systems also are typically incapable of being fully audited. That is, it is common practice in the financial data processing industry to provide only partial auditability in that it is generally believed that the amount of data required to be stored for full auditability is so large as to not be cost effective.

Further, in many circumstances, the rate of transaction increase is becoming problematic in that progressively larger computers are required for processing financial transactions at an acceptable rate. This problem is exacerbated by the fact that such transaction processing systems are not architected for use on multi-processing machines having a plurality of processors. Thus, the advantages of parallel-processing computers cannot be fully utilized by such systems.

Accordingly, it would be advantageous to have a financial transaction processing system that alleviates the above difficulties, and that additionally, provides flexibility to adapt to the changing business needs of business enterprises so that the transactions processed and the respective reports generated may be modified easily according to business constraints and demands.

SUMMARY OF THE INVENTION

The present invention is a financial transaction processing system that achieves substantial increases in auditability and processing efficiency. In particular, the present invention provides auditable trails or history in a number of different ways. For example, financial data within transactions is used in the present invention to update various control fields in different tables or files so that cross-checks of system financial integrity can be performed for assuring that, for example, cash fields, total units fields, and cost fields balance appropriately across system data tables provided by the present invention. Additionally, the present invention provides a full range of auditable history files for each system data table having information that is required during auditing.

The present invention also performs financial transaction processing using a novel computational paradigm. That is, the financial transaction processing system of the present invention has an architecture wherein financial transactions can be decomposed into corresponding collections of independent subtransactions, such that for each input transaction, the corresponding collection of subtransactions are performed by operations that are independent of one another. Thus, the subtransactions can be performed in any order, including in an overlapping fashion, such as may occur during multiprocessing of these subtransactions on a computer having multiple processors.

Further, note that each of the subtransactions is described by a relatively short (e.g., less than 8 characters) text string that can be straightforwardly interpreted as an operation (e.g., either plus or minus) together with a series of operands, in particular, a first operand having a value to be used in modifying a data table field (column) specified by a second operand. Such high level descriptions of subtransactions provide both compact conceptualization and a reduction in the total size of the executable code for the present invention. Accordingly, when one of the subtransactions is performed, not only is its corresponding operation performed on the operands, but additionally, control fields such as those mentioned above are updated appropriately in various data tables for the present invention to enhance auditability of the financial data resulting from the transaction processing. Further, note that since the subtransactions are independent of one another and their executable code is relatively small, there is no need for lengthy and complex flow of control transaction processing modules. That is, the size of the code for the present invention may be up to 100 times smaller than many prior art transaction processing systems. Accordingly, this has a substantial positive impact on the efficiency of the present invention in that the swapping of program elements in and out of primary computer memory is substantially reduced.

In another aspect of the present invention, the financial transactions of a plurality of business enterprises can be processed in an interleaved manner. In particular, since the present invention is substantially data driven, including the descriptions of the transactions and their related subtransactions, the present invention can be easily modified to incorporate both different or updated versions of transactions and associated data tables for an existing business enterprise (e.g., also denoted "licensee" hereinafter). Additionally, the transactions and related data tables for an entirely new or different business enterprise (licensee) may be straightforwardly incorporated into the present invention so that its transactions can be interleaved with the transactions of other business enterprises. Thus, transaction processing may be performed by the present invention for business enterprises having different transactions, different account record structures and differently organized general ledgers substantially without modifying the program elements of the transaction processing system.

For example, the present invention can be used to simultaneously process transactions for:

(1) a single software application such as an investment management or telecommunications billing system, (2) multiple disparate software applications such as investment management, and telecommunications billing, paying agencies, etc., all with disparate definitions.

Accordingly, the present invention may be viewed as a software engine, or a user-definable transaction processing tool that can be adapted to a variety of industry specific software application needs without changing the actual program code. That is, by surrounding the present invention with application specific software for inputting transaction data to the multi-processing financial transaction processor of the present invention and retrieving data from the multi-processing financial transaction processor of the present invention, a particular business enterprise can have substantially all of its financial records in condition for auditing on a daily or weekly basis.

The present invention may be further characterized along the following dimensions: flexibility, auditability, multiprocessing, efficiency and size, these dimensions being discussed, in turn, hereinbelow.

Flexibility is achieved by permitting a business enterprise to define:

(1) a series of "reference" tables (also denoted "master tables") that describe the appropriate management decision-making, accounting structure, and regulatory information for the specific application;

(2) a series of audit controls and system procedures that provide for complete control of all processing and prevent the overwriting of any original data;

(3) a series of institutional and customer reporting files, known as the "driven" tables; and (4) the specific processing content of each individual transaction to be processed via a series of table definitions, known as the "driving" tables.

Thus, transactions may be customized according to the business needs of a business enterprise.

Auditability is achieved by:

(1) providing separate control columns for cash, units and cost basis (if any) in detail records generated and stored for each financial transaction;

(2) repeating these three control columns, or variations thereof, in at least three different tables so that subsequent summations of each of the four tables will result in similar balances and thus prove that no critical data has been lost in the course of processing, as one familiar with auditing and financial transactions systems will understand;

(3) adding appropriate data columns:

(a) to each reference table or master row for maintaining a history of the effects of add, change and delete commands in a current database as well as an archive database;

(b) to each original file record (i.e. table row) that represents an add to a current database as well as the periodic archive and purge to a permanent database;

(c) to tables for retaining transaction processing data representing error identification, error negation and error correction.

Thus, auditabilty of transaction records is achieved by four sets of files for a specific period. These are: (a) a snapshot of all the reference files at the end of the period; (b) snapshots of a history file for each master table, wherein the corresponding history file (table) contains all changes to the master table during the specific period; (c) a snapshot of all financial transactions for the specific period, and (d) a snapshot of all of the "driven" tables at the end of the period.

Multiprocessing is achieved by:

(1) decomposing the processing of the present invention into a series of separate and independent subprocesses that may be simultaneously performed on any number of simultaneous processors, and (2) decomposing input transactions into a series of subtransactions that are processed by independent processes, which may be executed in any particular order, with complete auditability.

For example, multiprocessing can be achieved by allocating the next prescribed subtransaction process to the next available processor.

Efficiency is achieved by:

(1) Defining and utilizing only four standard processing models that perform all prescribed functionality and auditability of the present invention. The models are:

(a) Processing Model 1 provides an architecture for maintaining historical transaction data so that financial changes can be traced through time;

(b) Processing Model 2 provides an architecture for automatically maintaining data columns such as Units, Debits and Credits for cross checking table sums to assure that the financial records for a business enterprise balance;

(c) Processing Model 3 provides an architecture for automatically maintaining financial records relating to financial instruments such as stocks, bonds, real estate, etc.; and (d) Processing Model 4 provides an architecture for producing a common processing format for maintaining customer and institutional data tables.

(2) Defining only four primary program modules for controlling functionality of the present invention, these modules being:

(a) a transaction processing controller module for receiving transactions to be processed, and controlling the processing thereof;

(b) a preprocessor and decomposer module for determining the validity of a received transaction, assuring that all data tables and rows thereof are available for processing the transaction, and retrieving the appropriate subtransactions data descriptions to be processed;

(c) a subtransaction scheduling module for scheduling instantiations of the subtransaction processing module on each of one or more processors; and (d) a subtransaction processing module for performing each subtransaction retrieved by the preprocessor and decomposer module.

(3) Utilizing a number of software switches to control which tables within collection of "driven" tables are to be updated when a specific type of transaction is to be processed.

Thus, by providing a small number of processing models, decomposing input transactions, and supplying only the necessary subtransaction descriptions, the reliability of the transaction processing system of the present invention is substantially increased.

The software for the present invention is small in size (both source code and object code) due to the following:

(1) defining business enterprise financial data processing methods, accounting structures, and regulatory definitions as data rather than program code;

(2) reducing the processing content to a series of individual transactions; and (3) reducing all financial transactions to a collection of subtransactions wherein each subtransaction includes an operator and two or more operands in an 8-character string.

Thus, the financial processing by the present invention may be performed on several transactions at a time, one transaction at a time, or different processors within a multiprocessor context. Or, the subtransactions for a specific transaction may be spread over several simultaneous processors. This means that the business enterprise is afforded a large number of options in tailoring the present invention.

Hence, by defining the accounting structure and processing functionality as data rather than actual program code, the size of the total code required to process a specific industry application may be substantially reduced compared to prior art transaction processing systems. For example, the executable code for the present invention may be less than one megabyte (1 MB). Thus, since the secondary cache attached to each processor in multiprocessing personal computer servers can be one megabyte, substantially the entire executable for the present invention can be provided to each processor. Thus, the positive impact on total system efficiency is believed to be substantial in that secondary cache is typically about four times faster than normal cache, so productivity gains of about three-hundred percent would not be unreasonable. In other words, the executable code for the present invention can reside in the secondary cache of each processor, thereby allowing the off-loading of any processing function to any processor with relative ease. Additionally, given that a typical RAM memory for a personal computing devices is 16 megabytes, it is believed that such a device will have the capability to process the back office financial transactions of a major money center financial institution or communications billing system.

Additional features and benefits of the invention will become evident from the detailed description and the accompanying drawings contained herein.

DETAILED DESCRIPTION OF A PREFERRED EMBODIMENT OF THE INVENTION

Figure 1:
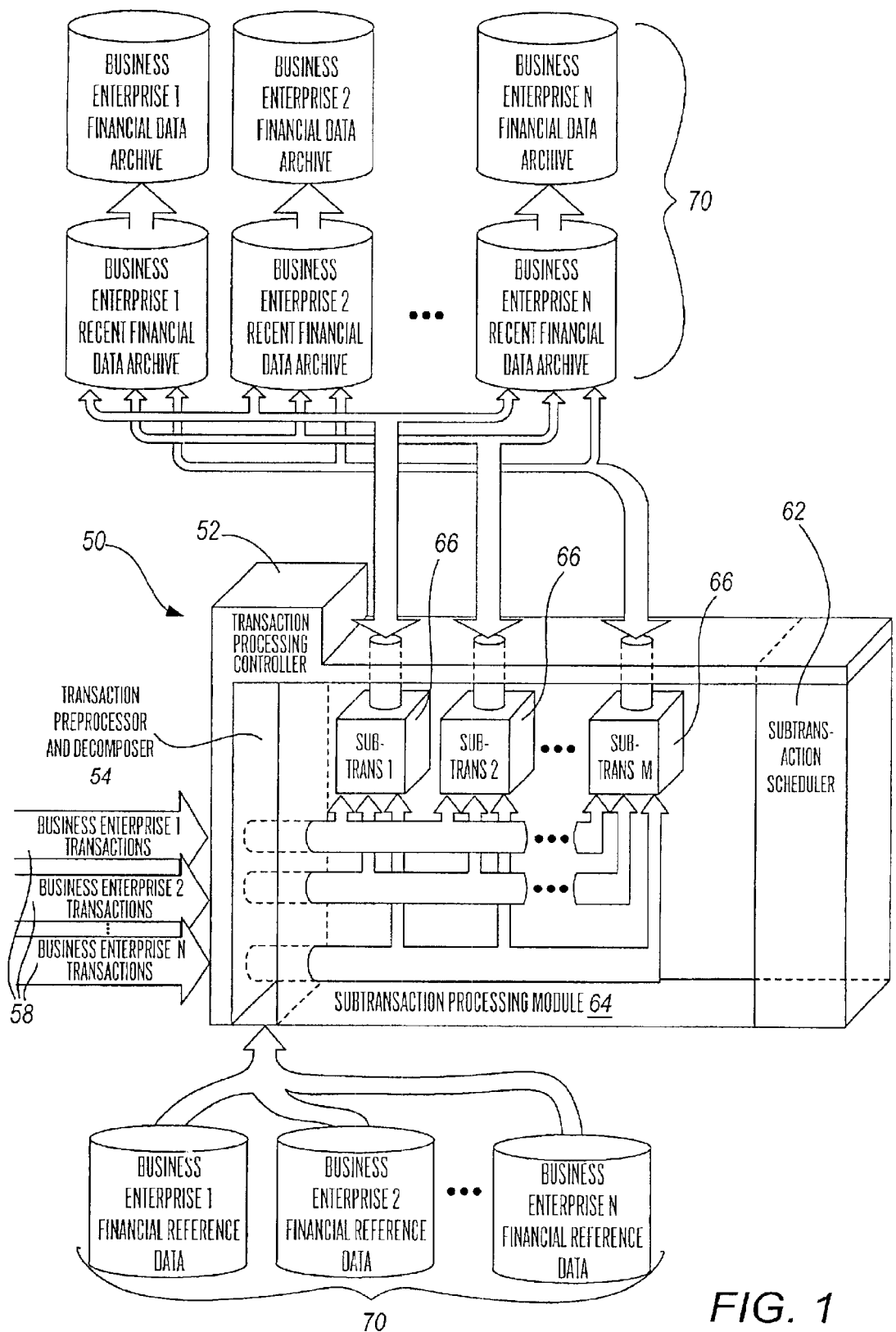
FIG. 1 is a high level block diagram illustrating the present invention conceptually.

FIG. 1 shows a high level conceptual block diagram of a transaction processing system 50 according to the present invention. In particular, the present invention is conceptualized in the present figure as including five functional components, these being:

(a) transaction processing controller 52 for: (i) receiving transactions 58 from business enterprises, (ii) controlling the processing of such transactions, including the scheduling of subtransactions to be performed, and (iii) writing of transaction details to, for example, a transaction journal file or table;

(b) a transaction preprocessor and decomposer 54 for initially receiving a transaction 58 from any one of a plurality of business enterprises as shown, wherein the preprocessor and decomposer 54 decomposes transactions into subtransactions;

(c) a subtransaction processing module 64 for performing the instructions for each subtransaction determined by the transaction preprocessor and decomposer 54. In particular, the subtransaction processing module 64 utilizes a collection of subtransaction programmatic data descriptions 66 that can be independently scheduled and performed for processing each transaction 58 provided to the transaction processing system 50;

(d) a subtransaction scheduler 62 for scheduling the execution of each subtransaction output by the preprocessor and decomposer 54;

(e) a collection of databases 70 containing financial information for each of the one or more business enterprises. Note that the term "database" in the present context includes both the data therein as well as database management functional elements and data structure definitions.

Another illustration of the present invention is provided in FIG. 2. This figure is a block diagram providing both the processing components of FIG. 1, and additionally, greater detail is provided of the tables or files within the databases 70. However, to simplify the discussion hereinafter, the database terminology used will be that of a relational database. Accordingly, files may also be equivalently referred to as tables, records may also equivalently be referred to as rows, and record fields may also be equivalently referred to as columns. Thus, all the data storage symbols having the collective label of 70 are provided within the like numbered databases of FIG. 1. It is worth noting, however, that in one embodiment of the present invention, the data tables for distinct business enterprises may be provided in the same collection of tables such as those represented in FIG. 2. That is, it is an aspect of the present invention that the accounting and transaction processing of the present invention can use the same plurality of financial data tables for business enterprises having substantially different financial transactions and accounting categories. Thus, although FIG. 1 illustrates the databases 70 as being distinct for each business enterprise, many of these databases (if not most) may be combined into a single database having a plurality of data tables such as those labeled collectively "70" in FIG. 2, these tables being discussed in detail hereinafter.

Referring still to FIG. 2, a high level view of the processing performed when processing a transaction 58 is provided. In particular, the transaction processing controller 54 receives an input transaction 58 and invokes the preprocessor and decomposer 54. The preprocessor and decomposer 54 subsequently performs, for each transaction 58, the following functions:

(a) determines, using input from the business enterprise databases 70, whether all necessary data for performing the transaction is available and otherwise rejects the transaction without performing any portion thereof. In particular, the transaction preprocessor and decomposer 54 determines that all data tables to be accessed are available;

(b) retrieves the data needed to perform the transaction;

(c) checks to determine that the transaction operation(s) requested is available, and that the transaction is legitimate to be performed on the data for the input transaction 58;

(d) retrieves the subtransaction data descriptors for decomposing the input transaction 58 into subtransactions.

Accordingly, the preprocessor and decomposer 54 retrieves into the working storage 72 (shown in FIG. 3) of a host computer (not shown), upon which the transaction processing system 50 is operating, substantially all data and table rows that are necessary to process the transaction 58. Additionally, note that as one skilled in the art will understand, if some portion of the required data to process the transaction is unavailable, then the preprocessor and decomposer 54 terminates processing and subsequently writes appropriate error messages and/or details of the transaction into the reject table 74 (FIG. 2).

Assuming that the preprocessor and decomposer 54 successfully performs the gathering of information for the decomposing of the transaction into subtransactions appropriately, then control is returned to the transaction processing controller 52, wherein this controller then writes the details of the transaction to the transaction journal 78 along with identification data uniquely identifying the transaction (e.g., a transaction sequence number and/or time and date stamp). Following this, the transaction processing controller 52 invokes the subtransaction scheduler 62 for scheduling the performance of each subtransaction by an invocation of the subtransaction processing module 64. Note that it is an important aspect of the present invention that since the subtransactions can be processed independently of one another for a given transaction, instantiations of the subtransaction processing module 64 can be executed in substantially any desired order. In particular, such instantiations of the subtransaction processing module 64 can be performed concurrently, thus providing a substantial increase in transaction processing efficiency when such concurrency is provided on a computer having a plurality of processors.

Given that a subtransaction is performed successfully by the subtransaction processing module 64, various accounting tables within the transaction processing system 50 are updated. In general, each subtransaction conceptually indicates a single operation of either plus or minus that is to be performed with two operands also indicated in the subtransaction. That is, the first operand indicates the data to be added or subtracted from a particular field or column of a table row identified by the second operand. Additionally, each subtransaction updates other tables within the transaction processing system 50 automatically in order to provide consistency among the data tables so that: (a) substantially on-line account balancing capabilities can be performed, and (b) full auditability of the records of the business enterprise providing the transaction can be facilitated by retaining history records of table updates, as will be discussed with reference to "master table transaction cluster processing" described hereinbelow. Accordingly, each subtransaction processed by an instantiation of the subtransaction processing module 64 may update a plurality of the data tables contained in the collectively labeled database 70. Note that for one skilled in the art of transaction data processing and accounting, the names provided to the tables are indicative of their information content and structure. However, for clarity, substantially all of the tables for the present invention will be discussed in detail and/or illustrated hereinbelow.

The subtransaction processing module 64 processes subtransactions derived from three general categories of transactions that may be input to the present invention. That is, there may be input transactions for each of the following types of financial transactions (1.1) through (1.3) hereinbelow.

(1.1) Transactions related to exchanges of funds such as cash debits and credits for accounts of a particular business enterprise are provided. At a high level, the tables related to this functionality include the account master table 84 (FIG. 2), the general ledger table 88, and the entity attribute master table 92.

(1.2) Transactions related to additional or customized accounting for clients having accounts in the account master table 84 are provided. For example, in addition to providing the functionality of the transactions described in (1.1) immediately above, a customer income statement (income/ expense) table 96 may be provided with client account and transaction information related to income and expenses for tax purposes. Additionally, a customer cash flow (receipts/ disbursements) table 100 is also provided for recording any account transaction information related to receipts and disbursements in client accounts. Further, a customer performance measurement table 104 is also provided for retaining client account performance information related to the performance of client portfolios in comparison to investment indexes such as the Dow Jones Industrial Average, the S&P 500, etc. Note that these tables will be discussed and/or illustrated hereinbelow.

(1.3) When transactions are additionally related to financial instruments other than cash, debits and credits, such as portfolio management wherein there is buying and selling of equities, income derived from equities, and trade settlements related thereto. Further, note that these additional capabilities also provide the same degree of flexibility, adaptability and simplicity as provided in relation to the transaction processing capabilities discussed in (1.1) and (1.2) immediately above. That is, financial equity transactions of various types and for various business enterprises may be easily modified and/or added or removed from the transaction processing system 50 of the present invention, since these transactions are also described by transaction data descriptors consisting of a collection of subtransactions that are capable of being performed in substantially any order that is determined by the subtransaction scheduler 62.

Accordingly, in providing the functionality for the transactions related to portfolio management, the preprocessor and decomposer 54, upon being invoked by the transaction processing controller 52, also retrieves into working storage (as shown in FIG. 2) the necessary data for processing such portfolio maintenance transactions, this data including a subtransaction decomposition for the transaction. Subsequently, as discussed hereinabove, the subtransaction scheduler 62 invokes an instance of the subtransaction processing module 64. However, in addition to updating any appropriate rows of the tables 84, 88, 92, 96, 100 and 104, the subtransaction processing module 64 invokes a portfolio adjuster module 110 for capturing and/or updating detailed data of portfolio transactions that are not otherwise effectively captured for proper accounting and auditing. In particular, for a given subtransaction, the portfolio adjuster 110 invokes one of the following modules (2.1) through (2.4) hereinbelow.

(2.1) Original add module 114 for processing a subtransaction related to the addition of further financial instruments to a portfolio such as occurs when securities are bought and must be added to a given account.

(2.2) A reverse of add module 118 for reversing an addition of financial enterprises to a particular account portfolio. Note that this module is typically activated when financial enterprises are inadvertently added to an incorrect portfolio account.

(2.3) An original sell module 122 for processing subtransactions related to selling financial enterprises within a given account portfolio.

(2.4) A reversal of original sell module 126 for reversing the affects of an inadvertent sell of financial enterprises within an account portfolio.

These four modules 114-26 update the tables labeled collectively as 70B. In particular, the processing performed herein and the tables updated herein are described below.

Major Programs and Functionality

Major Programs

The N_gine transaction processing system contains four major programs. These are:

(1) Transaction Processing controller 52
(2) Transaction Preprocessor and Decomposer 54
(3) Subtransaction Processing module 64
(4) Subtransaction Scheduler 62

Program Functionality

The purpose of the Transaction Processing controller 52

(a) test for incoming transactions and once detected
(b) execute the Transaction Preprocessor and Decomposer 54 and then
(c) execute the Subtransaction Processing module 64 for each transaction.

The purpose of the Transaction Preprocessor and Decomposer 54 is to verify (a) that all information in the transaction is accurate
(b) that all files and controls are available to properly process the transaction
(c) that the specific subtransaction processing instructions are loaded into working storage.

The purpose of the Subtransaction Processing module 64 is to (a) execute all of the subtransactions that have been previously defined for a transaction
(b) create auditability for every transaction.

The purpose of the Subtransaction Scheduler 62 is to (a) allocate a specific task to a specific processor
(b) return processing to the Transaction Processing controller 52.

The present invention may be described as "Table-Driven Transaction Processing". That is, the present invention permits the processing of virtually any type of user-definable transaction by defining the processing for such transactions as data descriptors that are interpreted in real time and dynamically as needed for processing corresponding transactions. Accordingly, the transaction data descriptors are denoted as "driving data" and are defined by the transaction processing master table and the transaction master table. That is, the transaction master table provides a first initial collection of data for identifying each transaction and the transaction processing table provides the remainder of the data including the subtransaction decompositions. Accordingly, each transaction processed updates an appropriate set of user-definable tables (known as the "driven" data) for completing the processing of the transaction. Since both the "driving" and the "driven" information is expressed as data rather that actual code, the entire functionality of the system can be changed in a straightforward manner.

In the description hereinbelow, the functional components of the present invention are also identified by other naming conventions from the description above. Accordingly, the following table shows the pairing of the functional component identifications above with those also used below:

| ABOVE | BELOW |
|---|---|
| TRANSACTION PROCESSING CONTROLLER 52 | N_GINE COMMAND PROCESSOR |
| TRANSACTION PREPROCESSOR AND DECOMPOSER 54 | N_GINE EDIT PROCESSOR |
| SUBTRANSACTION PROCESSING MODULE 64 | N_GINE POSTING TO AM, EA AND GL |
| SUBTRANSACTION SCHEDULER 62 | N_GINE SCHEDULER |
| PORTFOLIO ADJUSTER 110 | AORS |
| ORIGINAL ADD MODULE 114 | ORIGINATE ADD PROCESSING |
| REVERSER OF ADD MODULE 118 | REVERSE ADD PROCESSING |
| ORIGINAL SELL MODULE 122 | ORIGINATE SELL ROUTINE |
| REVERSE OF ORIGINAL SELL MODULE 126 | REVERSER SUBTRACT PROCESS |

N_gine System Design Rules

A. The Magic Number in Software Design is 1. That is,
store data once,
program data once,
process data once.

B. Design a total system with the fewest number of processing models. For example, One model for processing all adds (inserts), changes (updates), and deletes (deletes) for all Master (or Reference) Files (or tables).

One model for processing all of simple transactions (such as debits and credits), including original and reversing entries.

One model for processing all complex transactions (such as buys and sells), including original and reversing entries.

One model for processing all adds (inserts), changes (updates), and deletes (deletes) for all Detail Record (or "driven") Files (or tables).

C. Use the first and last models to process all files (or tables) in the entire system.

D. Include audit controls for every table in the system from the very outset of design.

E. For reasons of productivity assessment, include Production Statistics for every job.

Namely,
Begin Time
Number of Transactions
Number of Acceptances
Number of Rejects
End Time.

These variables represent the only true means of measuring actual productivity.

F. For reasons of auditability, never overwrite any original information. Move all original information from data entry (cradle) to data warehouse (grave) without any changes.

G. For reasons of reliability and profitability, system designs should focus on a "large number of small programs" rather than a "small number of large programs". The result is not only ease of maintenance but also the ability to spread the small programs across a number of simultaneous processors.

H. For reasons of manageability, all system designs should embrace one integrated enterprise-wide standard naming convention for all files (tables), records (rows), and fields (columns).

I. For reasons of portability, use the fewest number of language commands to code the system. Avoid vendor and/or language extensions.

J. For reasons of flexibility, never hard code what can be table-driven.

N_gine Design Concepts

A. Only 4 Processing Models for Financial Services and Telecommunications Applications
1. Schema
2. Units, Debit / Credit
3. Assets / Liabilities
4. File Maintenance Routine B. Table-Driven Transaction Processing for maximum flexibility
1. Number of Transactions
2. Name of Each Transaction and Unique Details
3. Processing Algorithms (at least 1, up to 20 depending upon complexity)
4. Each algorithm has 3 components
   a. Plus (P) or Minus (M)
   b. Operand 1
   c. Operand 2

C. 100% Auditability For Every Transaction by creating
1. a Detail Record containing all relevant data and
2. hash totals of three relevant fields in at least 3 other tables.

D. The 3 relevant fields for calculating all hash totals are:
1. Cash
2. Units
3. Cost Basis E. Basic Relational Database Management System Processing Concepts
1. Commit/Rollback
2. Row Level Locking
3. Indexing, ROWID
4. Stored Procedures
5. Shared Memory F. Some Financial Services Accounting Systems are not Permitted to commingle funds. That is, separate accounting for both income and principal must be provided. Therefore, each account master must have a designated "income posting code" to define the proper processing. Such a code might be: (I) Income Only, (P) Principal Only, (B) Both Income and Principal.

N_gine's Basic Tables

Licensee Profile (The Licensee "Reference" or "Master" Tables)

LM The License Master table contains the necessary information to process any type of licensee using either single or multiprocessing computers.

LU The Licensee User Master identifies different users for the disparate systems that may be processed simultaneously.

LT The Licensee Account Type table contains the necessary information to process any type of account be it for a pension trust account, a communications account, or a corporate subsidiary.

LD The Licensee Default Definition table the default definitions for cash, units, and cost basis controls for total system control.

LL The Licensee General Ledger Definition is a list of all of the acceptable entries for the General Ledger. That is, it provides a framework for processing any type of accounting controls for any set of account types.

LS The Licensee Diversification Scheme contains a three level classification scheme for reporting an decision-making purposes for any set of assets and liabilities.

LP The Performance Measurement Group Master contains a three level classification scheme for measuring the performance of different investment groups.

LN The Licensee Summary Name Master contains a list of the entries on any type of Income Statement and Cash Flow Statement.

LW The Licensee Wholesaler Master contains name, address, sales volumes, etc. wholesalers of communications services.

LR The Licensee Reseller Master contains name, address, sales volumes, etc. for resellers of communications services.

Account Profile (The Customer "Reference" Tables.

AO The Account Objectives Table contains the different types of account objectives, such as income, growth, capital preservation, etc.

AL The Account Jurisdiction contains the different types of legal relationships, such as broker, agent, trustee, advisor, etc.

AJ The Account Jurisdiction contains the different types of legal jurisdiction, such as federal law, state law, foreign law, etc.

AR The Account Representatives Table houses the different representatives, their names and communication addresses.

AN The Account Registration Names is a list of legal names used in security settlement.

AM The Account Master table provides all of the necessary information to process any type of account by linking the Account Objective, Account Jurisdiction, Legal Capacity, Profit Center, Account Representative, and Registration tables plus other relevant data for reporting contens and reporting cycles.

AC The Account Communications Links links the Account Number for Financial Services to the account numbers for communications services so that all information can be contained in one reporting scheme.

Transaction Profile (The "Driving" Tables)

TM The Transaction Master table provides all of the information to process any type of transaction, excepting the specific processing algorithms.

TP The Transaction Processing table provides all of the specific processing algorithms for any type of transaction master. The Transaction Master and Transaction Processing tables provide all of the necessary information to process any type of transaction.

TR The Transactions—Recurring Table (TR) contains the necessary information for automatically processing any type of transaction on a recurring basis.

Entity Profile (The Entity "Reference" Tables)

EM The Entity Master table provides all of the necessary information to process any type of financial entity.

EA The Entity Attribute table joins all relevant diversification (known as type, group, and class), general ledger (known as accounting control numbers), and performance group (known as type, group, and class) data into one table for only one access seek.

ET The Entity Transaction table links specific transactions to specific entities, such as BG (Buy Government) for a US Treasury Note, BF (Buy Tax-Free) for a tax-free bond, BE (Buy Equity) for common stocks, etc. Note: It is the correct assignment of such transactions to such entities that permits the proper accumulation of data for income tax purposes.

Licensee Status

SG The System General Ledger contains all of the information to process any type of institutional accounting control.

SJ The System Transaction Journal Table contains all of the transactions and all of the details for each transaction for a specific accounting period.

ST The System Trade Settlement Table contains all of the automatically generated offset transactions for Buys and Sells SS The System Summary Table contains a record for each execution of the system with the Begin Time, End Time, Number of Total Records Read, Number of Accepts, Number of Rejects, etc.

SR The System Reject Table contains a list of all transactions rejected for whatever reason.

SC The System Transaction Count Table contains the number of each type of transaction processed on any given transaction.

Customer Status (The "Driven" Tables)

CS The Customer Income Statement contains all revenues, expenses, and profits or losses for all customer accounts.

CF The Customer Cash Flow Statement contains all receipts and disbursements for all customer accounts.

CB The Customer Balance Sheet table contains all assets and liabilities for all customer accounts.

CG The Customer Capital Gains table contains all of the realized capital gain details for all customer accounts.

CI The Pending Income table contains all of the pending income, such as interest or dividends, for all accounts.

CA The Pending Capital Adjustments table contains all of the pending capital adjustments, such as stock splits, stock dividends, mergers, acquisitions, etc., for all accounts.

CP The Performance Measurement contains all of the periodic performance records for all customer accounts.

The Control Tables (The "System Balance" Tables)

Since every transaction is recorded in a detail record plus hashed to three other control tables, the control values of cash, units, and cost basis are added to like values in the following control tables:

Account Master, System General Ledger, and Entity Attribute tables.

For other reports such as the Income Statement and the Cash Flow Statements, the Performance Measurement table is used as a control table instead of the General Ledger.

The present invention includes four computational processing models (process models 1 through 4) for processing financial transactions and assuring full auditability and traceability.

The purpose of Process Model 1 (FIG. 5) is to create a single methodology for capturing, maintaining, and archiving the non-financial transaction data including a master table (reference table, or schema ) data for 100% auditability within a single software system. This model provides:

A current database 300 (FIG. 5) (for additions, negations and corrections) and an archive database 304 (Read Only)

Figure 5:
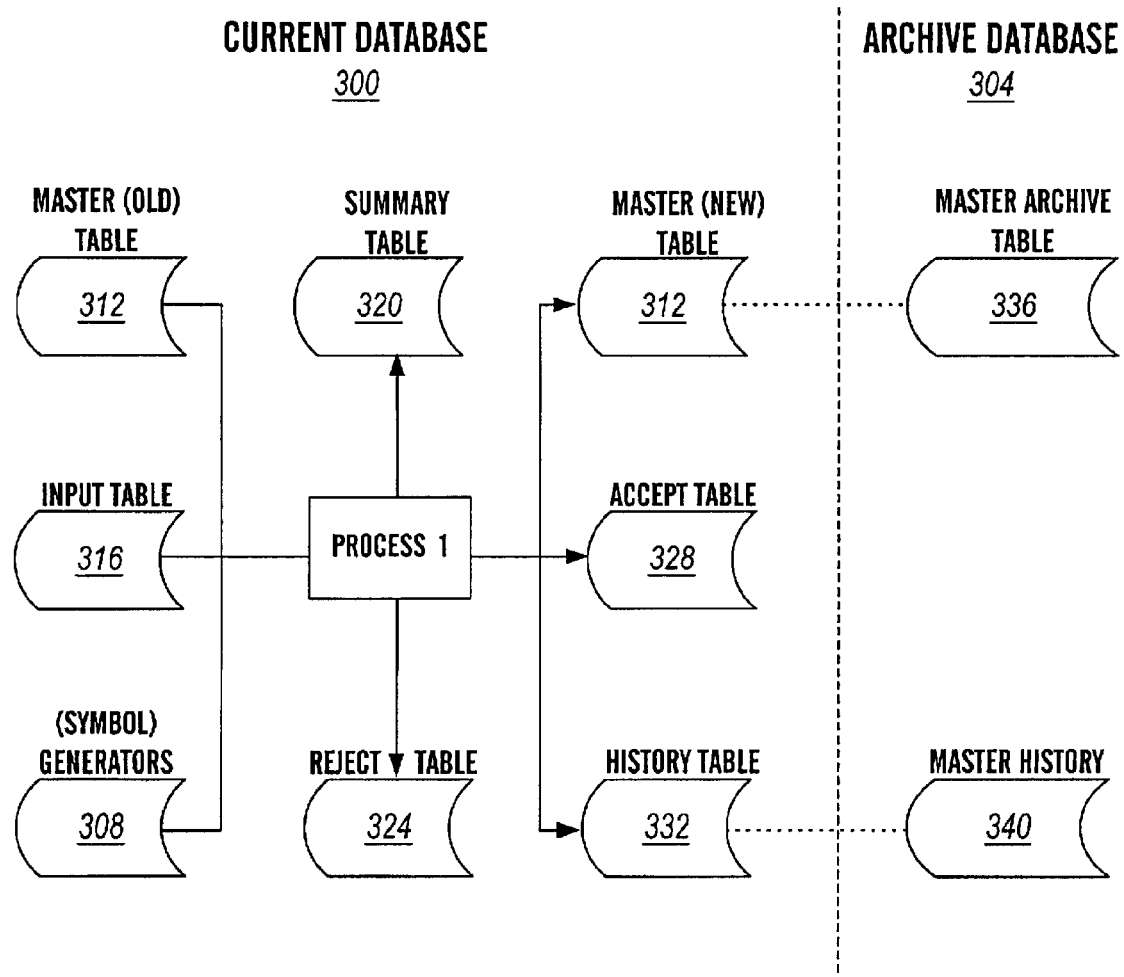
FIG. 5 is a block diagram illustrating process model No. 1 of the present invention.

Eight tables (i.e. tables 312, 316, 320, 324, 328, 332, 336 and 340, of FIG. 5)

Number of Modifications

12 Control Fields per master table

A sequence number generator

A process flow methodology for add, change, and delete of data table rows.

The operation of Process Model 1 is as follows:

1) Normal Updating to Current Database 300

|  | Write to Reject | Write to Accept | Move Master to History | Add to Master | Change Master | Delete Master |
|---|---|---|---|---|---|---|
| Add |  |  |  |  |  |  |
| IF Identifier Found | X |  |  |  |  |  |
| IF Identifier Not Found |  | X |  | X |  |  |

-continued

| | Write to Reject | Write to Accept | Move Master to History | Add to Master | Change Master | Delete Master |
|---|---|---|---|---|---|---|
| Change | | | | | | |
| IF Identifier Not Found | X | | | | | |
| IF Identifier Found | | X | X | | X | |
| Delete | | | | | | |
| IF Identifier Not Found | X | | | | | |
| IF Identifier Found | | X | X | | | X |

2) Periodic Updating to the Archive Database 304 at the End of a Pre-determined Time Period. That is, (a) archive snapshots of the archive master 312 in the current database 300 to the master in archive database 304;

(b) archive the archive history 332 in the current database 300 to the master history 340 in the archive database 304;

(c) purge the history table 332 in the current database 304.

The purpose of Process Model 2 (FIGS. 2A, 2B) is to create a single methodology for: capturing, maintaining, and archiving the financial transaction data including: units, and debit/credits for one or more disparate financial applications with 100% auditability, wherein the processing is performed by: (a) computing configurations containing any number of simultaneous processors, (b) decomposing each input financial transaction into separate and independent subcomponents, (c) allocating the subcomponents across any number of multiple processors.

The methodology of process model 2 utilizes a data-driven transaction processing strategy, wherein the manner in which a transaction is processed is determined by retrieving appropriate control data for processing a given input transaction. Thus, the present model provides the ability: (a) to process like systems (such as financial services systems) with different transaction definitions and accounting requirements (such as commercial banking, broker/dealers, mutual funds, insurance systems) and different debits and credits and/or (b) unlike systems (such as telecommunications systems) with disparate definitions (such as landline, wireless, satellite, cable systems) within the present invention at the same time.

The purpose of Process Model 3 (FIGS. 2A, 2B) is to create a single methodology for: capturing, maintaining, and archiving the financial transaction data including: units, debits/credits, financial instruments for one or more disparate financial applications with 100% auditability within a single software system on computing configurations containing any number of simultaneous processors, decomposing each disparate financial transaction into separate and independent subcomponents, allocating the subcomponents across any number of simultaneous processors, and processing the data with 100% auditability. The methodology of Model 3 provides:

"Detail Record Maintenance", that is, the ability to process transactions for similar business enterprises (such-as portfolio management systems) relating to various financial instruments (such as disparate assets and liabilities) and/or transactions for dissimilar business enterprises (such as portfolio management systems, paying agencies, stock transfer systems) with disparate languages (such as English, Spanish, French, or German) and disparate definitions (such as management philosophy, accounting, and operating nomenclature) and unlike financial instruments (such as assets and liabilities) within the same software at the same time.

The ability to decompose, allocate, process, and audit each financial instrument transactions with 100% auditability.

Figure 2A:
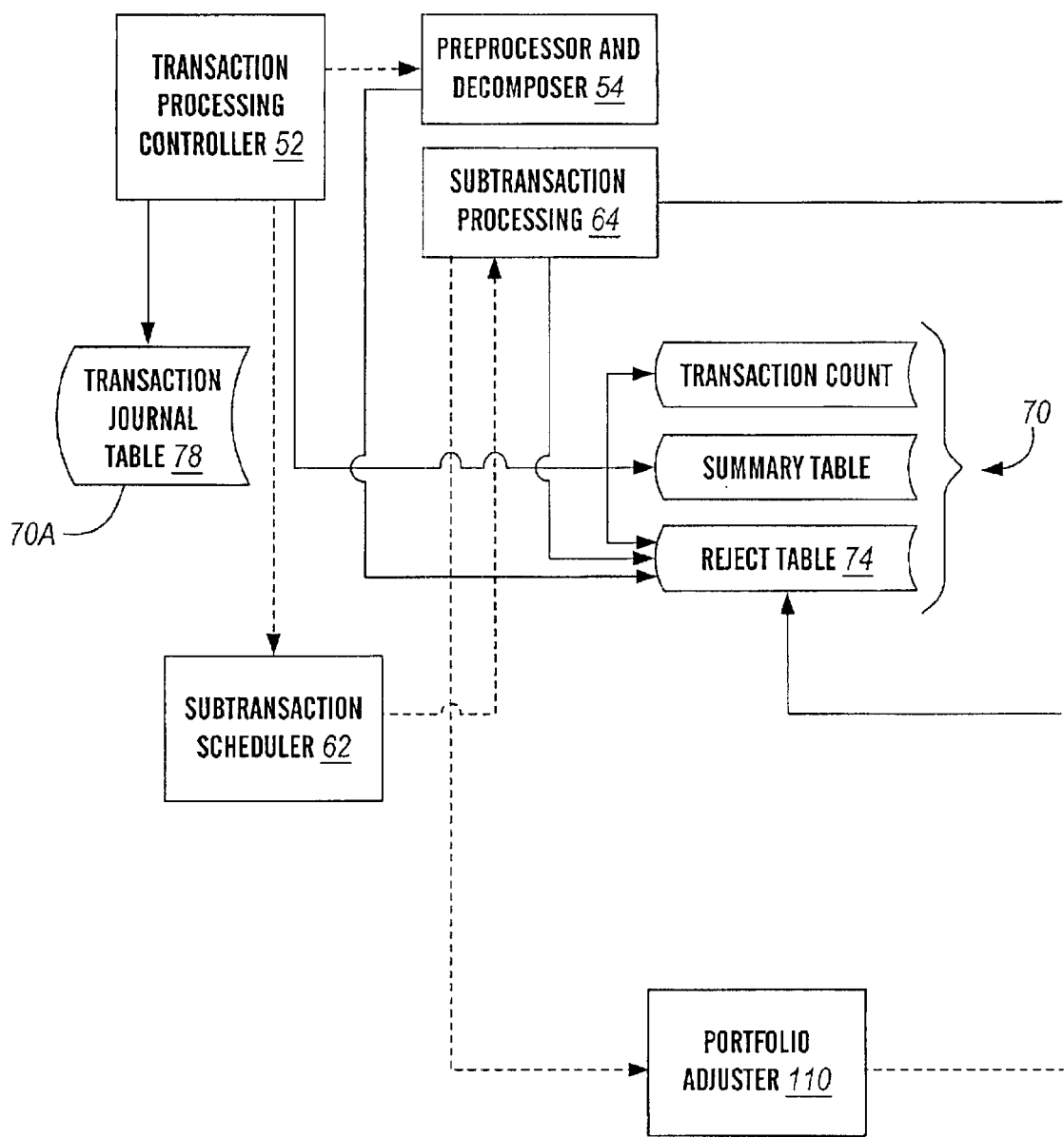
FIGS. 2A and 2B is another block diagram of the present invention illustrates: (a) the high level transaction processing modules, and (b) the data tables (represented by the symbols with arcuate vertical sides) provided and maintained by the present invention. Furthermore, the present figure shows the data flows as solid arrows and control flows as dashed arrows. Moreover, this figure also indicates the data tables effected by process models No. 2 and No. 3 of the present invention.
Figure 2B:
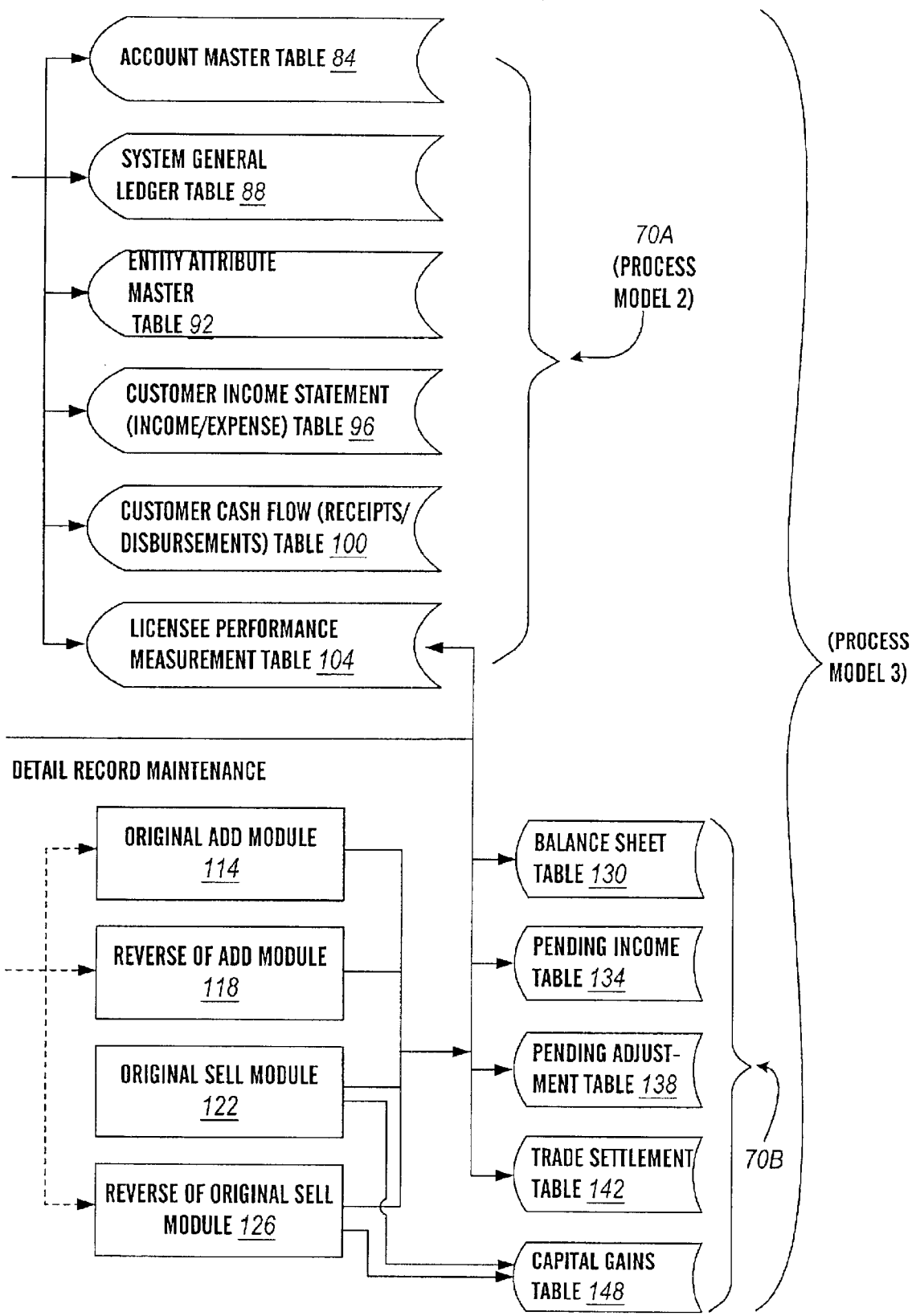
Figure 3:
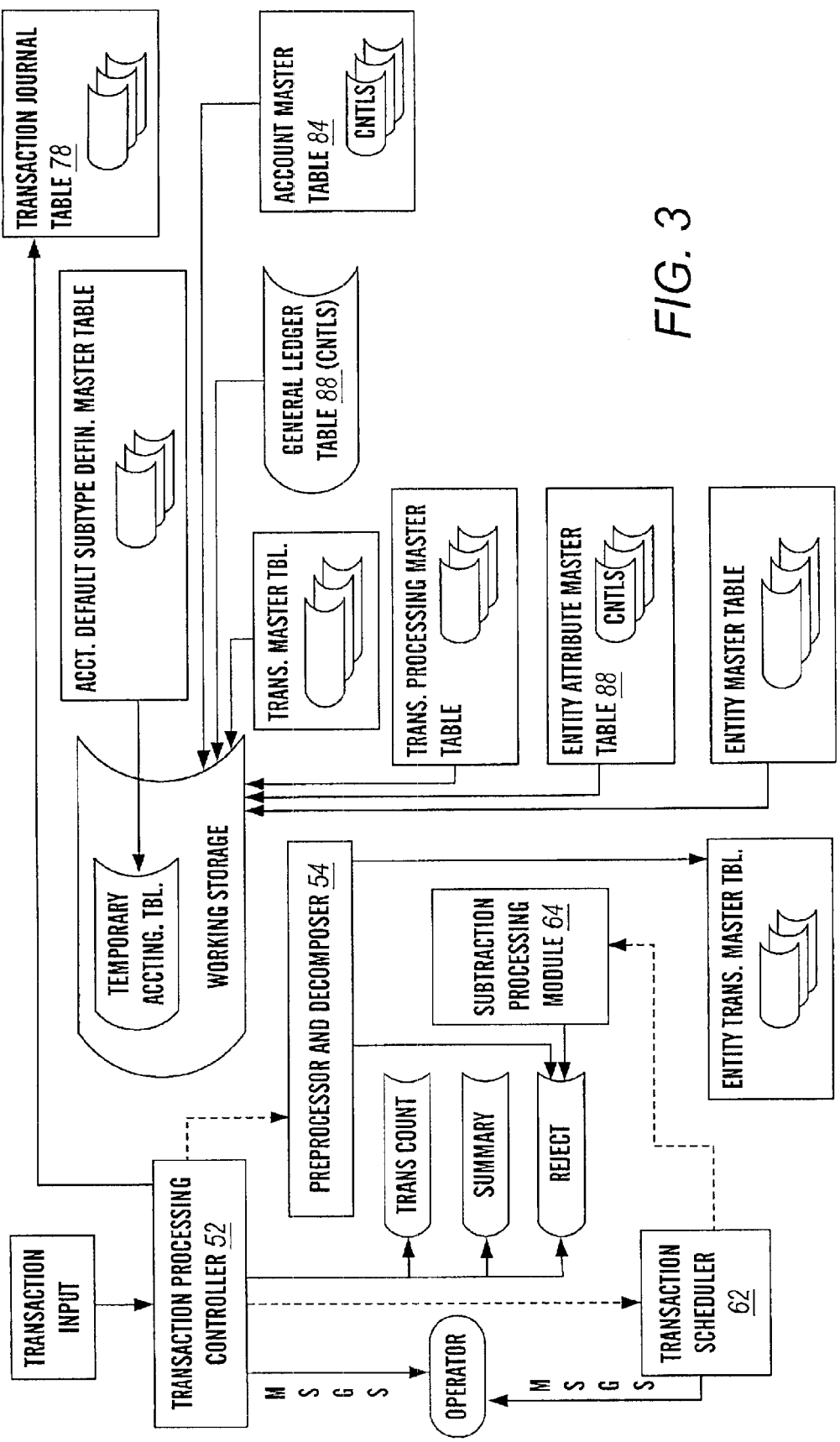
FIG. 3 is another high level block diagram of the present invention during activation of the preprocessor and decomposer 54 wherein the solid arrows are illustrative of the data flows that occur during the activation of the preprocessor and decomposer 54. Moreover, the tables within boxes represent tables having a process model No. 1 representation, and the tables having account balancing control fields include the identifier, "CNTLS."

The current databases 300 (for additions, negations and corrections) and the archive databases 304 (read only);

Sixteen data tables (some of which are shown in FIGS. 2A–2B) plus a sequence generator;

12 control fields appended to the master tables for tracing master table changes;

One transaction three hash totals (mostly using AM, EA, and PM tables);

4 currency fields;

Sequence number generation;

Reversing/reversed by detail;

Processing flow for additions, negations, and corrections.

The purpose of Process Model 4 is to create a single methodology for performing file maintenance including: creating a record (row) containing the initial data in a file (table) or modifying the initial data within an existing record (row) within a file (table) or deleting a current record (row) from a file (table)in any software application on computing configurations using simultaneous processors. Where the term, "Details", hereinbelow represents the identity of the specific financial transaction, the methodology of the process model 4 is provided by programs such as the following:

```
BEGIN
    IF Trxn is "ADD" then
        /*      Test for Duplicate Add                      */
        SELECT One or More Values from the Desired File (Table) into Working Storage
        IF Error then
            /*      Add New Record                          */
            INSERT INTO Reject Report
```

-continued

```
                        IF Error then
                                Message "INSERT Reject ADD", Details
                                Goto Write Reject Table
                        ENDIF
                ELSIF
                        /*      Increment Existing Record       */
                        Increment One or More Data Values
                        UPDATE SET, Details
                        IF Error then
                                Message "UPDATE Error ADD", Details
                                Goto Write Reject Table
                        ENDIF
                ENDIF
        ELSIF Trxn is "SUBTRACT" then
                /*      Test for Valid Record                   */
                SELECT One or More Value(s) from Existing Record
                IF Error then
                        Message "SELECT Error SUBTRACT", Details
                        Goto Write Reject Table
                ENDIF
                /*      Test for Valid Amounts                  */
                IF One or More Amounts > One or More Values from Existing Record then
                        INSERT INTO Reject Report
                        IF Error then
                                Message "INSERT Reject SUBTRACT", Details
                                Goto Write Reject Table
                        ENDIF
                */      Delete Existing Record                  */
                ELSIF   One or More Amounts = One or More Values from Existing Record
                AND     Special Deletion Criteria = TRUE then
                        DELETE Record
                        IF Error then
                                Message "DELETE Error", Details
                                Goto Write Reject Table
                        ENDIF
                ELSE
                        */      Decrement Existing Record       */
                        Decrement One or More Values
                        UPDATE SET, Details
                        IF Error then
                                Message "UPDATE Error SUBTRACT", Details
                                Goto Write Reject Table
                        ENDIF
                ENDIF
        ELSE
                /*      Invalid ADD or SUBTRACT Code            */
                INSERT INTO Reject Report
                IF Error then
                        Message "INSERT Reject AORS", Details
                        Goto Write Reject Table
                ENDIF
        ENDIF
        GOto EOJ
        <<Write Reject Report>>
        ADD to Reject Table
        IF Error then
                Message "INSERT Reject Table Error", Details
                STOP
        ENDIF
        <<EOJ>>
                Null
END
```

Accordingly, the methodology of process model 4 defines:
(a) A current database (for additions, negations and corrections) and archive database (Read Only)
(b) ADD or SUBTRACT;
(c) Initial tests for values;
(d) Special deletion criteria;
(e) Tests for action;
   INSERT or UPDATE;
   DELETE or UPDATE;
   INSERT INTO Reject Tables;

Processing Model 1:

Processing model 1 is a method for processing changes to files (or tables) denoted as master or reference tables (files) wherein these tables retain fundamental information that is not derivable from other tables. In particular, processing model 1 processes changes to master tables in an automated manner without losing historical financial information. Accordingly, 100% auditability of all data changes is able to be achieved.

The method of achieving this goal uses an architecture denoted as "Master Transaction Cluster Processing" (MTCP) MTCP is based on the premise of creating a logical flow of all original information from data capture (data entry) to permanent data repository (data warehouse) by replacing single master files (or tables) with a cluster of files (or tables). Therefore, MTCP addresses the complete life cycle of all information relevant to organizational decision-making. MTCP is targeted for use in the automatic generation of program code for multiple large-scale real-time transaction processing applications (such as securities trading, telecommunications billing, and work management) on multi-processing computers (using 4, 8, 16, 32 processors), where control is not only an increasing complex issue but an absolute necessity for future competition.

The circumstances leading to the invention of Master Transaction Cluster Processing are:

a) Prior art financial transaction software architecture lacks the ability to identify transactions by table, transaction date, transaction number, and the person authorizing the transaction.

b) Prior art financial transaction systems typically use only one table to contain all Master Information (i.e., non-derivable information) and the data in this table is overwritten, thereby losing historical information. Cases in point would be a record of all of the past mailing addresses or processing instructions for a specific customer.

c) Without 100% retention of an organization's vital information, management has no idea of the accuracy of the information being used for decision-making purposes.

d) The Year 2000 problem, know as Y2K, is proving that past software applications designs have reached technological limits and current maintenance costs are inordinately expensive.

e) Competitive pressures are mounting for higher quality software with lower software development and maintenance costs. Totally new architectures for applications software is in great demand.

f) The ComputerWorld article, "Information: America's Favorite Investment," by Paul Strassman, ComputerWorld Magazine, Aug. 5, 1996, states that over 1100 companies are spending more on automation annually than the net worths of their respective companies.

g) The Standish Report as described in Development Patterns, InfoWorld Magazine, Feb. 3, 1997, p. 56, states that the success rate of Business Process Reengineering has increased from 16% in 1994 to only 27% in 1996.

Note, in the book "Oracle Design", Ensor & Stevenson, O'Reilly Press, it is a recommended practice to compromise data retention rather than achieve 100% auditability. Today's hardware costs suggest otherwise.

The advantages of the present invention over the approaches discussed above are:

to provide 100% auditability which offers business management the capability to exercise its fiduciary responsibility to its stockholders and Board of Directors, to capture, maintain, and ensure the integrity of all vital information for business enterprise decision-making purposes, and to preserve such information consistent with business enterprise-defined data retention cycles. Additionally, the present invention allows accountants to certify in business enterprise annual reports that all vital corporate data is being properly preserved.

A detailed description of Master Transaction Cluster Processing corresponding to model 1 (the first computational model of the present invention) is as follows.

MTCP Overview

Master Transaction Clustering, or MTCP, performs the following tasks:

a) assigns a unique identifier based on (i) master table identification, (ii) transaction date, (iii) transaction number, and (iv) authorized user, to each transaction that causes a change in the state of a particular record of a master table. That is, if one or more data elements in the record change, then the previous record is written to history, and a new status is assigned to an identifier field used for tracking such changes;

b) creates a logical flow of data as it is originally entered from its inception (data entry) to its repository (data warehouse). The unique architecture of MTCP replaces the Master File (or Table) within prior art systems with a cluster of Master Files (or Tables), known as a "Master Transaction Cluster". This cluster is suitable for multiprocessing (or the use of simultaneous processors within a single computer to complete a common job). Hence, MTCP addresses 100% auditability via maintaining the total life cycle of information. Aged information may be deleted from the appropriate tables consistent with user-defined data retention policies;

c) offers a standard for processing all Master Tables within a total application;

d) provides a test bed for separately testing each Master Table Cluster under development and all Master Table Clusters in concert;

e) permits management to report that it is successfully capturing, maintaining, and preserving all critical information for decision-making purposes.

MTCP Scope

Master Transaction Cluster Processing utilizes the following (FIG. 5):

a) two databases (i.e., the current data base 300 and the archive data base 304), b) sequencing generator 308 having: (i) two external sequence generators; (ii) two internal counters, c) eight tables (denoted master table 312, input table 316, summary table 320, reject table 324, accept table 328, history table 332, master archive table 336 and master history table 340), and d) twelve additional fields for every row in the master table 312.

MTCP Independence

Master Transaction Cluster Processing of Model 1 is independent of any:

a) application—such as accounts receivable, customer billing, etc.

b) industry—such as financial services, telecommunication, or work management, c) hardware manufacturer—such as Compaq, Digital, HP, IBM, NCR, Unisys, d) operating system—such as MS-DOS, UNIX, OpenVMS, MVS, etc.

e) network—such as Novell, Ethernet, etc.

f) relational database management system—such as Oracle, Sybase, Microsoft SQL Server, Informix, etc., and g) computer language—such as SQL, COBOL, FORTRAN, PL/1, Java, etc.

MTCP Architecture

The Master Transaction Cluster Processing (MTCP) architecture can be used for any application in any industry using any computer language. Within the typical structured processing scheme of input and process, the Master Transaction Cluster Processing focuses solely on the process function. Thus, the method permits users to define input screens and defined output reports.

MTCP Databases

Unlike prior art software system, which contain only one table for each set of primary records, Master Transaction Cluster Processing uses eight related tables, or a cluster of tables, to track all information on a cradle to grave basis. The cradle being its point in inception (or data entry), and the grave being its permanent repository (or data warehouse).

Consequently, the "Master Transaction Cluster" spans two different databases: one denoted the Current database 300 containing all relevant data for the current processing period and a second denoted the Archive database 304 containing all relevant data for all previous processing periods. The Current database 300 represents the area of high inquiry, and the Archive database 304 represents the area of low inquiry. Consequently, the Current database 300 is normally placed on high-speed internal disk drive and the Archive database 304 is normally placed on less expensive lower-speed CD-ROMs. Note that trailing information in the Archive database 304 may be destroyed consistent with defined data retention policies, statute of limitations, etc.

MTCP Tables The six tables in the Current database 300 are the a.) Master Table 312(M) that will contain all records to be maintained.

b.) Input Table 316 (I) that will contain all records prior to updating.

c.) Reject Table 324 (R) that will contain all records rejected during processing.

d.) Accept Table 328 (A) that will contain all records accepted during processing.

e.) History Table 332 (H) that contain a complete snapshot of all records prior to updating.

f.) Summary Table 320 (S) that contains the results of a specific processing operation.

and the two tables in the Archive database 304 are the:

g.) Master Archive Table 336 that contains snapshots of the master table 312 at the end of each processing period.

h.) Master History Table 340 that contains a history of the master table 312 changes during a current processing period.

Note that the Master Table (M), Input Table (I), Reject Table (R), the Accept Table (A), the History Table (H) in the same "Master Transaction Cluster" share the same number and order of data elements consisting of alphabetic, numeric, and date items. Alternatively, the Summary Table (S) contains the start time, end time, number of accepts, and number of rejects for each time a series of master table 312 modifications are provided.

MTCP Generator and Counters

The Generators 308 include two different external counters and two internal counters used in effecting 100% auditability. The two external counters are the Accept Sequence Number Generator and the Reject Sequence Number Generator. The two internal counters are the Total Records Read Counter and the Number of Modifications Counter. All are used only in the Current database 300, as the Archive database 304 is read-only in nature.

Regarding the external counters, the Accept Sequence Number Generator included in the Current database 300 automatically generates sequential numbers for the processing period (daily, weekly, monthly, etc.) starting with the number 1, and increments by 1, so that every transaction processed against the preceding (old) master table 312 will receive a specific transaction number, and accordingly, each transaction processed will be uniquely identifiable based on master table identity, transaction date, transaction number, and authorized user. Note that the transaction date is read off the internal system clock. The Reject Sequence Number Generator counts the number of rejects for the specific processing period. Its function is similar to the Accept Sequence Number Generator. Both the Accept Sequence Number Counter and the Reject Sequence Number Counter are "processing period" specific. That is, both are cleared to zero at, e.g., midnight on the end of the processing period so that each processing period may be separately identified and audited.

Regarding the internal counters, the Total Records Read Counter counts the number of transactions read during a specific processing performance. Since the Total Records Read Counter is "job execution" dependent, this counter is cleared to zero at the outset of every processing program execution. The Number of Modifications Counter counts the number of times a specific record has been-changed. As this counter is "record" dependent, this counter is never cleared to zero, This specific counter should identify the number of individual records that may be retrieved, viewed, and verified from all of the tables in the specific Master Transaction Cluster to prove its auditability.

MTCP Archive Database 304

The Archive database 304 is read only. Within the Archive database 304, information contained in the Master Archive Table 336 represents a snapshot of information in the Master Table in the Current database 300 at a particular point in time such as the end of a month, quarter, or year. And, information in the History Archive Table 336 contains all of the transactions that have occurred from the beginning of the most recent processing period until the particular point in time, be it month, quarter, or year. For example, the Master Archive Table 336 contains the status of the Master Table 312 at the end of the first quarter, and the History Archive 340 contains all of the transaction modifications occurring since the end of the last quarter. In this fashion, any status of any Master Table 312 can be recreated for any point in time (say, month ends) by simply processing all transactions in the History Archive 340 for the desired period against the previous Master Archive Table 336, or the beginning of the period.

MTCP SOL Script Library Implications

To achieve 100% auditability of a complete system, every master file (or table in relational database management systems has a Master Transaction Cluster. Therefore, a total system containing 15 tables would require 15×8 or 120 tables to achieve full 100% auditability. Since each table will require at least 4 SQL scripts to (1) Create Table, (2) Select data from the table, (3) Delete data from the table, and (4) Drop the Table in the event of redefinition, the number of SQL scripts is 15×8×4, or 960 SQL Scripts. Then, each Master Transaction Cluster will require at least a Processing Program plus a Review, Reset, and Retest, or at least four more programs for each cluster, or 4×15, or 60, more SQL Scripts. All of the SQL scripts would be stored in one SQL Script Library on the computer for future reference and ease of maintenance.

MTCP Multi-processing

The multi-processing of the Master Transaction Cluster occurs in the following manner:

For additions (or Insertions in SQL) of data The Insertions to the Master Table 312 and Insertions to the Accept Table 328 may be processed simultaneously.

For changes (or Updates in SQL) of data The Update of the Master Table 312and the Insert to the Accept Table 328 may be processed simultaneously after the original record from the Master Table 312 has been copied to the History Table 332.

For deletes (or Deletes in SQL) of data The Deletion from the Master Table 312 and the Insertion to the Accept Table 328 may be processed simultaneously after the current record in the Master Table 312 has been updated for the transaction identifier and then copied to the History Table 332.

MTCP Creation

Before processing any Master Transaction Cluster, the necessary databases and files (or tables) must be created. For each business enterprise utilizing the present invention, these databases and files are created only once in the following manner:

---

(Begin Program)
    Create "Current" database
    Create "Archive" database
    in the "Current" database
        Create Master Table
        Create Input Table
        Create Reject Table
        Create Accept Table
        Create Second Accept Table (on separate disk unit, if desired)
        Create History Table
        Create Summary Table
    Create Sequence Number for Accepts
    Create Sequence Number for Rejects
    in the "Archive" database
        Create Master Archive
        Create History Archive
(End of Program)

---

MTCP Processing

Processing of the "Master Transaction Cluster" then occurs in the following manner.

Step 1: All required information for processing a transaction is first captured on an Input Form.

Step 2: Once this information is edited by, e.g., an operator, an Enter Key can be pressed by an operator to write this information to the Input Table 316 for particular master transaction clusters.

Step 3: For each input table 316, a polling program notes that the Input Table is not empty and has a transaction action to be processed whereupon the action is processed by a process (denoted "process 1" in FIG. M1).

Step 4: The transaction processing program determines the type of file maintenance to perform; basically, (1) add a record (entitled Insert a Row in SQL), (2) change a record (entitled Update a Row in SQL), and (3) delete a record (entitled Delete a Row in SQL), which in turn determines the multi-processing potential as described above in the MTCP Multi-processing.

The normal daily processing flow to achieve 100% auditability in either real-time or batch mode is as follows:

---

```
(Begin Program)
Read System Clock to Store Begin Time
(Read Next Transaction)
If Last Transaction
    Read System Clock to Store End Time
    Write End Time, Begin Time, Number of Accepts, Number of Rejects,
        and Total Records Read to Summary Table
    Goto End of Program
Increment Total Records Read by 1
(Add a New Record)
If transaction is "Add" then
    If record exists then
        Process Addition Error
        Goto Write Reject Table
****************************************************
    * Select System Clock Date      into Insert - Transaction Date      *
    * Increment Sequence Number     into Insert - Transaction Number    *
    * Select User Name              into Insert - Transaction User      *
    * Select Zero                   into Update - Transaction Number    *
    * Select Zero                   into Delete - Transaction Number    *
****************************************************
        Insert to Master Table
        Goto Write Accept Table
        (Change an Existing Record)
If transaction is "Change" then
    If record does not exist then
        Process Change Error
        Goto Write Reject Table
****************************************************
    * (Master Snapshot)                                    *
    * Move Master Table Record to History Table            *
****************************************************
    * Select System Clock Date      into Update - Transaction Date      *
    * Increment Sequence Number     into Update - Transaction Number    *
    * Select User Name              into Update - Transaction User      *
    * Select Zero                   into Delete - Transaction Number    *
    * Increment Master Table Number of Modifications by 1               *
****************************************************
        Update Master Table with New Data
        Goto Write Accept Table
    (Delete an Existing Record)
        If transaction is "Delete" then
            If record does not exist then
                Process Drop Error
                Goto Write Reject Table
```

```
*************************************************
*   Select System Clock Date    into Delete - Transaction Date     *
*   Increment Sequence Number   into Delete - Transaction Number   *
*   Select User Name            into Delete - Transaction User     *
*************************************************
*   Update Master Table Record for Tran Date/Tran Num/User         *
*************************************************
*   (Master Snapshot)                                              *
*   Move Master Table Record to History Table                      *
*************************************************
    Delete Master Table Record From Master Table
        (Write MULTI-PROCESSED Accept Table)
****************************************
*   Move "Current"        into Archive - Status *
*   Move "System Date"    into Archive - Date   *
****************************************
    Increment Accept Counter
    Insert to Accept Table
    Insert Second Accept Table (on a separate disk drive, if desired)
    Goto Loop to Next Transaction
(Write Reject Table)
    Increment Reject Counter
    Insert to Reject Table
(Loop to Next Transaction)
    Goto Read Next Transaction
(End of Program)
    End
```

Note: The specific multiprocessing of "Write Multiprocessed Accept Table" may be relocated to the specific routine (Add, Change, or Delete) depending upon the computer language being used.

Step 5: At the end of the "proofing period", such as daily or weekly, when proof tallies are matched to computer tallies, the Accept Table can be deleted as follows:
(Begin Program)
Delete All Records from the Accept Table
(End Program)

Step 6: Backup all databases and tables before any information is purged as follows:
(Begin Program)
Write All Tables in the "Current" database to backup
Write All Tables in the "Archive" database to backup
(End of Program)

Step 7: At the end of a user-defined period, an archive and purge process occurs that
(Begin Program)
Move "Archive" to Archive Status
Move "System Date" to Archive Date
Move All Records in the Master Table to Master Archive.
Move All Records in the History Table to the History Archive.
(End Program)

Step 8: In the event that current records are wrongfully moved to the History Archive, they may be retrieved by
(Begin Program)
Move Specific Records from the Master Archive to the Master Table
Move Specific Records from the History Archive to the History Table
(End Program)

This program should be executed only after Records have been moved from the Current database 300 to the Archive database 304. It should never be run after new transactions have been processed to the Current database 300.

MTCP Backup/Recovery

If necessary, a recovery program can be utilized at any time in the event of hardware failure. Upon complete recovery, Step 7 and Step 8 will have to be re-executed to insure the correct status before the next day's processing is begun. The Accept Table can then be used to as a substitute Input Table to return the system to its previous processing point. Once this table is exhausted, data from the Input Table would supply the remaining data for the processing job.

MTCP Management

Once test data are defined and processed, a business enterprise may
  (a) Review lists of the contents of all Master Tables 312 for determining correctness.
  (b) Reset the contents of all Master Tables for performing the next test.
  (c) Retest.

MTCP Auditability

Once auditabilty is achieved, the business enterprise may query:
  (a) When a Master Table Cluster was created.
  (b) When each record was added (or inserted) to the Master Table 312,
  (c) How many authorized changes (or updates) have been made to a record of the Master Table 312.
  (d) Prove the integrity of the master transaction cluster by producing a sequential list of all record changes, and if the record was deleted, where the record is stored.

Accordingly, 100% auditability of every change, every day, for every application is possible.

Multiprocessing Defined

Unlike serial processing which processes all jobs in sequential fashion, multiprocessing processes some of the same jobs simultaneously, or in parallel. While multiprocessing is not new, major computer manufacturers such as Compaq, Digital, Hewlett-Packard, IBM, NCR, Unisys, etc. have announced offerings of low-cost multiprocessing machines based on 2, 4, 8, and sixteen processors. These machines will rapidly increase the demand for multiprocessing software, which is known as "multithreaded" software. Multithreaded software permits the simultaneous execution of more than one jobs or job sequences.

Multiprocessing takes two forms, Symmetrical Multiprocessing (SMP) and Massively Parallel Processing (MPP), the difference being that symmetrical multiprocessing machines collectively have only one bus between the processors and the peripheral storage. For example, a symmetrical multiprocessing machine may have eight processors, one bus, and sixteen disk drives. In contrast, massive parallel processing machines has one bus for each processor. For example, a massively parallel machine may have eight processor, eight busses, and sixteen disk drives. Therefore, symmetrical multiprocessing machines are best suited for applications with a high processing content and a low input/out content. In contrast, massively parallel processing machines are best suited for applications that can be parallelized and have a high input/output requirement, as is the case with many commercial systems.

In either event, multiprocessing machines are best utilized when carefully tuned to avoid bottlenecks. This is likely to mean that all of the layers constituting a computing environment are multiprocessing-enabled. That is, the hardware, operating system, relational database management system, and the specific application are capable of multiprocessing. Some multiprocessing mainframes have been available for several years as well as some versions of the UNIX operating system. Only a few multiprocessing relational databases exist and even fewer multiprocessing applications. It is believed by some that the success of multiprocessing is solely dependent upon the "knowledge of the application" rather than "knowledge of the underlying tools," the tools being the hardware, operating system, and relational database system.

Accordingly, it is believed that the limiting factors for the success of multiprocessing for financial systems depends on:

(1) the lack of financial transaction application knowledge, (2) a lack of understanding of how multiprocessing can be used to effect 100% auditability, and (3) the lack of understanding as to how to decompose a financial transaction system into a series of small independent processes that may be performed simultaneously.

MTPC Uniqueness

Approaching multiprocessing from the business enterprise perspective, there are several levels by which processing could be sub-divided, These are by:

(1) application, wherein certain applications are capable of being performed in parallel, such as e.g., Accounts Receivable, Accounts Payable, etc.

(2) function, wherein certain functions within an application are capable of being performed in parallel, such as, e.g., updating customer profiles, customer status, or performance.

(3) process, wherein certain large tasks are capable of being decomposed into smaller tasks that can be performed in parallel, such as, e.g., by splitting a large Accounts Receivable process, such as billing, into subcomponents.

(4) transaction, wherein transactions are decomposed into subtransactions that are capable of being performed in parallel.

The value of MTCP is that it addresses the last form of multiprocessing which is believed to be the most critical to delivering rapid response times for real-time financial transaction processing systems. That is, by dividing a transaction into subtransactions that can be spread across several multiprocessors, processing throughput may be faster. Plus, the large number of small programs make maintenance much easier and less expensive.

Figure 6:
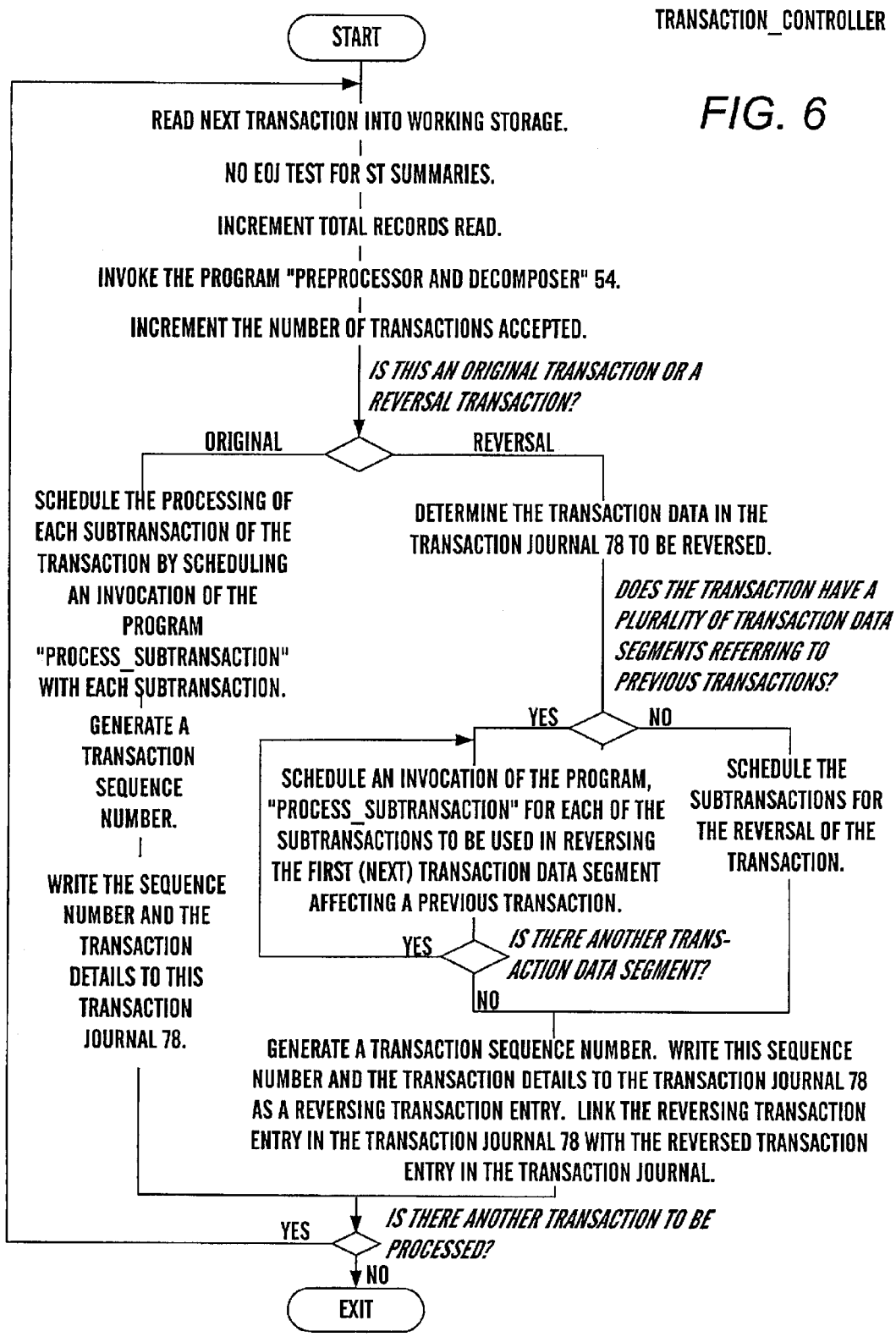
FIGS. 6A, 6B, and 6C are high level flowcharts of the steps of an embodiment of the transaction processing controller 52 of FIG. 2A.
Figure 6A:
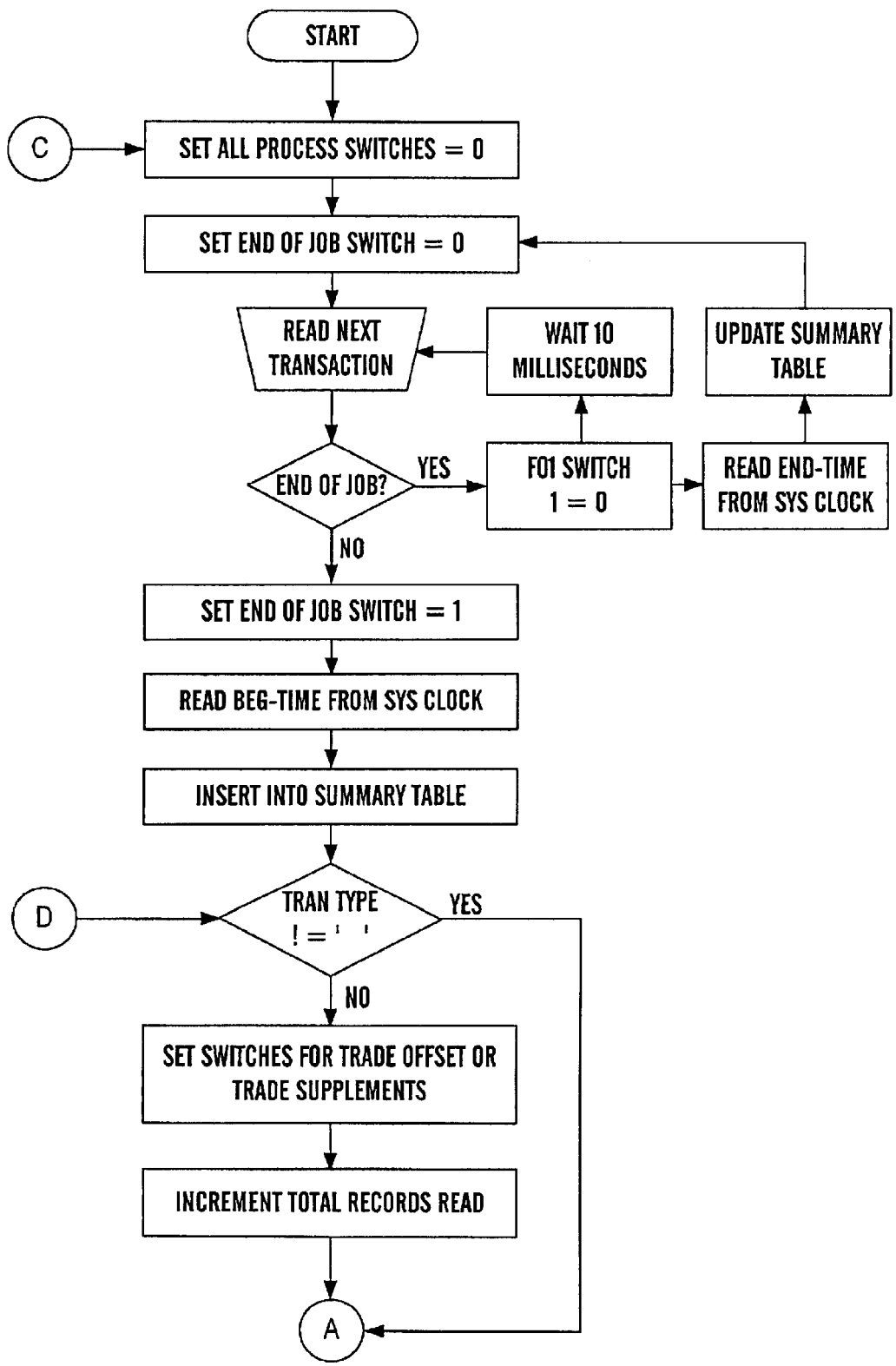
Figure 6B:
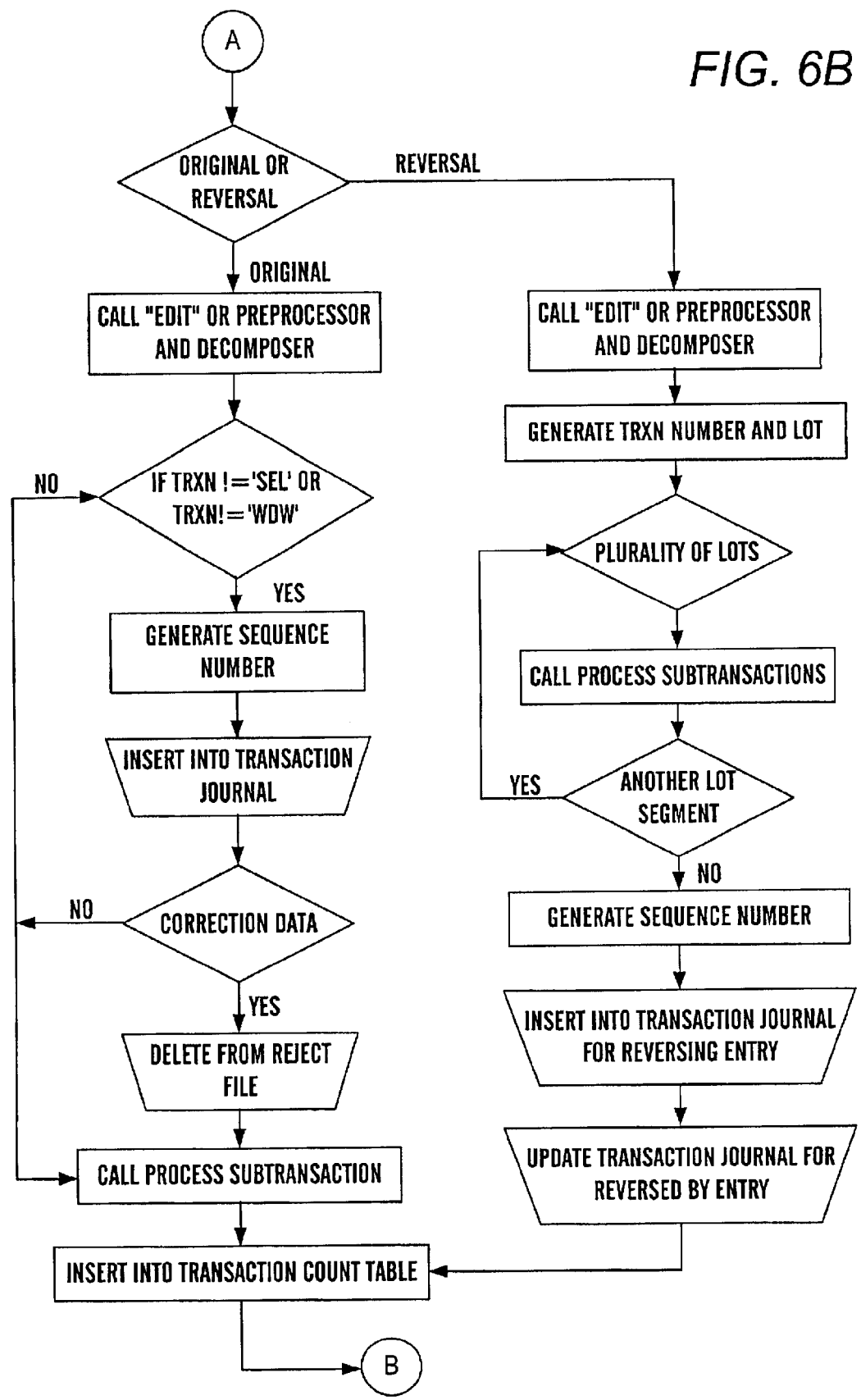
Figure 6C:
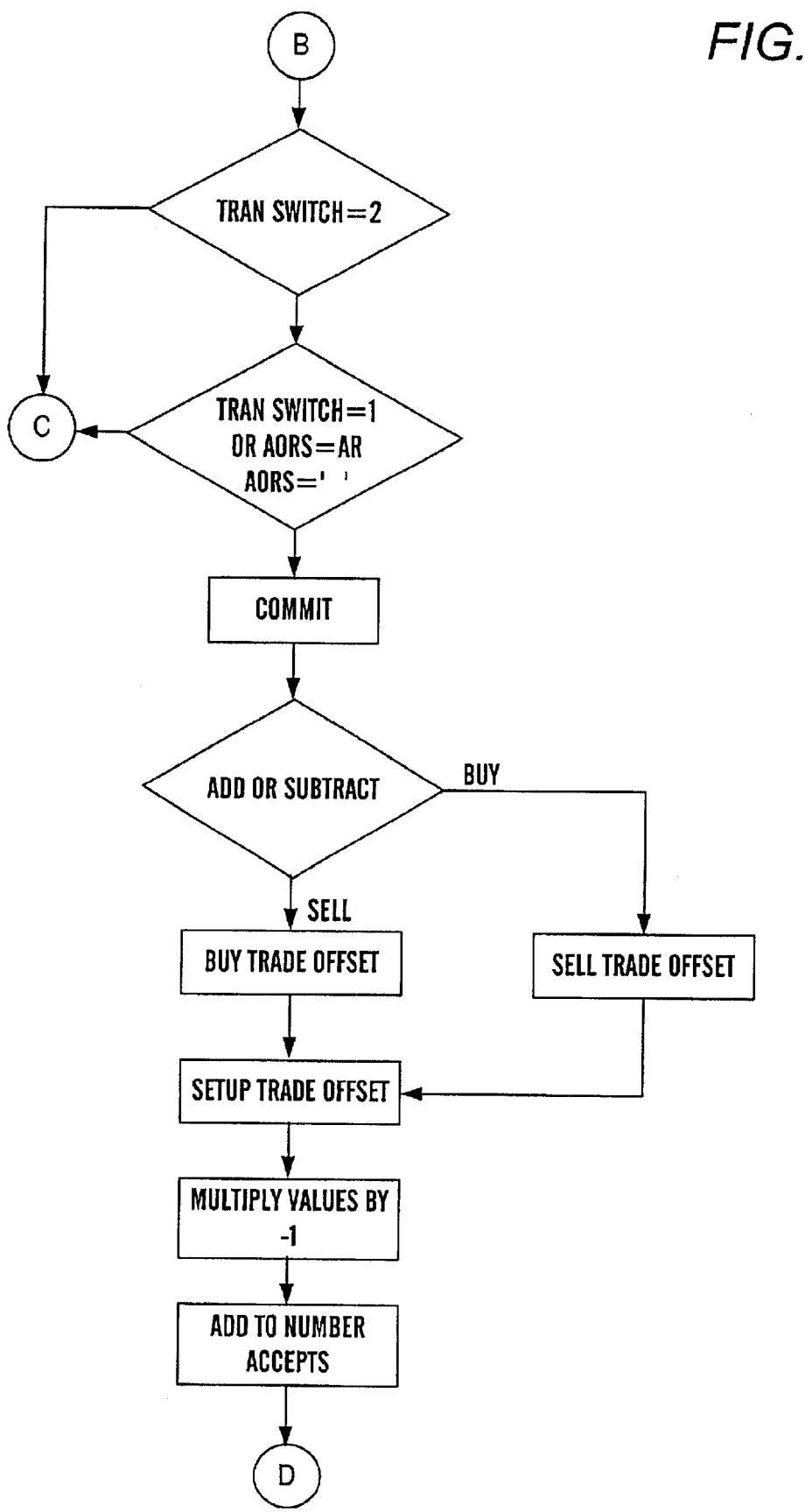

A first embodiment of the transaction processing controller 52 is provided in the flowcharts of FIGS. 6A, 6B and 6C. Note that for simplicity, error handling and related validity checking steps have been omitted. However, the performance of such steps is within the scope of the present invention, as one skilled in the art will appreciate. A second pseudo-code embodiment of the transaction processing controller 52 follows.

Pseudo-Code for the Command Processor
(Transaction Processing Controller 52)

```
BEGIN
         /* The following switches are global. They control both the activity of the system.      */
         /* The Processor Switches monitors the availability of an eight processor computer.      */
         /* The Process Switches monitors all of the jobs that are to be executed.
         /* These switches initialize the system, and then change throughout processing           */
         /* as the subcomponents of the system and the processors finish.                         */
         /* The Processor Switches are turned ON as jobs are sent to specific processors.         */
         /* The Processor Switches are turned OFF after the jobs are completed.                   */
         Set Processor 1 Switch = 0
         Set Processor 2 Switch = 0
         Set Processor 3 Switch = 0
         Set Processor 4 Switch = 0
         Set Processor 5 Switch = 0
         Set Processor 6 Switch = 0
         Set Processor 7 Switch = 0
         Set Processor 8 Switch = 0
         Read Begin Time from Systems Clock into Working Storage
         Set Total Records Read = 0
         Set Number Accepts   = 0
         Set Number Rejects   = 0
         /* The Command Programs reads the transaction input from the operator, then             */
         /* edits the transaction for validity and loads the transaction processing algorithms   */
         /* from the Transaction Processing table (or cache file) to a temporary table. It then  */
         /* walks down all of algorithms in the temporary table to process the total transaction */
         /* with 100% auditability. Each algorithm may be passed to a separate processor.
         /* Read operator instructions for starting and ending item in input stream       */
         /* For the purposes of restart in the event of mid-stream job failure                    */
         /* For the purpose of omissions in processing.                                           */
         /*       Operator may enter   Begin .......................... End      for all items                */
         /*       Operator may enter   Begin ..... End                  for a beginning list                  */
         /*       Operator may enter                 Begin ..... End    for an intermediate list              */
```

-continued

Pseudo-Code for the Command Processor
(Transaction Processing Controller 52)

```
/*      Operator may enter              Begin ..... End   for an ending list       */
Read Beginning Item in Input Stream from Master Control Terminal
Read Ending Item  in Input Stream from Master Control Terminal
Set Beginning Item  to Next Transaction
Set Ending Item     to End of List
Read System Clock for Begin Time
Add Record with Begin Time
IF Error then
        Message "No System Table Record for Begin Time", Details
ENDIF
<<Read Next Transaction>>
/* The Process Switches are turned ON as each transaction subcomponent is completed.  */
/* The Process Switches are turned OFF after the total transaction is completed.   */
Set Process   1 Switch = 0
Set Process   2 Switch = 0
Set Process   3 Switch = 0
Set Process   4 Switch = 0
Set Process   5 Switch = 0
Set Process   6 Switch = 0
Set Process   7 Switch = 0
Set Process   8 Switch = 0
Set Process   9 Switch = 0
Set Process 10 Switch = 0
Set Process 11 Switch = 0
Set Process 12 Switch = 0
Set Process 13 Switch = 0
Set Process 14 Switch = 0
Set Process 15 Switch = 0
Set Process 16 Switch = 0
Set Process 17 Switch = 0
Set Process 18 Switch = 0
Set Process 19 Switch = 0
Set Process 20 Switch = 0
Set Process 21 Switch = 0
Set Process 22 Switch = 0
Set Process 23 Switch = 0
Set Process 24 Switch = 0
Read Next Transaction into Working Storage
IF EOF then
        Read End Time from Systems Clock into Working Storage
        INSERT End-time, Begin Time
                Total Records Read, Number Accepts, Number Rejects
                into Summary Table
        IF Error- then
                Message "INSERT ST Table", Details
                STOP
        ENDIF
        Goto EOJ
ENDIF
IF Next Transaction = End of List
        Goto EOJ
ENDIF
Increment Total Records Read
<<Test Transaction Type>>
IF Transaction Type != ' ' then
/* Set Switches for Trade Offset and Settle Offset Processing            */
        Set Process   1 Switch = 0
        Set Process   2 Switch = 1
        Set Process   3 Switch = 1
        Set Process   4 Switch = 1
        Set Process   5 Switch = 1
        Set Process   6 Switch = 0
        Set Process   7 Switch = 1
        Set Process   8 Switch = 1
        Set Process   9 Switch = 1
        Set Process 10 Switch = 1
        Set Process 11 Switch = 0
        Set Process 12 Switch = 1
        Set Process 13 Switch = 1
        Set Process 14 Switch = 1
        Set Process 15 Switch = 1
        Set Process 16 Switch = 1
        Set Process 17 Switch = 0
        Set Process 18 Switch = 0
        Set Process 19 Switch = 1
        Set Process 20 Switch = 1
```

-continued

Pseudo-Code for the Command Processor
(Transaction Processing Controller 52)

```
            Set Process 21 Switch = 1
            Set Process 22 Switch = 1
            Set Process 23 Switch = 1
            Set Process 24 Switch = 0
ENDIF
<<Test OORR>>
IF OORR = '0' then
      *****************
            CALL N_gine EDIT
      *****************
            IF Edit Error
                    Message "Edit Error", Details
                    Goto Write Reject Table
            ENDIF
            IF Tran-Type != 'Sell'
            OR Tran-Type != 'Withdraw' then
                    INSERT into Transaction Journal Table
                    IF Error
                            Message "Insert TJ Error", Details
                            Goto Write Reject Table
                    ENDIF
                    IF Correction Data then
                            DELETE from Reject Table
                            IF Error
                                    Message "Delete Reject Error", Details
                                    Goto Write Reject Table
                            ENDIF
                    ENDIF
            ENDIF
            ********
            CALL TT              i.e., execute the algorithms in the temporary table
            ********
            IF Temporary Table Error then
                    Message "Temporary Table Error", Details
                    Goto Write Reject Table
            ENDIF
            Generate Sequence Number
ELSIF OORR = 'R'
      *****************
            CALL N_gine EDIT
      *****************
            IF Edit Error
                    Message "Edit Error", Details
                    Goto Write Reject Table
            ENDIF
            Assign Transaction Number = '000000'
            Assign LOT Number      = 1
            <<Read Next Reversal>>
            Read Transaction Journal Table for reversal number
            IF "No Transaction Exists" where LOT = 1 then
                    Message "No Transaction Exists", Details
                    Goto Write Reject Table
            ENDIF
            IF "No Transaction Exists" and LOT > 1 then
                    Goto Transaction Wrap-up
            ENDIF
            IF Previously Reversed
                    Message "Previously Reversed", Details
                    Goto Write Reject Table
            ENDIF
            INSERT Reversing Transaction" to Transaction Journal Table
            IF Error
                    Message "INSERT TJ Reversing Error", Details
                    Goto Write Reject Table
            ENDIF
            UPDATE "Reversed" Transaction
            IF Error
                    Message ""UPDATE TJ Reversed Error", Details
                    Goto Write Reject Table
            ENDIF
            Increment the LOT Number
            ********
            CALL TT              i.e., execute the algorithms in the temporary table
            ********
            IF Temporary Table Error then
                    Message "Temporary Table Error", Details
```

| Pseudo-Code for the Command Processor
(Transaction Processing Controller 52) |
|---|

```
                        Goto Write Reject Table
                ENDIF
                Goto Read Next Reversal
                Generate Sequence Number
                UPDATE "Reversed" Transaction. ALL ROWS with Reversing Data
                IF Error then
                        Message "UPDATE TL Table Reversed", Details
                        Goto Write Reject Report
                ENDIF
                UPDATE "Reversing" Transaction, ALL ROWS with Reversed Data
                IF Error then
                        Message "UPDATE TL Table Reversing", Details
                        Goto Write Reject Report
                ENDIF
        ELSE
                INSERT into Reject Table "No Originate or Reverse Code"
                IF Error then
                        Message "Insert Reject Table", Details
                        Goto Write Reject Table
                ENDIF
        ENDIF
        <<Transaction Wrap-up>>
        INSERT INTO Transaction Count Table
        Select Original-Count and Reversal Count from TC Table into Working Storage
        IFError then
                INSERT INTO TC Table, Details
                IF Error then
                        Goto Write Reject Table
                ENDIF
        ELSE
                IF      AORS = 'O' then
                        Increment Original-Count
                ELSIF   AORS = R
                        Increment Reversal-Count
                ELSE
                        Message "Invalid AORS Code". Details
                        STOP
                ENDIF
        ENDIF
        <<Test Trade Settlement>>
        IF      Transaction Switch = 2
                Goto Loop Next Transaction
        ENDIF
        IF      Transaction Switch = 1
        OR      AORS = ' ' then
                Goto Loop Next Transaction
        ENDIF
        /* COMMIT Work to Database          */
        COMMIT Original Transaction Before Offset Transaction
        IF      AORS = 'A' then
                Insert Licensee Trade Offset Buy in Transaction Identifier
        ELSIF   AORS = 'S'
                Insert Licensee Trade Offset Sell in Transaction Identifier
        ELSE
                Message "Invalid AORS", Details
        ENDIF
        /* Swap Account Numbers for Automatic Transaction    */
        Move Account Number to Working Storage Account Number
        Move Buyer/Seller Number to Account Number
        Move Working Storage Account Number to Account Number
        Multiply the Net Amount by   -1
        Multiply the Amount Units by -1
        Add Number of Settlement Days from Entity Master to Trade Date to determine Settlement Date
        Add to Total Number of Accepts
        UPDATE Row in System Table for Number of Accepts
        IF Error then
                Message "Update Error for Accepts", Details
                Goto Write Reject Record
        ENDIF
        Go to Test Transaction Type
        <<Loop Next Transaction>>
        /* COMMIT Work to Database          */
        COMMIT Original Transaction or Offset Transaction, if any
        Goto Read Next Transaction
        <<Write Reject Record>>
        Add to Total Number of Rejects
```

| Pseudo-Code for the Command Processor |
| --- |
| (Transaction Processing Controller 52) |
| UPDATE Row in System Table for Number of Rejects |
| IF Error then |
|     Message "Update Error for Rejects", Details |
| ENDIF |
| INSERT Into Reject Table, Details |
| IF Error |
|     Message "Insert Command Reject Table", Details |
|     STOP |
| ENDIF |
| Move Incoming Licensee Identifier to Stored Licensee Identifier |
| Move Incoming Account Identifier to Stored Account Identifier |
| Move Incoming Transaction Identifier to Stored Transaction Identifier |
| Move Incoming Entity Identifier to Stored Entity Identifier |
| Goto Read Next Transaction |
| <<EOJ>> |
| Read System Clock for End Time |
| Add Record with End Time |
| IF Error then |
|     Message "No System Table Record for End Time", Details |
| ENDIF |
| END |

Figure 7A:
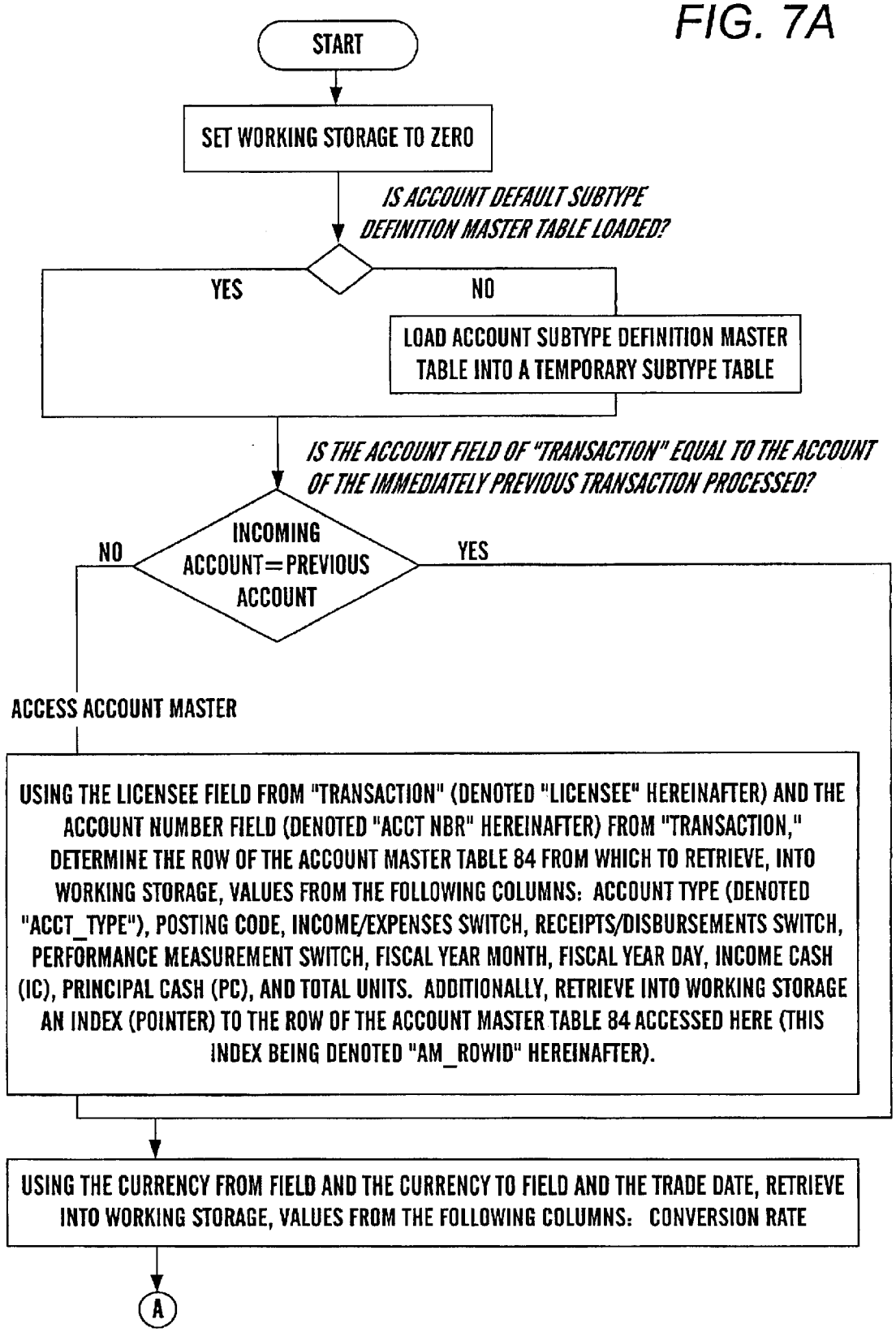
FIGS. 7-A through 7-D show the high level steps performed by an embodiment of the preprocessor and decomposer 54 of FIG. 2A.
Figure 7B:
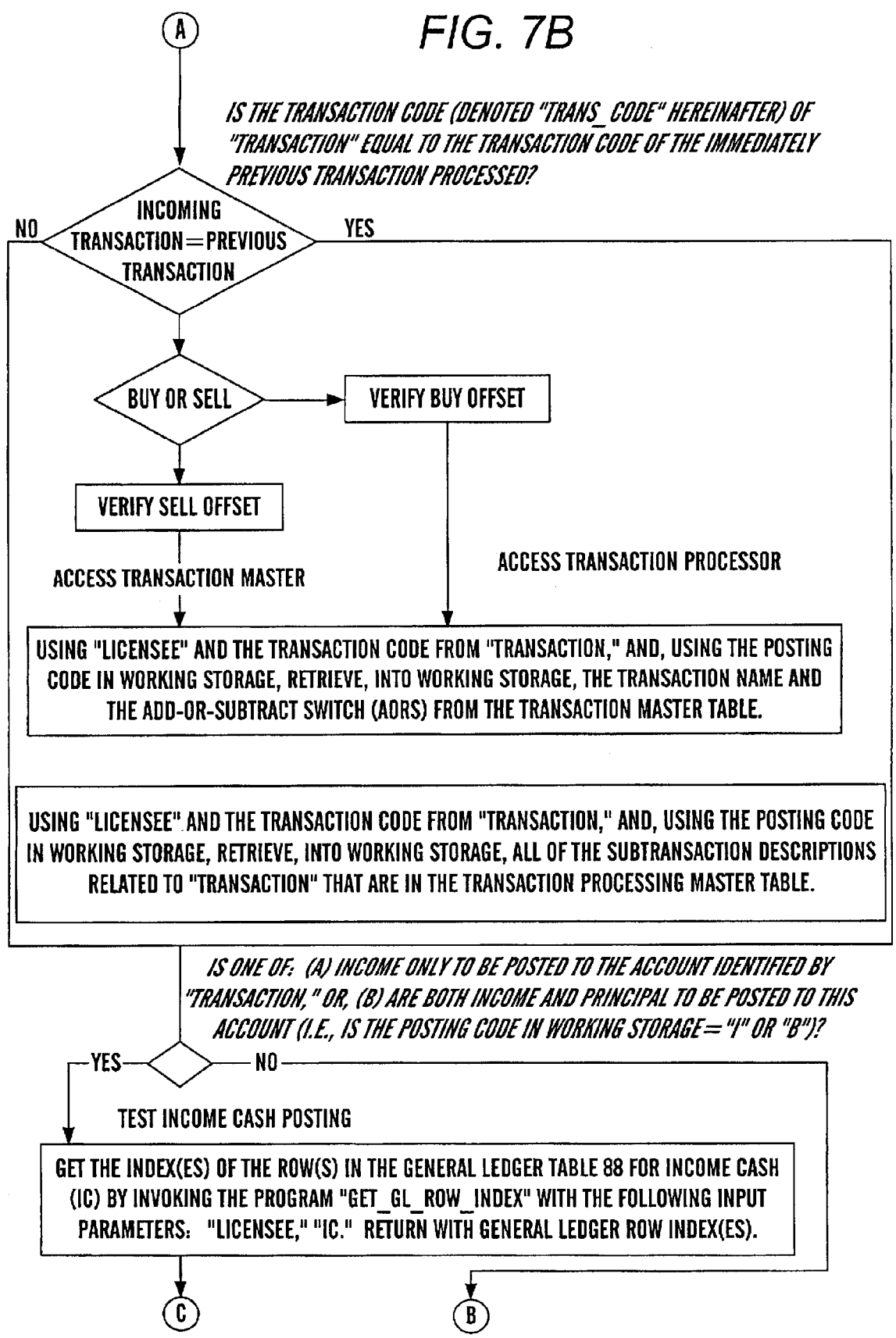
Figure 7C:
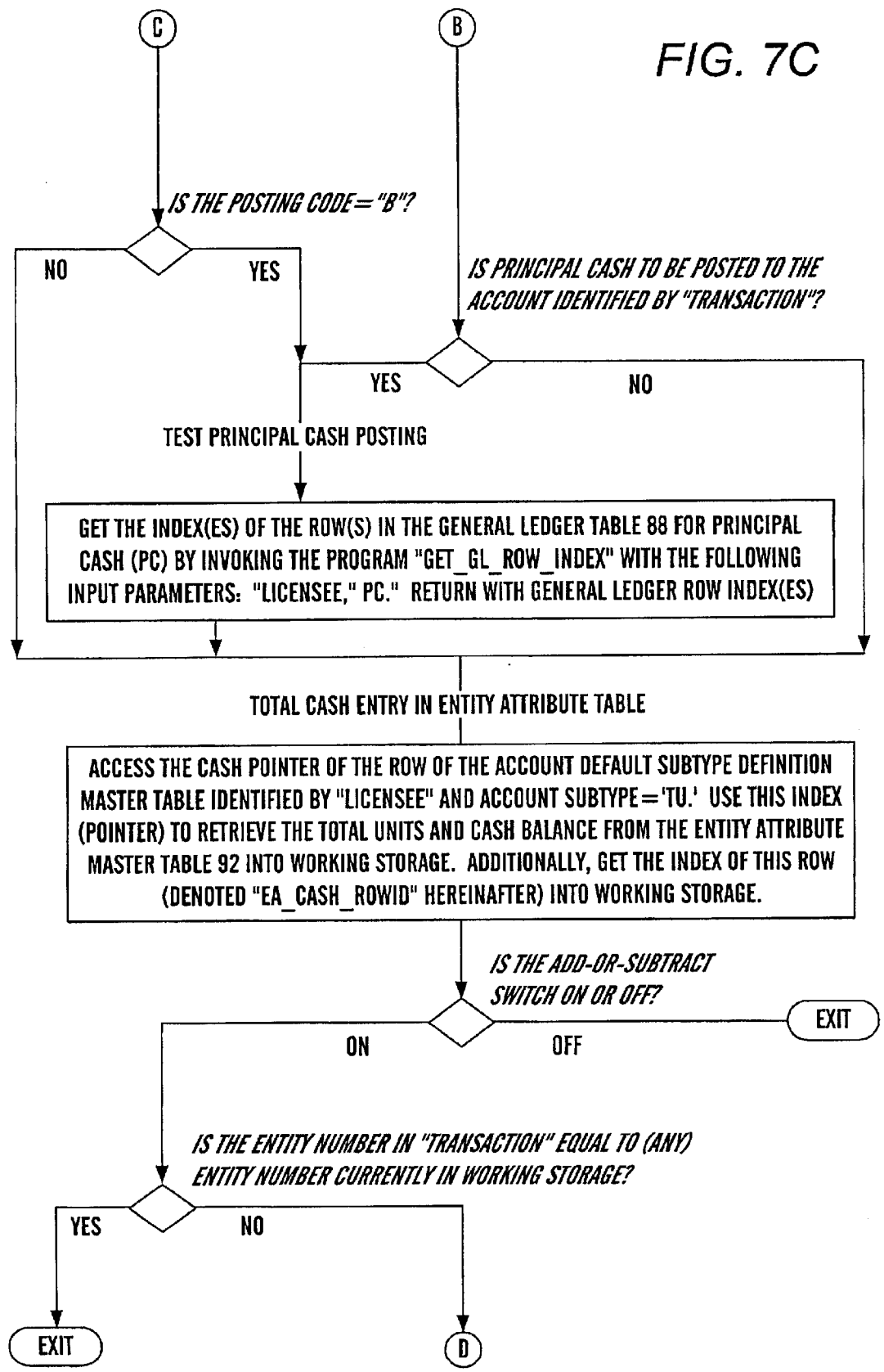
Figure 8B:
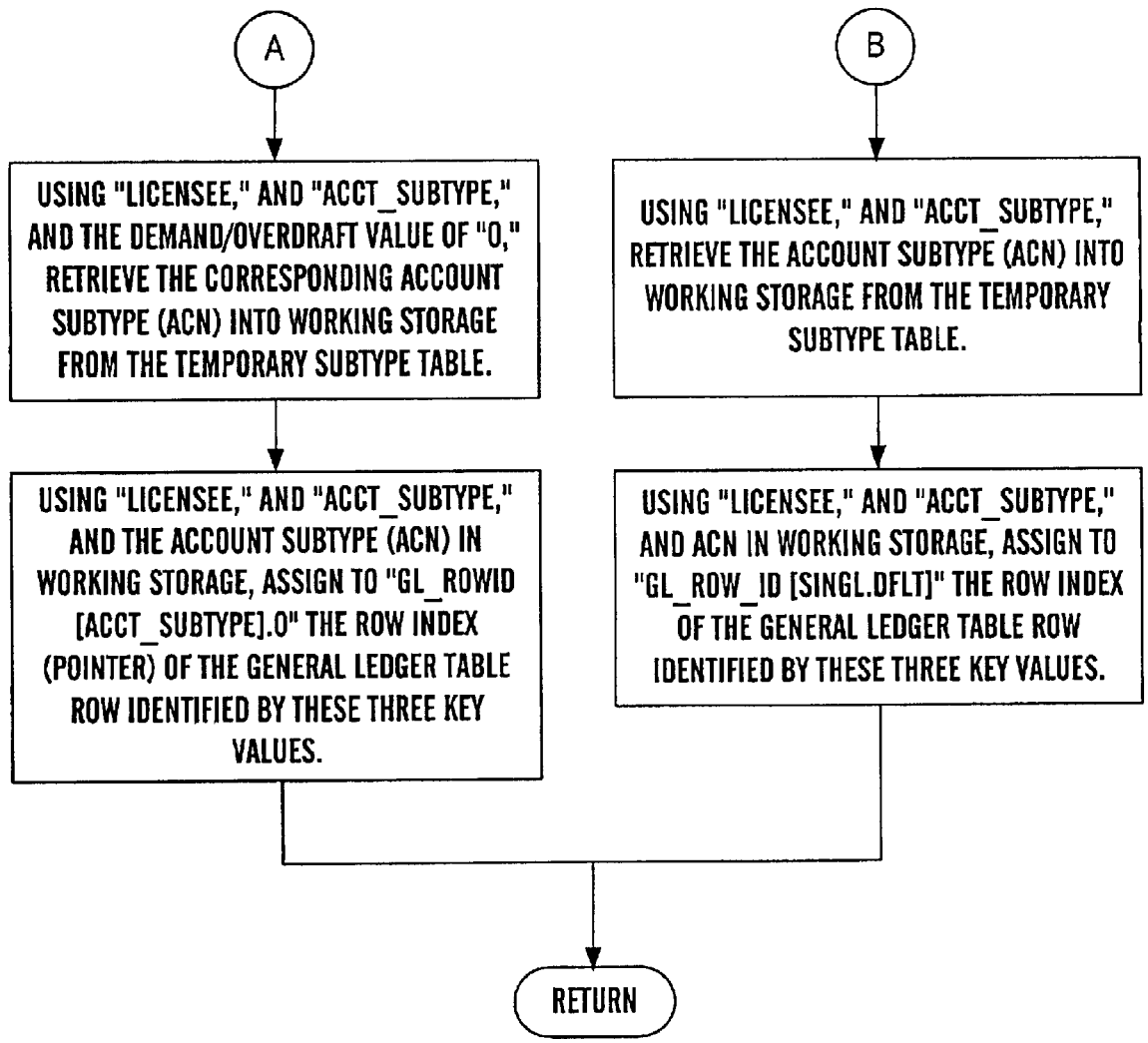
FIGS. 8-A and 8-B show the steps of a flowchart for obtaining indexes or pointers to particular rows of a general ledger table wherein the rows are used in processing a transaction.

A first embodiment of the transaction preprocessor and decomposer 54 is provided in the flowcharts of FIGS. 7-A through 7-D and FIGS. 8-A and 8-B. Note that for simplicity, error handling and related validity check steps have been omitted. However, the performance of such steps is within the scope of the present invention, as one skilled in the art will appreciate.

A second pseudo-code embodiment of the transaction preprocessor and decomposer 54 follows.

| Pseudo-Code for the Edit Processor for |
| --- |
| all Incoming Transactions |
| (Transaction Preprocessor and Decomposer 54) |
| BEGIN |
|     Housekeeping |
|         Set Working Storage Alphas to Blanks |
|         Set Working Storage Numbers to Zeroes |
|     IF Incoming Licensee Identifier = Stored Licensee Identifier then |
|         Using Licensee Identifier from Input String, retrieve |
|             Licensee Name |
|             Trade Settlement Switch |
|             Trade Offset Buy |
|             Trade Offset Sell |
|             from Licensee Master into Working Storage |
|         IF Error then |
|             Message "No Licensee Master", Detail |
|             Goto EOJ |
|         ENDIF |
|     ENDIF |
|     /*********************************************/ |
|     IF    the Default Definition Table has not been loaded to memory then |
|         LOAD all records from the Default Definition Table consisting of |
|             Licensee |
|             DD Class |
|             DD Identification |
|             DD Sub-Class |
|             DD Accounting Control Number |
|             DD Name |
|                 from the Default Definition Table |
|                 into the Temporary Table (TA) |
|         IF Error then |
|             Message "NO TA Table", Details |
|             Goto EOJ |
|         ENDIF |
|     ENDIF |
|     /*********************************************/ |
|     IF the Incoming Account Identifier = Stored Account Identifier |
|         Goto Access Transaction Master (TM) |
|     ELSE |
|         /*** This is the first table containing control totals for cash, units, and cost basis ***/ |

-continued

Pseudo-Code for the Edit Processor for
all Incoming Transactions
(Transaction Preprocessor and Decomposer 54)

```
        <<Access Account Master>>
        From the Account Master Table (TM)
        using the Licensee Identifier from the Input String
          and the Account Identifier from the Input String, retrieve
                Account Type
                Income Posting Code
                Income/Expense Switch
                Receipt/Disbursement Switch
                Performance Measurement Switch
                Fiscal Year - Month
                Fiscal Year - Day
                Fiscal Year - Number Periods
                Income Cash Balance
                Principal Cash Balance
                Invested Income
                Invested Principal
                Total Units - Assets
                Liabilities
                Total Units - Liabilities
                and the Row Identification of the Account Master Record
                        from the Account Master Table (AM) into Working Storage
        IF Error then
                Report "Invalid Account Identifier", Details
                Goto Write Reject Report
        ENDIF
ENDIF
<<Access Transaction Master>>
IF      the Incoming Transaction Identifier = Stored Transaction Identifier
        Goto Test Cash Entry in Entity Attribute Table
ELSE
        Using the Licensee Identifier from the Input String
          and the Transaction Identifier from the Input String
                Transaction Name
                Add or Subtract Switch
                Settlement Switch
                and the Row Identification
                        from the Transaction Master Table (TM) into Working Storage
        IF Error then
                Message "Invalid Transaction Identifier", Details
                Goto Write Reject Report
        ENDIF
        IF AORS = 'A' then
                Using the Licensee Identifier from the input String
                  and the Trade Offset Buy from Working Storage, verify
                  the existence of a Trade Offset Buy in the TM Table
                IF Error then
                        Message "No Trade Offst Buy", Details
                        Goto Write Reject Table
                ENDIF
        ELSE AORS = 'S' then
                Using the License Identifier from the Input String
                  and the Trade Offset Sell from Working Storage, verify
                  the existence of a Trade Offset Sell in the TM Table.
                IF Error then
                        Message "No Trade Offset Sell", Details
                        Goto Write Reject Table
                ENDIF
        ELSE
                Message "Invalid AORS Code", Details
                Goto Write Reject Report
        ENDIF
        <<Access Transaction Processing Table (TP)>>
        Using the Licensee Identifier from the Input String
          and the Transaction Identifier from the Input String, retrieve
                ALL of the Transaction Processing algorithms
                from the Transaction Processing Table (TP)
                into a Temporary Table (TT) in Working Storage
        IF Error then
                Message "No Transaction Processing Algorithms", Details
                Goto Write Reject Report
        ENDIF
        /*** This is the second control table containing cash, units, cost basis, liabilities, etc. ***/
        <<Test Income Cash Posting Controls>>
        IF  the Working Storage income Posting Code = 'I'
        OR  the Working Storage Income Posting Code = 'B' then
```

-continued

Pseudo-Code for the Edit Processor for
all Incoming Transactions
(Transaction Preprocessor and Decomposer 54)

```
            Count the number of IC entries in the TA table
            <<Test Income Cash>>
            IF count = 1 then
                    Using Licensee Identifier from the Input String
                    and the Class = 'IC'
                    and the Sub-Class = " retrieve
                            Accounting Control Number from TA into Working Storage
                    IF Error then
                            Message "Invalid Income Cash ACN", Details
                            Goto Write Reject Record
                    ENDIF
                    Using the Licensee Identifier from the Input String
                     and the Accounting Control Number in Working Storage, retrieve
                     Accounting Control Number
                            and the Row Identification from General Ledger Table (SG)
                    IF Error then
                            Message "Invalid Income Cash on SG", Details
                            Goto Write Reject Report
                    ENDIF
            ELSIF count = 2 then
                    Using the Licensee Identifier from the Input String
                    and the Class = 'IC'
                    and the Sub-class = 'D', retrieve
                            Accounting Control Number from TA into Working Storage
                    IF Error then
                            Message "Invalid Income Cash Demand ACN in TA", Details
                            Goto Write Reject Report
                    ENDIF
                    Using the Licensee Identifier from the Input String
                    and the Accounting Control Number in Working Storage, retrieve
                            Accounting Control Number
                            and the Row Identification from the General Ledger
                    IF Error then
                            Message "Invalid Income Cash Demand in GL", Details
                            Goto Write Reject Report
                    ENDIF
                    Using the Licensee Identifier from the Input String
                     and the Class    = 'IC'
                     and the Sub-class = 'O', retrieve
                     Accounting Control Number from TA table into Working Storage
                    IF Error then
                            Message "Invalid Income Cash Overdraft ACN in TA",
                                            Details
                            Goto Write Reject Report
                    ENDIF
                    Using the Licensee Identifier from the Input String
                    and the Accounting Control Number in Working Storage, retrieve
                            Accounting Control Number
                            and the Row Identification from the General Ledger
                    IF Error then
                            Message "Invalid Income Cash Overdraft in GL", Details
                            Goto Write Reject Report
                    ENDIF
            ELSE
                    Message "Invalid Income Cash Count on DD", Details
                    Goto Write Reject Record
            ENDIF
    <<Test Principal Cash Posting Controls>>
    ELSIF   the Working Storage Income Posting Code = 'P'
            Count the number of PC entries in the TA table
            <<Test Principal Cash>>
            IF count = 1 then
                    Using the Licensee Identifier from the Input String
                     and the Class = 'P'
                     and the Sub-Class = ' ' retrieve
                            Accounting Control Number from TA into Working Storage
                    IF Error then
                            Message "Invalid Principal Cash ACN", Details
                            Goto Write Reject Record
                    ENDIF
                    Using the Licensee Identifier from the Input String
                     and the Accounting Control Number in Working Storage, retrieve
                     Accounting Control Number
                            and the Row Identification from General Ledger Table (SG)
                    IF Error then
```

-continued

Pseudo-Code for the Edit Processor for
all Incoming Transactions
(Transaction Preprocessor and Decomposer 54)

```
                        Message "Invalid Principal Cash on SG", Details
                        Goto Write Reject Report
                ENDIF
        ELSIF count = 2 then
                Using the Licensee Identifier from the Input String
                and the Class    = 'PC'
                and the Sub-class = 'D', retrieve
                        Accounting Control Number from TA into Working Storage
                IF Error then
                        Message "Invalid Principal Cash Demand ACN in TA",
                                        Details
                        Goto Write Reject Report
                ENDIF
                Using the Licensee Identifier from the Input String
                and the Accounting Control Number in Working Storage, retrieve
                        Accounting Control Number
                        and the Row Identification from the General Ledger
                IF Error then
                        Message "Invalid Principal Cash Demand in GL", Details
                        Goto Write Reject Report
                ENDIF
                Using the Licensee Identifier from the Input String
                and the Class    = 'PC'
                and the Sub-class = 'O', retrieve
                Accounting Control Number from TA table into Working Storage
                IF Error then
                        Message "Invalid Principal Cash Overdraft ACN in TA",
                                        Details
                        Goto Write Reject Report
                ENDIF
                Using the Licensee Identifier from the Input String
                 and the Accounting Control Number in Working Storage, retrieve
                        Accounting Control Number
                        and the Row Identification from the General Ledger
                IF Error then
                        Message "Invalid Principal Cash Overdraft in GL", Details
                        Goto Write Reject Report
                ENDIF
        ELSE
                Message "Invalid Principal Cash Count on DD", Details
                Goto Write Reject Record
        ENDIF
    ELSE
        Message "Invalid Posting Code", Details
        Goto Write Reject Report
    ENDIF
ENDIF
<<Test Cash Entry in Entity Attribute Table>>
Using the Licensee Identifier from the Input String
 and the Account Control Number from the TU Record in Working Storage, retrieve
        The Total Units - Assets
        and the Row Identifier from the Entity Attribute Table (EA)
IF Error then
        Message "Invalid Total Units", Details
        Goto Write Reject Table
ENDIF
<<Test Asset/Liability Processing>>
IF Working Storage Add or Subtract Switch (AORS) is OFF then
        Goto EOJ
ENDIF
IF Incoming Entity Identifier = Stored Entity Identifier then
        Goto EOJ
ENDIF
/*** This is the third table containing control table for cash, units, cost basis, liabilities, etc. ***/
<<Access Entity Attribute Table (EA)>>
        Using the Licensee Identifier from the Input String
        and the Entity Identifier from the Input String, retrieve
                Accounting Control Number (Asset)
                Accounting Control Number (Liability)
                Diversification Type
                Diversification Group
                Diversification Class
                Invested Income Balance
                Invested Principal Balance
                Total Units - Assets
```

-continued

Pseudo-Code for the Edit Processor for
all Incoming Transactions
(Transaction Preprocessor and Decomposer 54)

Total Units - Liabilities
    and the Row Identification of the Entity Attribute Record
      from the Entity Attribute Table (EA) into Working Storage
  IF Error then
    Message "Invalid Entity Identifier in EA", Details
    Goto Write Reject Table
  ENDIF
<<Access the Entity Transaction Table (ET)>>
  Using the Licensee Identifier from the Input String
  and the Entity Identifier from the Input String, verify
    the existence of an acceptable transaction
    in the Entity Transaction Table (ET) for the Entity Identifier.
  IF Error then
    Message "Invalid Transaction for this Entity", Details
    Goto Write Reject Table
  ENDIF
  <<Access the Entity Master Table (EM)>>
  Using the Entity Identifier from the Input String, retrieve
    Income Rate
    Income Ex-Date
    Income Record Date
    Income Payment Date
    Cap-Adj Rate
    Cap-Adj Ex-Date
    Cap-Adj Record Date
    Cap-Adj Payment Date
    Settlement Days
    Current Price
      from the Entity Master Table (EM) into Working Storage
  IF Error then
    Message "No Entity Master", Details
    Goto Write Reject Report
  ENDIF
<<Test Other Assets>>
  Using the Licensee Identifier from the Input String
  and the Account Type from Working Storage
  and the Accounting Control Number - Asset from Working Storage, retrieve
    the Accounting Control Number - Asset
    and Row Identifier from the General Ledger (SG)
  IF Error then
    Message "Invalid ACN - Asset", Details
    Goto Write Reject Report
  ENDIF
<<Test Other Liabiities>>
  Using the Licensee Identifier from the Input String
  and the Account Type from Working Storage
  and the Accounting Control Number - Liability from Working Storage, retrieve
    the Accounting Control Number - Liability
    and Row Identifier from the General Ledger (SG)
  IF Error then
    Message "Invalid ACN - Liabilities", Details
    Goto Write Reject Report
  ENDIF
<<Test Invested Income>>
  Using the Licensee Identifier from the Input String
  and the Account Type Code from Working Storage
  and the Invested Income Identifier from Working Storage, retrieve
    the Invested Income Balance
    and the Row Identifier from the General Ledger Table (SG)
  IF Error then
    Message "Invalid Invested Income"
    Goto Write Reject Table
  ENDIF
<<Test Invested Principal>>
  Using the Licensee Identifier from the Input String
  and the Account Type Code from Working Storage
  and the Invested Principal Identifier from Working Storage, retrieve
    the Invested Principal Balance
    and the Row Identifier from the General Ledger Table (SG)
  IF Error then
    Message "Invalid Invested Principal"
    Goto Write Reject Table
  ENDIF
  Goto EOJ
<<Write Reject Table>>

-continued

**Pseudo-Code for the Edit Processor for
all Incoming Transactions
(Transaction Preprocessor and Decomposer 54)**

```
            Add to Reject Table
            IF Error then
                    Message "Invalid Insert to Reject Table", Details
                    STOP
            ENDIF
    <<EOJ>>
            Null
END
```

**Pseudo-Code for the SCHEDULER
(Subtransaction Scheduler 62)**

```
BEGIN
    <<Read Next Process>>
    Read Next Transaction in Temporary Table (TT)
            IF EOJ then
                    <<Test All Switches - AORL>>
                    IF      All 18 Process Switches = 0
                            Goto EOJ
                    ENDIF
                    Wait 10 milliseconds
                    Goto Test All Switches - AORL
            ENDIF
    <<Test Processor Availability>>
    IF Processor 1 Switch = 0 then
            Set Processor 1 Switch = 1
            Initiate Process on Processor 1        @ end, Set Processor 1 Switch = 0
            Goto Next Process Loop
    ENDIF
    IF License Master (LM) Number of Processors = 1 then
            <<Test 1 Processor>>
            IF Processor 1 Switch = 1 then
                    Wait 10 Milliseconds
                    Goto Test 1 Processor
            ENDIF
            Goto Test Processor Availability
    ENDIF
    IF Processor 2 Switch = 0 then
            Set Processor 2 Switch = 1
            Initiate Process on Processor 2        @ end, Set Processor 2 Switch = 0
            Goto Next Process Loop
    ENDIF
    IF License Master (LM) Number of Processors = 2 then
            <<Test 2 Processors Busy>>
            IF      Processor 1 Switch = 1
            AND     Processor 2 Switch = 1 then
                    Wait 10 milliseconds
                    Goto Test 2 Processors Busy
            ENDIF
            Goto Test Processor Availability
    ENDIF
    IF Processor 3 Switch = 0 then
            Set Processor 3 Switch = 1
            Initiate Process on Processor 3        @ end, Set Processor 3 Switch = 0
            Goto Next Process Loop
    ENDIF
    IF Processor 4 Switch = 0 then
            Set Processor 4 Switch = 1
            Initiate Process on Processor 4        @end, Set Processor 4 Switch = 0
            Goto Next Process Loop
    ENDIF
    IF License Master (LM) Number of Processors = 4 then
            <<Test 4 Processors Busy>>
            IF      Processor 1 Switch = 1
            AND     Processor 2 Switch = 1
            AND     Processor 3 Switch = 1
            AND     Processor 4 Switch = 1 then
                    Wait 10 milliseconds
                    Goto Test 4 Processors Busy
            ENDIF
```

-continued

Pseudo-Code for the SCHEDULER
(Subtransaction Scheduler 62)

```
            Goto Test Processor Availability
    ENDIF
    IF Processor 5 Switch = 0 then
            Set Processor 5 Switch = 1
            Initiate Process on Processor 5      @ end, Set Processor 5 Switch = 0
            Goto Next Process Loop
    ENDIF
                                                 IF Processor 6 Switch = 0 then
            Set Processor 6 Switch = 1
            Initiate Process on Processor 6 @end, Set Processor 6 Switch = 0
            Goto Next Process Loop
    ENDIF
    IF Processor 7 Switch = 0 then
            Set Processor 7 Switch = 1
            Initiate Process on Processor 7      @end, Set Processor Switch 7 = 0
            Goto Next Process Loop
    ENDIF
    IF Processor 8 Switch = 0 then
            Set Processor 8 Switch = 1
            Initiate Process on Processor 8      @end, Set Processor 8 Switch = 0
            Goto Next Process Loop
    ENDIF
    IF Licensee Master (LM) Number of Processors = 8 then
            <<Test 8 Processors Busy>>
            IF      Processor 1 Switch = 1
            AND     Processor 2 Switch = 1
            AND     Processor 3 Switch = 1
            AND     Processor 4 Switch = 1
            AND     Processor 5 Switch = 1
            AND     Processor 6 Switch = 1
            AND     Processor 7 Switch = 1
            AND     Processor 8 Switch = 1 then
                    Wait 10 milliseconds
                    Goto Test 8 Processors Busy
            ENDIF
            Goto Test Processor Availability
    ENDIF
    <<Next Process Loop>>
            Goto Read Next Process
    <<EOJ>>
    Null
END
```

Process the Controls Process Routine
in the Temporary Table (TT)

```
BEGIN
        IF OORR = "O" then
                Set Factor =+ 1
        ELSIF OORR = 'R' then
                SetFactor = −1
        ENDIF
        <<Total Units>>
        IF      Operand2 = 'TU' then
                (AMU)   Process AM         Units
                (EAU)   Process EA         Units
                (PMU)   Process PM         Units
        <<Cash Balances>>
        ELSIF   Operand 2 = 'IC'
        OR      Operand 2 = 'PC' then
                (AMC)   Process AM         Income Cash Demand
                                           Income Cash Overdraft
                                           Principal Cash Demand
                                           Principal Cash Overdraft
                (EAC)   Process EA         Income Cash
                                           Principal Cash
                (GLC)   Process GL         Assets - Income Cash Demand
                                           Assets - Income Cash Overdraft
                                           Assets - Principal Cash Demand
                                           Assets - Principal Cash Overdraft
```

| Process the Controls Process Routine in the Temporary Table (TT) |
| --- |

|  |  |  | Liab - Income Net Worth |
|---|---|---|---|
|  |  |  | Liab - Principal Net Worth |
| <<Investment Balances>> | | | |
| ELSIF | Operand 2 = 'II' | | |
| OR | Operand2= : 'IP' then | | |
|  | (AMI) | Process AM | Invested Income |
|  |  |  | Invested Principal |
|  | (EAI) | Process EA | Cost |
|  | (GLI) | Process GL | Assets - Actg Control Number |
|  |  |  | Liab - Income Net Worth |
|  |  |  | Liab - Principal Net Worth |
| <<Other Customized Investment Reporting>> | | | |
| ELSIF | Operand 2 = 'I' and Report Request = 'Y' | | |
| OR | Operand 2 = 'E' and Report Request = 'Y' then | | |
|  | (IEE) | Process IE | |
|  | (PME) | Process PM | |
| <<Receipts/Disbursements>> | | | |
| ELSIF | Operand 2 = 'R' and Report Request = 'Y' | | |
| OR | Operand 2 = 'D' and Report Request = 'Y' then | | |
|  | (IEC) | Process RD | |
|  | (PMC) | Process PM | |
| <<Performance Measurement>> | | | |
| ELSIF | Operand 2 = 'PM' and Report Request = 'Y' then | | |
|  | (PMP) | Process PM | |
| <<Contributions/Distributions>> | | | |
| ELSIF | Operand 2 = 'CN' and Report Request = 'Y' | | |
| OR | Operand 2 = 'DN' and Report Request = 'Y' then | | |
|  | (CDC) | Process PM | |
| <<Management Fees>> | | | |
| ELSIF | Operand 2 = 'MF' and Report Request = 'F' then | | |
|  | (PMM) | Process PM | |
| <<Commissions>> | | | |
| ELSIF | Operand 2 = 'CM' then | | |
|  | (PCM) | Process PM | |
| <<Federal Taxes>> | | | |
| ELSIF | Operand 2 = 'FT' then | | |
|  | (PMF) | Process PM | |
| <<State Taxes>> | | | |
| ELSIF | Operand 2 = 'ST' then | | |
|  | (PMS) | Process PM | |
|  | ELSE | | |
|  |  | Message "Invalid Operand 2" | |
|  |  | STOP | |
|  | ENDIF | | |
| END | | | |

Process the Detail Records Maintenance Routine (AORS)
Note: Leave all switches=1 until the last routine is completed. This forces the processing to loop through each succeeding routine until completed. Then turn set all switches=0 so that the Scheduler will revert back to the Command Program to read another transaction.

| <<Originate ADD>> | |
|---|---|
| II OORR = 'O' and | |
| AORS = 'A' then | |
| IF | Process 1 Switch = 0 then |
|  | Set Process 1 Switch = 1 |
|  | Initiate Process BS |
| ELSIF | Process 2 Switch = 0 then |
|  | Set Process 2 Switch = 1 |
|  | Initiate Process PI/PA |
| ELSIF | Process 3 Switch = 0 then |
|  | Set Process 3 Switch = 1 |
|  | Initiate Process TS |
| ELSIF | Process 4 Switch = 0 then |
|  | Set Process 4 Switch = 1 |
|  | Initiate Process PM |
| ELSE | |
|  | Set Process 1 Switch = 0 |

-continued

|  | Set Process 2 Switch = 0 |
|---|---|
|  | Set Process 3 Switch = 0 |
|  | Set Process 4 Switch = 0 |
| ENDIF | |
| <<Reverse ADD>> | |
| ELSIF OORR = 'R' and | |
| AORS = 'A' then | |
| IF | Process 5 Switch = 0 then |
|  | Set Process S Switch = 1 |
|  | Initiate Process BS |
| ELSIF | Process 6 Switch = 0 then |
|  | Set Process 6 Switch = 1 |
|  | Initiate Process PI/PA |
| ELSIF | Process 7 Switch = 0 then |
|  | Set Process 7 Switch = 1 |
|  | Initiate Process TS |
| ELSIF | Process 8 Switch 0 then |
|  | Set Process 8 Switch = 1 |
|  | Initiate Process PM |
| ELSE | |
|  | Set Process 5 Switch = 0 |
|  | Set Process 6 Switch = 0 |
|  | Set Process 7 Switch = 0 |
|  | Set Process 8 Switch = 0 |

-continued

```
            ENDIF
<<Originate SUB>>
ELSIF OORR = 'O' and
AORS = 'S' then
    IF              Process 9 Switch = 0 then
                    Set Process 9 Switch = 1
                    Initiate Process BS
    ELSIF           Process 10 Switch = 0 then
                    Set Process 10 Switch = 1
                    Initiate Process PI/PA
    ELSIF           Process 11 Switch = 0 then
                    Set Process 11 Switch = 1
                    Initiate Process TS
    ELSIF           Process 12 Switch = 0 then
                    Set Process 12 Switch = 1
                    Initiate Process CG
    ELSIF           Process 13 Switch = 0 then
                    Set Process 13 Switch = 1
                    Initiate Process PM
    ELSE
                    Set Process 9 Switch = 0
                    Set Process 10 Switch = 0
                    Set Process 11 Switch = 0
                    Set Process 12 Switch = 0
                    Set Process 13 Switch = 0
    ENDIF
<<Reverse SUB>>
ELSIF OORR = 'R' and
AORS = 'S' then
    IF              Process 14 Switch = 0 then
                    Set Process 14 Switch = 1
                    Initiate Process BS
```

-continued

```
    ELSIF           Process 15 Switch = 0 then
                    Set Process 15 Switch = 1
                    Initiate Process PI/PA
    ELSIF           Process 16 Switch = 0 then
                    Set Process 16 Switch = 1
                    Initiate Process TS
    ELSIF           Process 17 Switch = 0 then
                    Set Process 17 Switch = 1
                    Initiate Process CG
    ELSIF           Process 18 Switch = 0 then
                    Set Process 18 Switch = 1
                    Initiate Process PM
    ELSE
                    Set Process 14 Switch = 0
                    Set Process 15 Switch = 0
                    Set Process 16 Switch = 0
                    Set Process 17 Switch = 0
                    Set Process 18 Switch = 0
    ENDIF
ENDIF
```

Figure 9A:
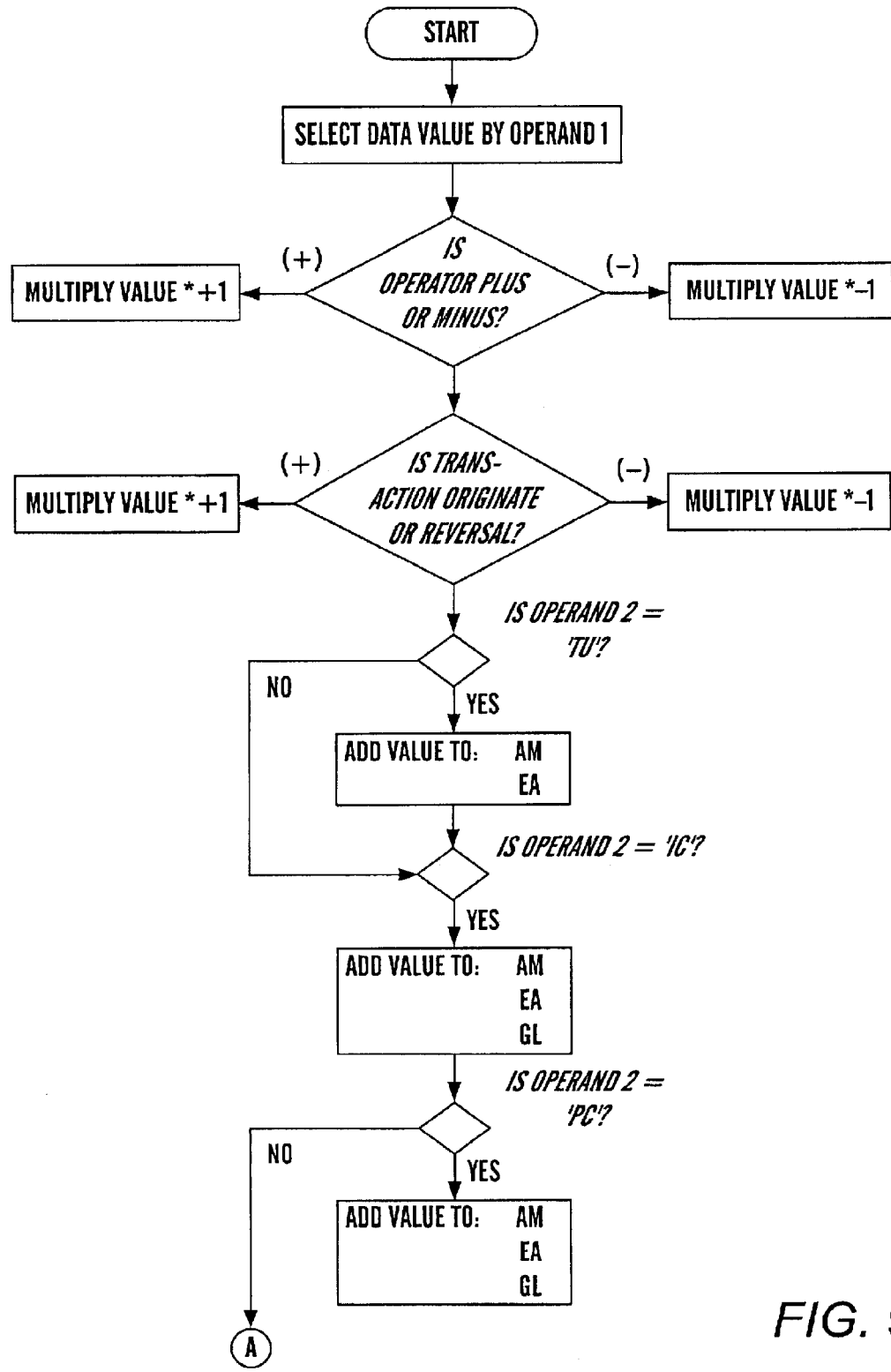
FIGS. 9-A and 9-B show the steps for a flowchart of an embodiment of the subtransaction processing module 64 (FIG. 2A).
Figure 9B:
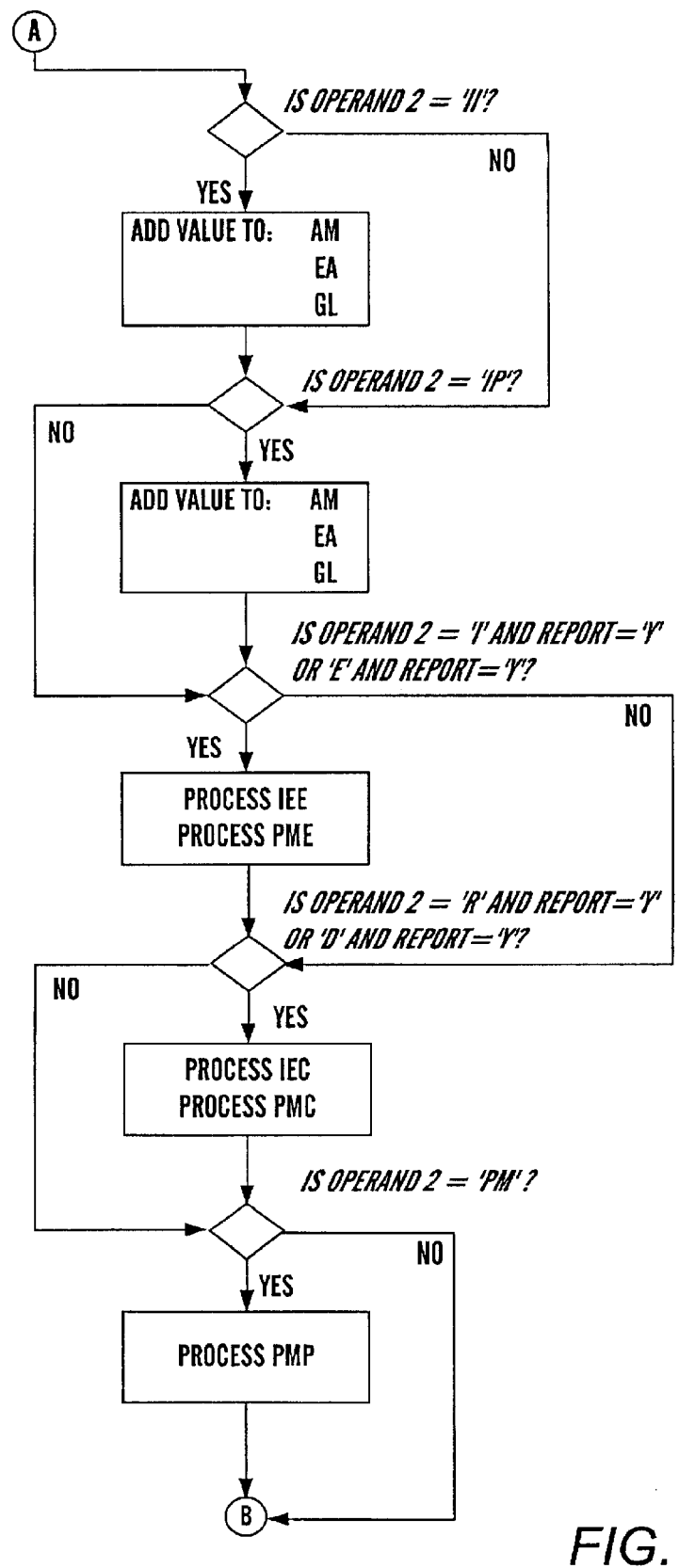
Figure 9C:
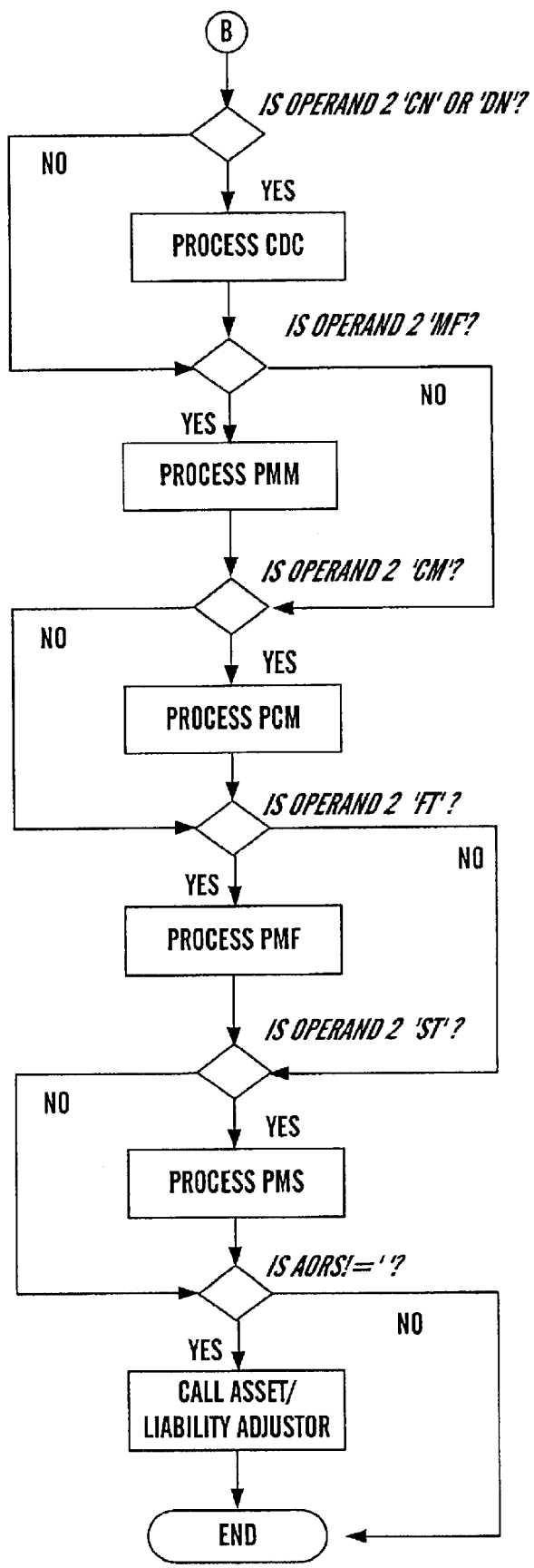
Figure 10A:
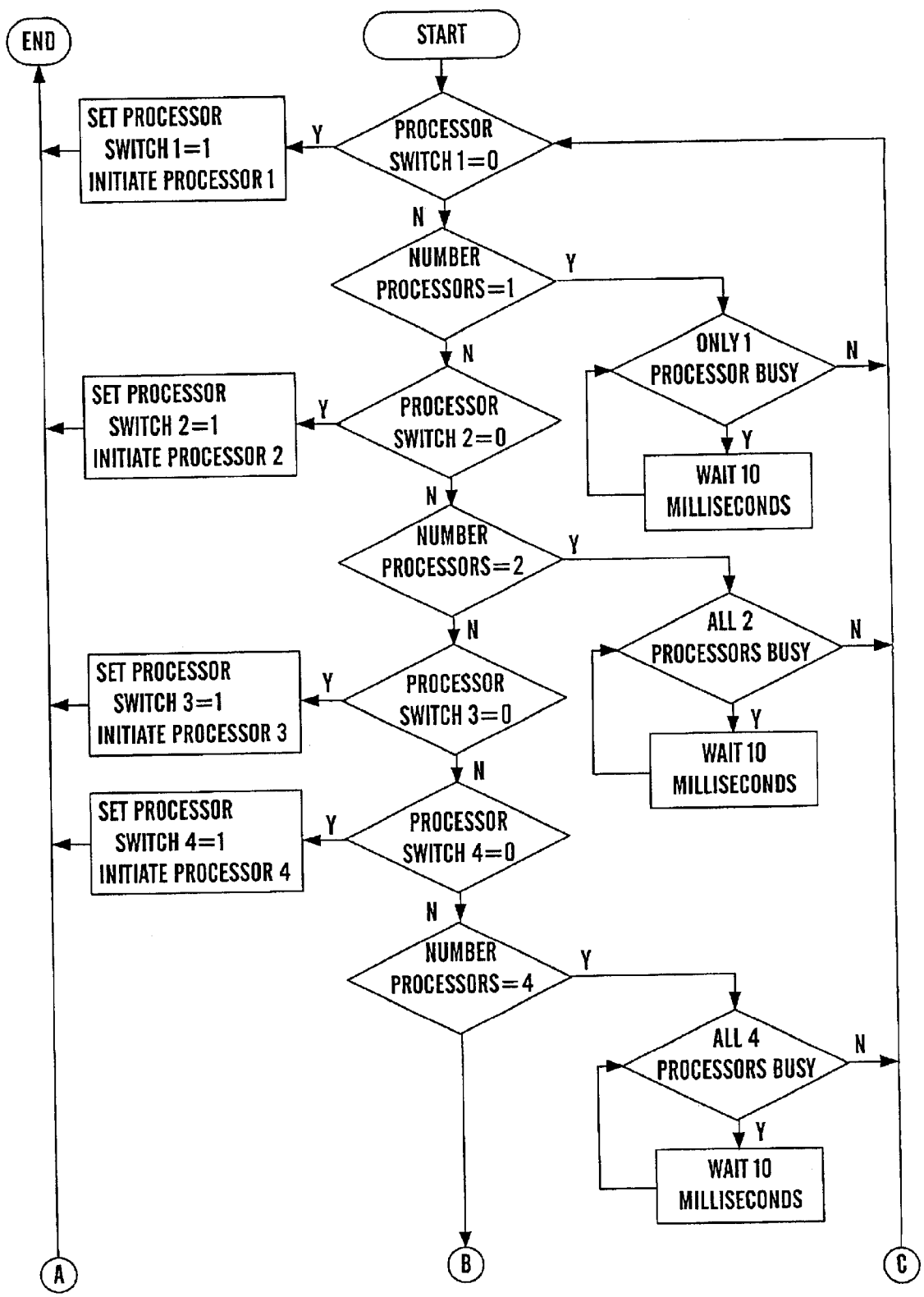
FIGS. 10A–10B show a flowchart of the steps performed for processing income cash transactions by the present invention.
Figure 10B:
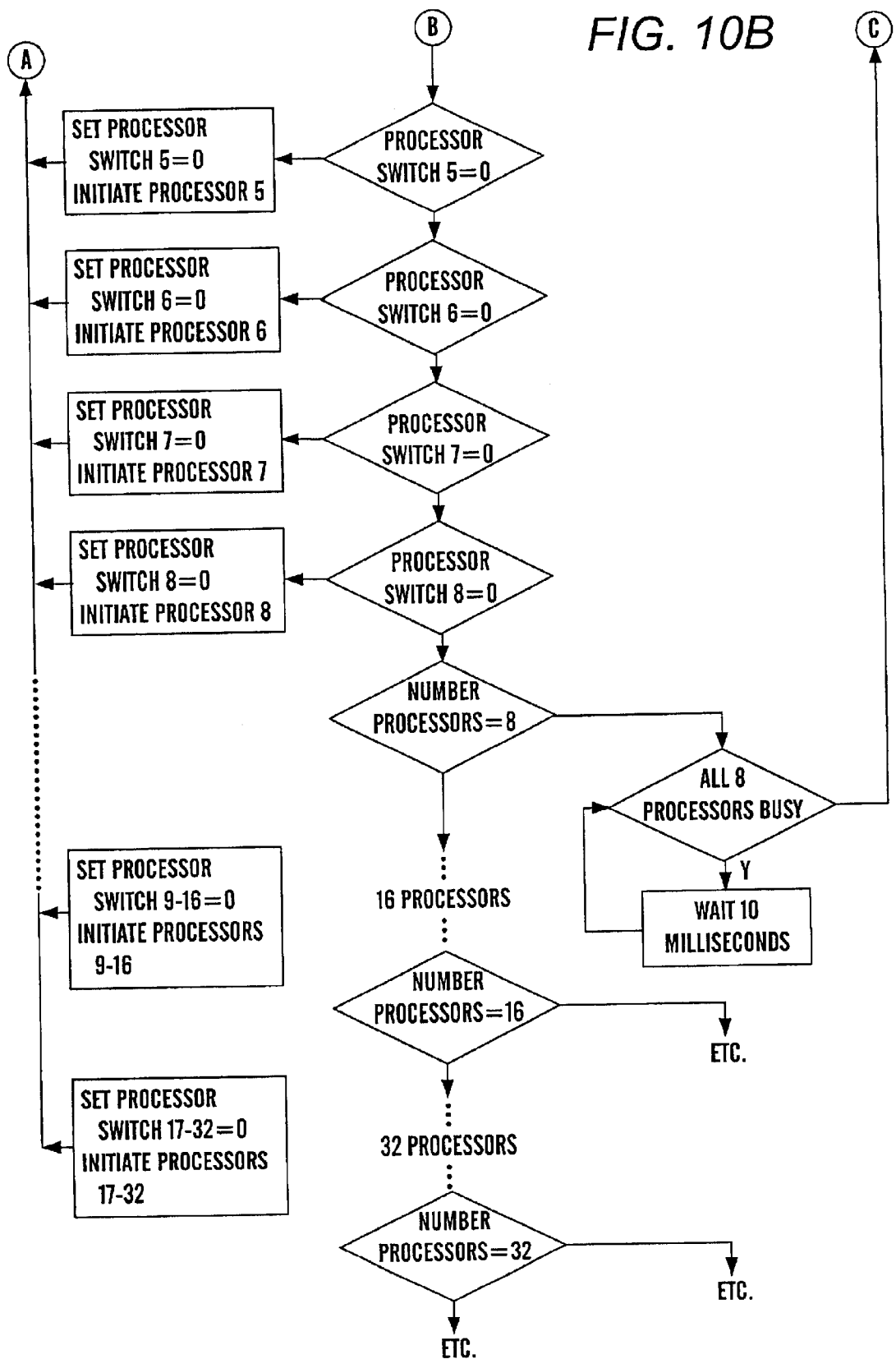
Figure 11:
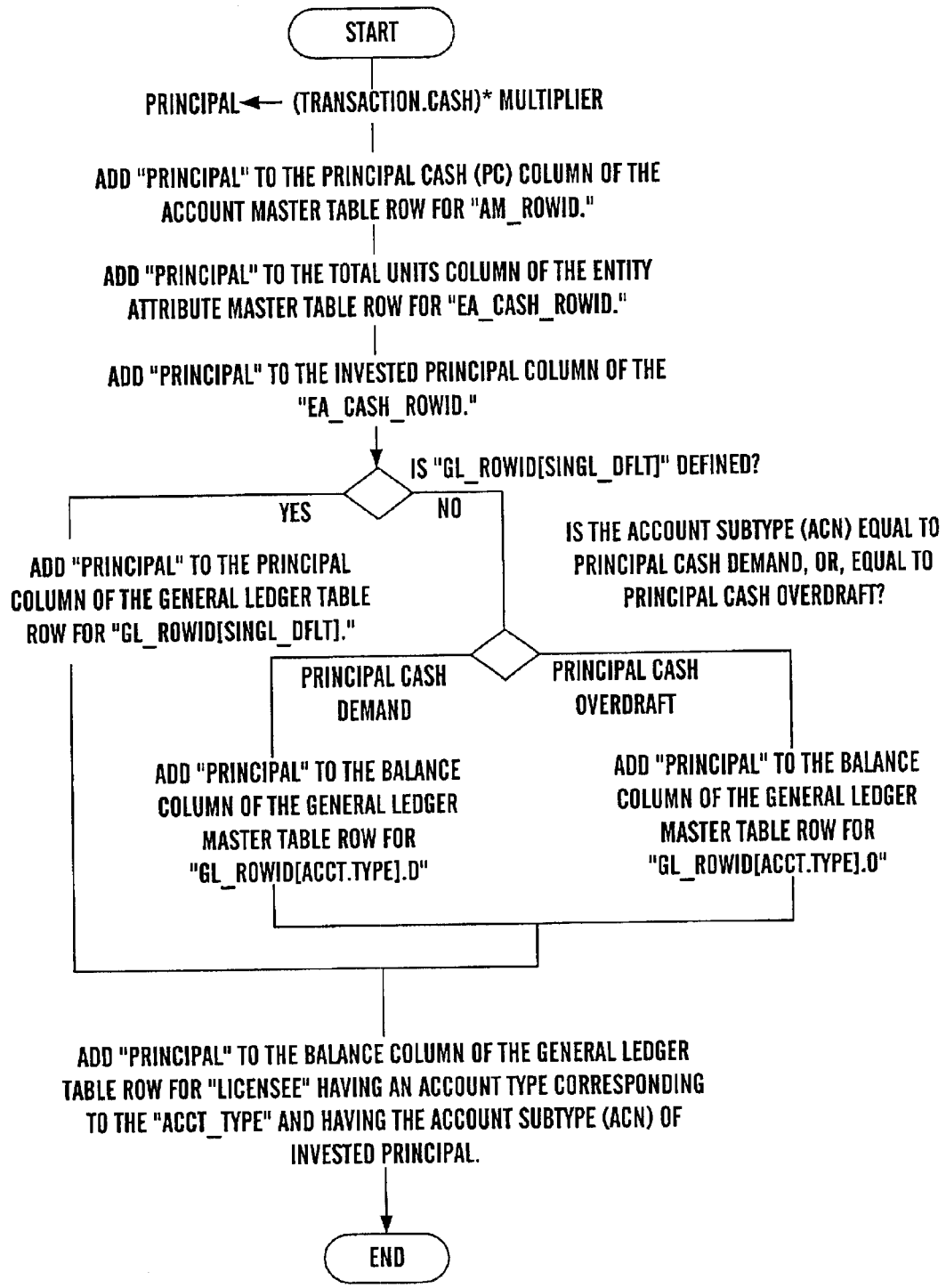
FIG. 11 is an embodiment of a flowchart of the steps performed for processing principal cash transactions by the present invention.
Figure 12:
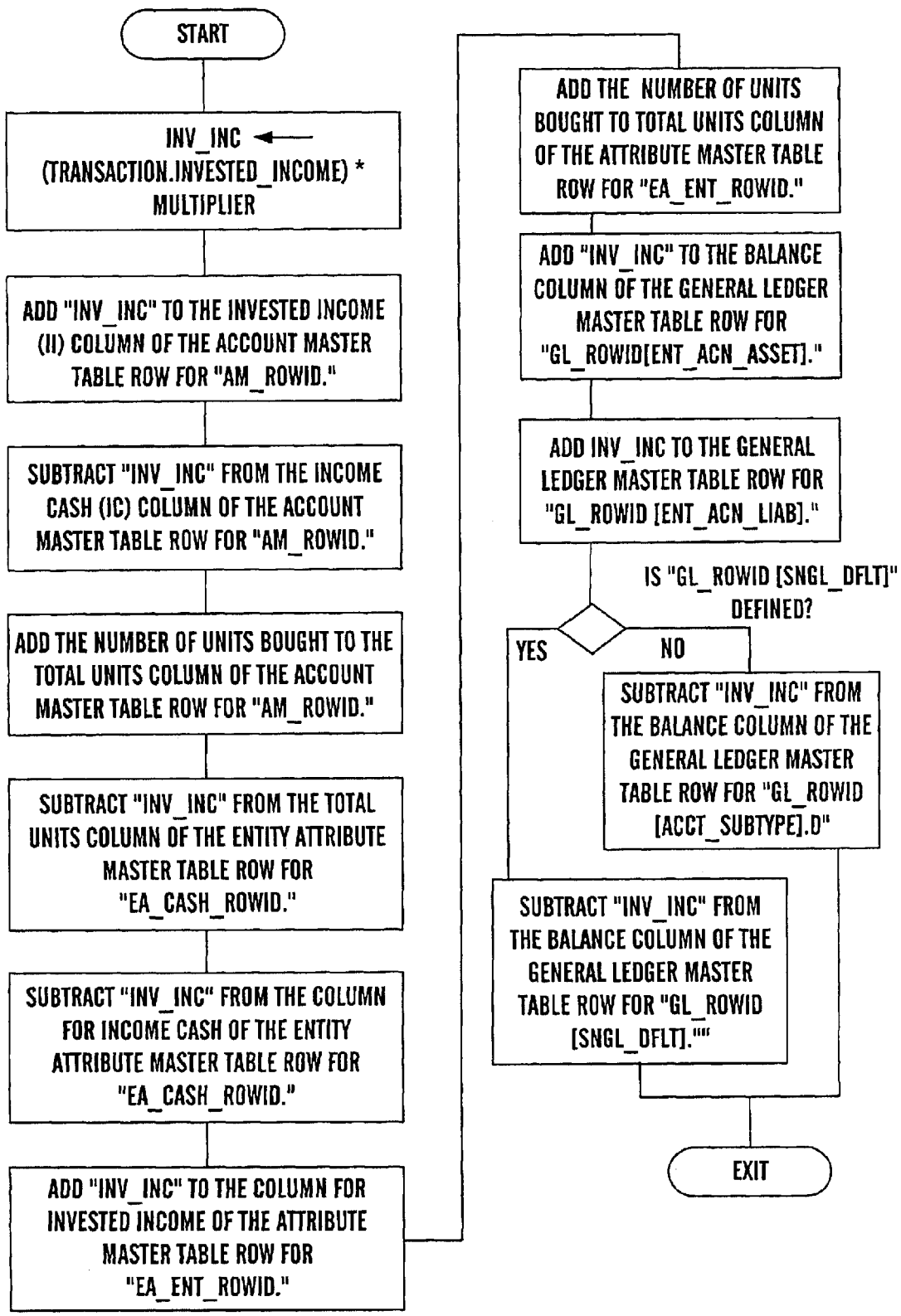
FIG. 12 is an embodiment of a flowchart of the steps performed for processing invested income transactions by the present invention.
Figure 13:
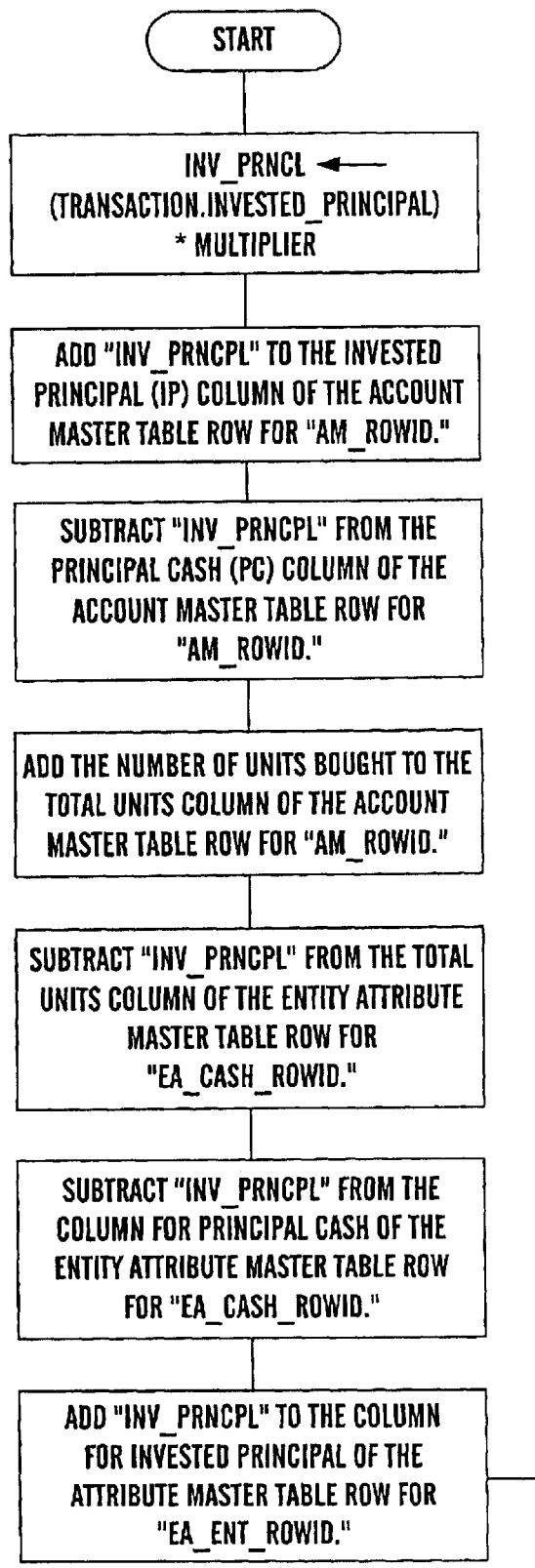
FIG. 13 is an embodiment of a flowchart of the steps performed for processing invested principal transactions by the present invention.
Figure 13:
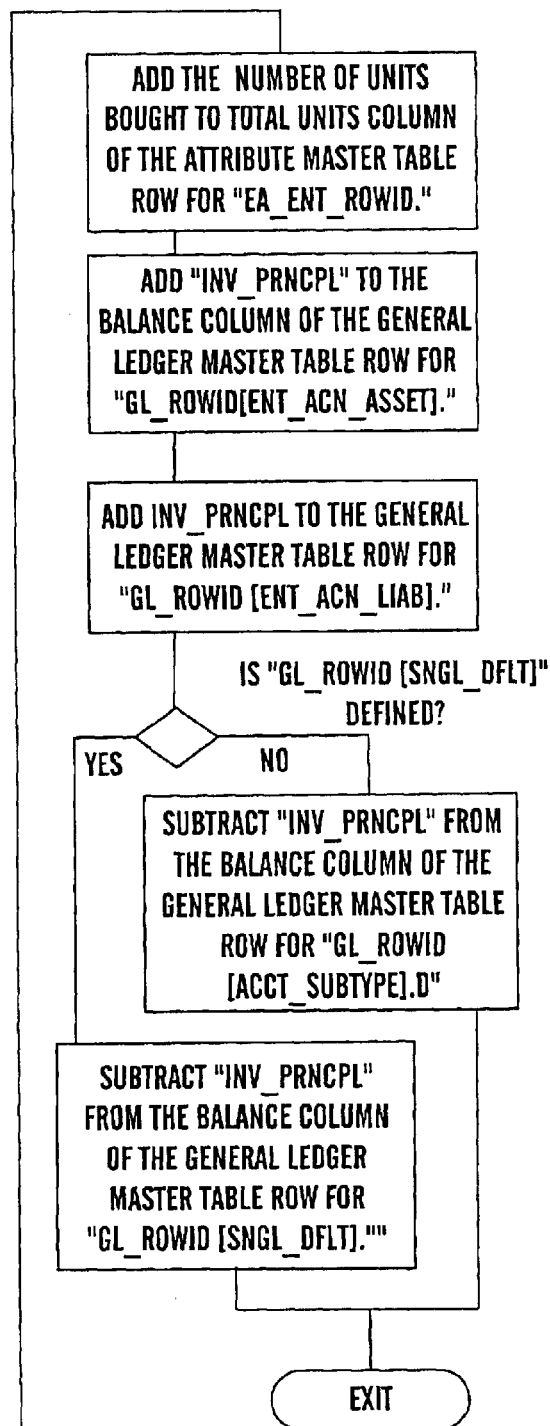
Figure 14:
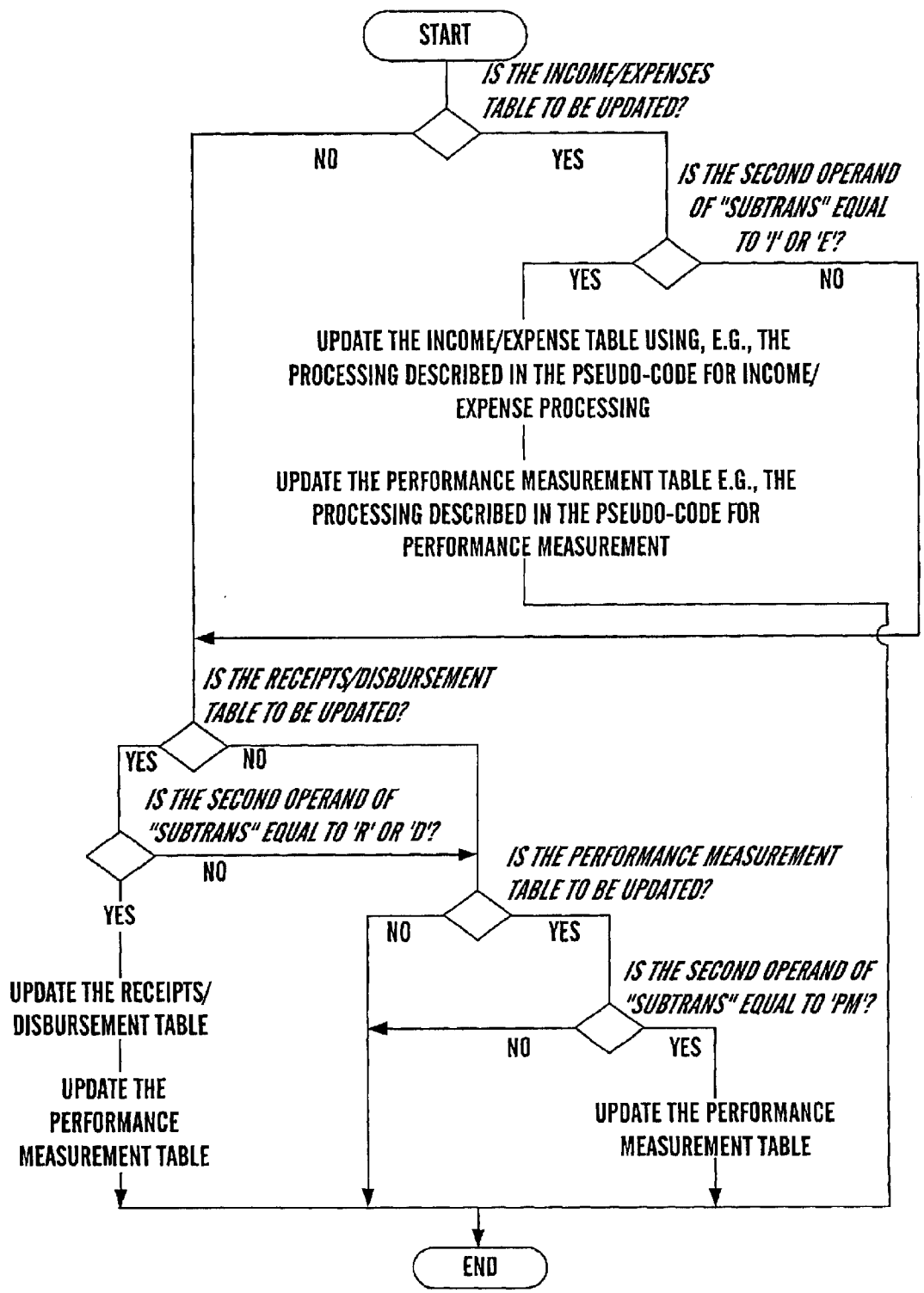
FIG. 14 is an embodiment of a flowchart of the steps for performing custom accounting such as income expenses, and cash flow for a business enterprise.
Figure 15:
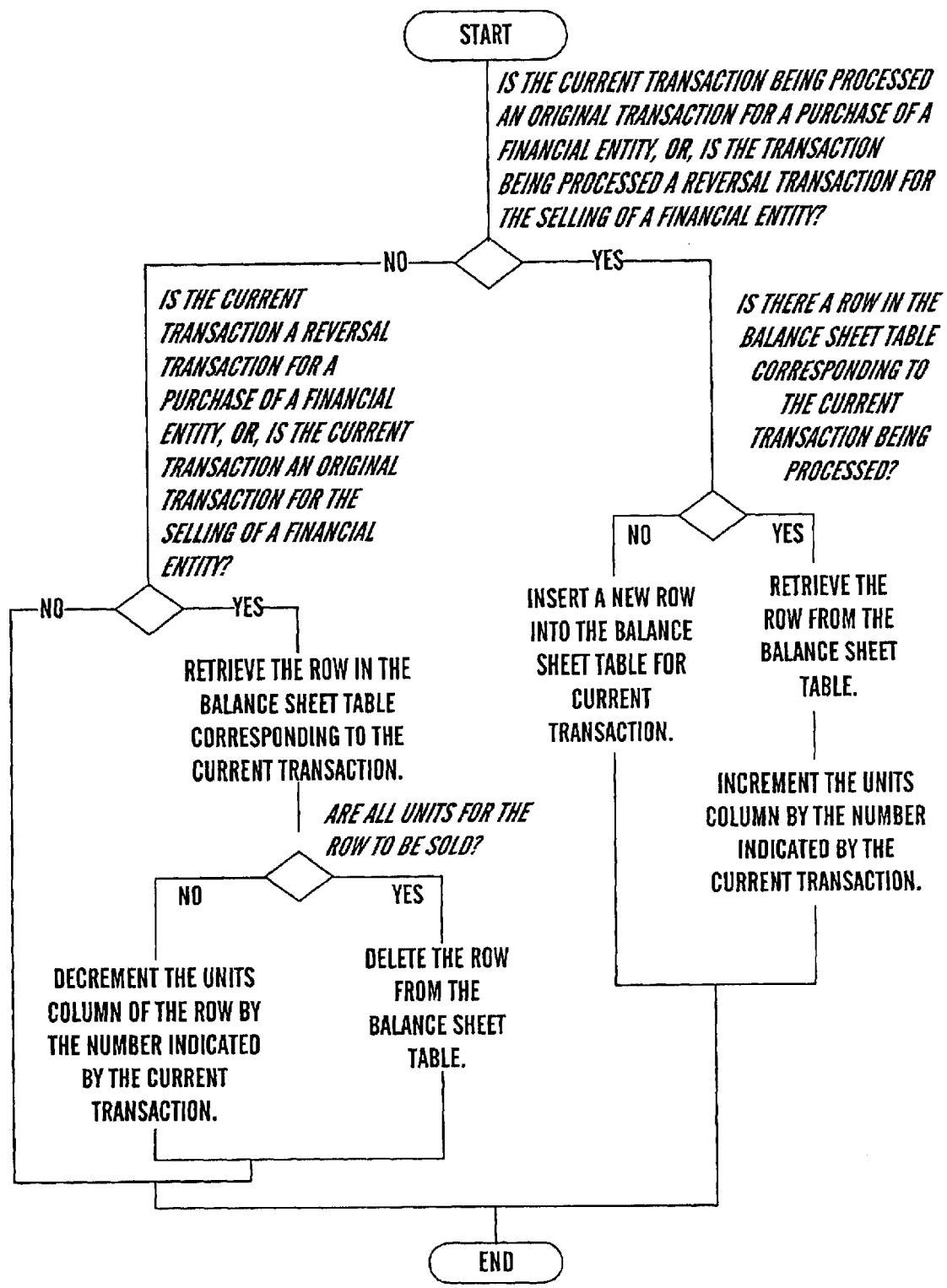
FIG. 15 is an embodiment of a flowchart of the steps for maintaining a business enterprise's balance sheet related to buys and sells of financial entities or instruments.

A first embodiment of the processing for the subtransaction processing module 64 is provided in the flowcharts of FIGS. 9-A through 9-B, FIGS. 10A, 10B, 11, 12, 13 and 14. Note that for simplicity, error handling and related validity checking steps have been omitted. However, the performance of such steps is within the scope of the present invention, as one skilled in the art will appreciate.

Pseudo-Code for Processing for the
Subtransaction Processing Module 64

```
BEGIN
    DO WHILE List of Subtransactions in the TT Table is Valid
        Select Next Row of Operator, Operand 1, and Operand 2 from TT into Working Storage
/*      To choose the specific input field (or column) */
IF          Operand 1 = 'N'
            Set Value = Net Amount                      from Input String
ELSIF       Operand 1 = 'I'
            Set Value = Interest                        from Input String
ELSIF       Operand 1 = 'P'
            Set Value = Principal                       from Input String
ELSIF       Operand 1 = 'H'
            Set Value = Amount Units                    from Input String
ELSIF       Operand 1 = 'U'
            Set Value = Amount Units                    from Input String
ELSIF       Operand 1 = 'C'
            Set Value = Cost Basis                      from Input String
ELSIF       Operand 1 = 'V'
            Set Value = Amount Units * Curr Price       from Input String
ELSIF       Operand 1 = 'F'
            Set Value = Federal Taxes                   from Input String
ELSIF       Operand 1 = 'S'
            Set Value = State Taxes                     from Input String
ELSIF       Operand 1 = 'L'
            Set Value = Local Taxes                     from Input String
ELSIF       Operand 1 = 'M'
            Set Value = Management Fees                 from Input String
ELSE
            Message "Invalid Operand 1", Details
ENDIF
/*          To Adjust for Plus or Minus                 */
IF          Operator = 'P' then
            Set Multiplier = +1
ELSIF       Operator = 'M' then
            Set Multiplier = -1
ENDIF
/*          To Adjust for Originate or Reversal         */
IF          OORR = 'O' then
            Set Multiplier = Multiplier * +1
```

| Pseudo-Code for Processing for the Subtransaction Processing Module 64 | | |
|---|---|---|
| ELSIF | OORR = 'R' | |
| | Set Multiplier = Multiplier * −1 | |
| ENDIF | | |
| /* | Test for Total Unit Changes | */ |
| IF | Operand 2 = 'TU' then | |
| | Add Value to AM - Total Units | |
| | Add Value to EA - Total Units | |
| /* | Test for Income Cash Changes | */ |
| IF | Operand 2 = 'IC' then | |
| | /* Add to First Controls - Account Master | */ |
| | Add Value to AM - Income Cash | |
| | Add Value to AM - Units | |
| | /* Add to Second Controls - Entity Attribute */ | |
| | Add Value to EA - Invested Income | |
| | Add Value to EA - Units | |
| | /* Add to Third Controls - General Ledger | */ |
| IF | Number of Enties = 1 then | |
| | Add Value to GL - Income Cash | |
| ELSIF | Number of Entries = 2 then | |
| IF | Value > 0 then | |
| IF | ICD >= 0 then | |
| | Add Value | to GL - Income Cash Demand |
| | ELSE ICD < 0 | |
| | Add (Value - ICO) | to GL - Income Cash Demand |
| | Set Zero | to GL - Income Cash Overdraft |
| | ENDIF | |
| ELSIF | Value <= 0 then | |
| | IF ICD < 0 then | |
| | Add Value | to GL - Income Cash Overdraft |
| | ELSE ICD >= 0 then | |
| | Add (Value - ICD) | to GL - Income Cash Overdraft |
| | Set Zero | to GL - Income Cash Demand |
| | ENDIF | |
| ELSE | | |
| | Message "Invalid Value", Details | |
| ENDIF | | |
| | Add Value to Uninvested Income | |
| ELSE | | |
| | Message "Invalid Number Entries", Details | |
| ENDIF | | |
| /* Test for Principal Cash Changes | | */ |
| ELSIF Operand 2 = 'PC' then | | |
| | /* Add to First Controls - Account Master | */ |
| | Add Value to AM - Principal Cash | |
| | Add Value to AM - Units | |
| | /* Add to Second Controls - Entity Attribute */ | |
| | Add Value to EA - Invested Principal | |
| | Add Value to EA - Units | |
| | /* Add to Third Controls - General Ledger | */ |
| IF | Number of Entries = 1 then | |
| | Add Value to GL - Principal Cash | |
| ELSIF | Number of Entries = 2 then | |
| IF | Value > 0 then | |
| IF | PCD >= 0 then | |
| | Add Value | to GL - Principal Cash Demand |
| | ELSE PCD < 0 | |
| | Add Value | to GL - Principal Cash Demand |
| | Set Zero | to GL - Principal Cash Overdraft |
| | ENDIF | |
| ELSIF | Value <= 0 then | |
| IF | PCD < 0 then | |
| | Add Value | to GL - Principal Cash Overdraft |
| ELSE | PCD >= 0 then | |
| | Add (Value - PCD) | to GL - Principal Cash Overdraft |
| | Set Zero | to GL - Principal Cash Demand |
| | ENDIF | |
| ELSE | | |
| | Message "Invalid Value", Details | |
| | ENDIF | |
| ELSE | | |
| | Message "Invalid Number Entries", Details | |
| ENDIF | | |
| | Add Value to Uninvested Principal | |
| /* | Test for Invested Income Changes*/ | |
| ELSIF | Operand 2 = 'II' then | |
| | /* Add to First Controls - Account Master | */ |

Pseudo-Code for Processing for the
Subtransaction Processing Module 64

```
              Add Value to AM - Invested Income
              /* Add to Second Controls - Entity Attribute    */
              Add Value to EA - Invested Income
              /* Add to Third Controls - General Ledger       */
/*            Update Assets                                   */
              Add Value to ACN- Assets
/*            Update Liabilities                              */
IF            ACN-Liab = ' ' then
              Add Value to Invested Income
ELSE
              Add Value to ACN_Liabilities
ENDIF
/*            Test for Invested Principal Changes             */
ELSIF         Operand 2 = 'IP' then
              /* Add to First Controls - Account Master       */
              Add Value to AM - Principal Cash
              /* Add to Second Controls - Entity Attribute */
              Add Value to EA - Invested Principal
              /* Add to Third Controls - General Ledger       */
              /* Update Assets                                */
              Add Value to ACN - Assets                       */
/*            Update Liabilities                              */
IF            ACN_Liab = ' ' then
              Add Value to Invested Principal
ELSE
              Add Value to ACN_Liabilities
ENDIF
/* Test for Other Customized Reporting Changes                */
ELSIF         Operand 2 = 'I' and Report Request = 'Y'
OR            Operand 2 = 'E' and Report Request = 'Y' then
              (IEE) Process IE
              (PME) Process PM
ELSIF         Operand 2 = 'R' and Report Request = 'Y'
OR            Operand 2 = 'D' and Report Request = 'Y' then
              (IEC) Process RD
              (PMC) Process PM
              /* Test for other Performance Measurement Data  */
ELSIF         Operand 2 = 'PM' and Report Request = 'Y' then
              (PMP) Process PM
ELSIF         Operand 2 = 'CN'
OR            Operand 2 = 'DN' then
              (CDC) Process PM
ELSIF         Operand 2 = 'MF' then
              (PMM) Process PM
ELSIF         Operand 2 = 'CM' then
              (PCM) Process PM
ELSIF         Operand 2 = 'FT' then
              (PMF) Process PM
ELSIF         Operand 2 = 'ST' then
              (PMS) Process PM
ELSE
              Message "Invalid Operand 2", Details
ENDIF
/* Test for Detail Record Maintenance of Financial Instruments */
IF            AORS != ' ' then
              ***********
              CALL PORTFOLIO ADJUSTER 110
              ***********
              ENDIF
              ENDDO
END
```

Pseudo-Code for Performance Measurement (PM)
Processing related to the Licensee
Performance Measurement Table 104

```
BEGIN
    IF Trxn 'A' and Type =
    'O' OR Trxn = 'S' and Type = 'R' (which means ADD)
        SELECT Data into Working Storage from PM Record
        IF Error then
            INSERT INTO PM Record, Details
        IF Error then
            Message "INSERT PM Error", Details
```

| Pseudo-Code for Performance Measurement (PM) Processing related to the Licensee Performance Measurement Table 104 |
|---|
|       Goto Write Reject Report<br>    ENDIF<br>  ELSE<br>    Increment Units by amount to be increased<br>    UPDATE Data to Table/Row<br>    IF Error<br>      Message "UPDATE PM Error 1", Details<br>      Goto Write Report Error<br>    ENDIF<br>  ENDIF<br>ELSIF Trxn = 'A' and Type = 'R' OR Trxn =<br>'S' and Type 'O' (which means SUBTRACT)<br>  SELECT Data into Working Storage from PM Record<br>  IF Error then<br>    Message "SELECT PM Error 2", Details<br>    Goto Write Report Error<br>  ENDIF<br>  IF Units = 'ALL"<br>  and All Other Balances in the Row are Zero then<br>    DELETE from Table/Row<br>    IF Error<br>      Message "DELETE PM Error", Details<br>      Goto Write Report Error<br>    ENDIF<br>  ELSE<br>    Decrement Units by Amount to be reduced<br>    UPDATE PI SET Details<br>    IF Error then<br>    Message "UPDATE PM Error 2", Details<br>    Goto Write Report Writer<br>    ENDIF<br>  ENDIF<br>ELSE<br>  Null<br>ENDIF<br>Goto EOJ<br><<Write Reject Report>><br>INSERT into Reject Table, Details<br>  IF Error<br>    STOP<br>  ENDIF<br><<EOJ>><br>  Null<br>END |

| Pseudo-Code for Income/Expense Processing (IE) Processing related to the Customer Income Statement (Income/Expense) Table 96 |
|---|
| BEGIN<br>  IF Trxn = 'Debit' and Type = 'O' (which means ADD)<br>  OR Trxn = 'Credit' and Type = 'O' then<br>    SELECT Data into Working Storage from IE Record<br>    IF Error then<br>    INSERT INTO IE Table, Details<br>    IF Error then<br>      Message "INSERT IE Error 1", Detail<br>      Goto Write Report Error<br>    ENDIF<br>    ELSE<br>      Increment Units by amount to be increased<br>      UPDATE Data to Table/Row<br>      IF Error then<br>      Message "UPDATE IE Error 1", Details<br>      Goto Write Report Error<br>      ENDIF<br>    ENDIF<br>  ELSIF Trxn = 'Debit' and<br>  Type = 'R'    (which means SUBTRACT)<br>  OR Trxn = 'Credit' and Type = 'R' then |

| Pseudo-Code for Income/Expense Processing (IE) Processing related to the Customer Income Statement (Income/Expense) Table 96 |
|---|
|     SELECT Data into Working Storage from IE Record<br>    IF Error then<br>      Message "SELECT IE Error 2", Details<br>      Goto Write Report Error<br>    ENDIF<br>    IF Units = 'ALL" then<br>      DELETE from Table/Row<br>      IF Error then<br>        Message "DELETE IE Error", Details<br>        Goto Write Report Error<br>      ENDIF<br>    ELSE<br>      Decrement Units by Amount to be reduced<br>      UPDATE IE SET Details<br>      IF Error then<br>        Message "UPDATE IE Error 2", Details<br>        Goto Write Report Writer<br>      ENDIF<br>    ENDIF<br>  ELSE<br>    Null<br>  ENDIF<br>  Goto EOJ<br>  <<Write Reject Report>><br>  INSERT into Reject Table, Details<br>    IF Error then<br>      STOP<br>    ENDIF<br>  <<EOJ>><br>  Null<br>END |

| Pseudo-Code for AORS Processing (Portfolio Adjuster 110 Processing) |
|---|
| BEGIN<br>  /* The End AORS Switch is a<br>  global switch that signals the end of all AORS processing */<br>  /* otherwise known as the Detail Record<br>  (or Row) Maintenance Processing. */<br>  /* The switch is originally set 0.<br>  Each called routine ends by setting the switch = 1. */<br>  Set End AORL Switch = 0<br>  DO WHILE End AORS Switch = 0<br>    IF Trxn = "ADD" then<br>    IF Type = 'O' then<br>      ***********<br>      CALL Original Add Module 114 (Originate Add)<br>      ***********<br>    IF Error<br>      Message "No OADD Routine"<br>      Goto Write Reject Report<br>    ENDIF<br>    ELSIF Type = 'R' then<br>      ***********<br>      CALL Reverse Add Module 118 (Reverse Add)<br>      ***********<br>    IF Error<br>      Message "NO RADD Routine"<br>      Goto Write Reject Routine<br>    ENDIF<br>    ELSE<br>      Message "Invalid O OR R Code for ADD". Details<br>      Goto Write Reject Report<br>    ENDIF<br>    ELSIF Trxn = 'SUBTRACT' then<br>    IF Type = 'O' then<br>      ***********<br>      CALL Original Sell Module 122 (Originate Subtract)<br>      *********** |

-continued

Pseudo-Code for AORS Processing
(Portfolio Adjuster 110 Processing)

```
    IF Error then
        Message "No OSUB Routine", Details
        Goto Write Reject Report
    ENDIF
    ELSIF Type = 'R' then
    ************
        CALL Reverse Sell Module 126 (Reverse Subtract)
    ************
        IF Error then
            Message "No RSUB Routine, Details
            Goto Write Reject Report
        ENDIF
    ELSE
        Message "Invalid O OR R for SUBTRACT", Details
        Goto Write Reject Report
    ENDIF
    ELSE
        Message "Invalid Transaction", Details
        Goto Write Reject Report
    ENDIF
    Goto EOJ
    <<Write Reject Report>>
    INSERT into Reject Table
        IF Error then
            STOP
        ENDIF
    Set End AORL Switch = 1
    <<EOJ>
    Null
  ENDDO
END
```

A first embodiment of the processing for the balance sheet table 130 is provided in the flowchart of FIG. BAL-SHT. Note that for simplicity, error handling and related validity checking steps have been omitted. However, the performance of such steps is within the scope of the present invention, as one skilled in the art will appreciate.

A second pseudo-code embodiment of the processing for the balance sheet table 130 follows.

Balance Sheet Processing (BS)

```
BEGIN
    IF AORL = 'A' and OORR = 'O' (which means ADD)
    AND AORL = 'S' and OORR = 'R' then
        SELECT Data into Working Storage from BS Record
    IF Error then
        INSERT INTO BS Table, Details
        IF Error then
            Message "INSERT BS Error', Details
            Goto Write Reject Table
```

-continued

Balance Sheet Processing (BS)

```
        ENDIF
    ELSE
        Increment Units by amount to be increased
        UPDATE Data to Table/Row
        IF Error
            Message "UPDATE BS Error 1", Details
            Goto Write Report Error
        ENDIF
    ENDIF
    ELSIF AORL = 'A' and OORR = 'R' (which means SUBTRACT)
    OR AORL = 'S' and OORR = 'O' then
        SELECT Data into Working Storage from BS Record
        IF Error then
            Message "SELECT BS Error 2", Details
            Goto Write Report Error
        ENDIF
        IF Units = 'ALL" then
            DELETE from Table/Row
        IF Error
            Message "DELETE BS Error", Details
            Goto Write Report Error
        ENDIF
    ELSE
        Decrement Units by Amount to be reduced
        UPDATE IE SET Details
        IF Error then
            Message "UPDATE BS Error 2". Details
            Goto Write Report Writer
            ENDIF
        ENDIF
    ELSE
        Null
    ENDIF
    Goto EOJ
    <<Write Reject Report>>
    INSERT into Reject Table, Details
        IF Error
        STOP
        ENDIF
    <<EOJ>>
    Null
END
```

Pseudo-Code For Processing The Capital Gains Table 140

```
BEGIN
    IF AORL = 'S' and Type = 'O'          (which means ADD)
        SELECT Data into Working Storage from   CG Record
        IF Error then
            INSERT INTO CG Table, Details
            IF Error then
                Message "INSERT CG Table", Details
                Goto Write Report Error
            ENDIF
        ELSE
            Increment Units by amount to be increased
```

-continued

| Pseudo-Code For Processing The Capital Gains Table 140 |
|---|

```
                UPDATE Data to Table / Row
                IF Error
                        Message "UPDATE CG Error 1", Details
                        Goto Write Report Error
                ENDIF
        ENDIF
ELSIF AORL = 'S' and Type = 'R'                    (which means SUBTRACT)
        SELECT Data into Working Storage from CG Record
        IF Error then
                Message "SELECT CG Error 2", Details
                Goto Write Report Error
        ENDIF
        IF Units = 'ALL" then
                DELETE from Table / Row
                IF Error
                        Message "DELETE CG Error", Details
                        Goto Write Report Error
                ENDIF
        ELSE
                Decrement Units by Amount to be reduced
                UPDATE IE SET Details
                IF Error then
                        Message "UPDATE CG Error 2", Details
                        Goto Write Report Writer
                ENDIF
        ENDIF
ELSE
        Null
ENDIF
Goto EOJ
<<Write Reject Report>>
INSERT into Reject Table, Details
        IF Error
                STOP
        ENDIF
<<EOJ>>
Null
END
```

Pseudo-Code for Original Add Module 114 Processing

Note: Do not turn switch OFF or back to 0 as these switches indicate which processes remain.

```
BEGIN
    IF      Process 1 Switch = 0 then
            Set Process 1 Switch = 1
            ********
            CALL BS
            ********
    ELSIF   Process 2 Switch = 0 then
            Set Process 2 Switch = 1
            ********
            CALL PI
            ********
    ELSIF   Process 3 Switch = 0 then
            Set Process 3 Switch = 1
            ********
            CALL PA
            ********
    ELSIF   Process 4 Switch = 0 then
            Set Process 4 Switch = 1
            ********
            CALL TS
            ********
    ELSIF   Process 5 Switch = 0 then
            Set Process 5 Switch = 1
            ********
            CALL PM
            ********
            Set End AORS Switch = 1
            Notes End of AORS Processing
```

-continued

```
    ELSE
            NULL
    ENDIF
    ****************
    CALL Subtransaction Scheduler 62
    ****************
END
```

Pseudo-Code for Reverse of Add Module 118 Processing

Note: Do not turn switch OFF or back to 0 as these switches indicate which processes remain.

```
BEGIN
    IF      Process 6 Switch = 0 then
            Set Process 6 Switch = 1
            ********
            CALL BS
            ********
    ELSIF   Process 7 Switch = 0 then
            Set Process 7 Switch = 1
            ********
            CALL PI
            ********
    ELSIF   Process 8 Switch = 0 then
            Set Process 8 Switch = 1
            ********
            CALL PA
            ********
```

-continued

| | |
|---|---|
| ELSIF | Process 9 Switch = 0 then<br>Set Process 9 Switch = 1<br>******<br>CALL TS<br>****** |
| ELSIF | Process 10 Switch = 0 then<br>Set Process 10 Switch = 1<br>******<br>CALL PM<br>******<br>Set End AORS Switch = 1 |

-continued

```
                        Notes End of AORS Processing
        ELSE
                NULL
        ENDIF
        ****************
        CALL Subtransaction Scheduler 62
        ****************
END
```

Pseudo-code for Original Sell Module 122 Processing

```
BEGIN
    IF Sell-Method = 'LOT' then
        Select LOT Amount into Working Storage from BS record
        IF Amount Sold > Lot Amount in Working Storage then
                Message "Lot Amount> Amount Available"
                Goto Write Reject Report
        ENDIF
        IF      Process 11 Switch = 0 then
                    Set Process 11 Switch = 0
                    **************
                    CALL BS
                    **************
            ELSIF   Process 12 Switch = 0 then
                        Set Process 12 Switch = 0
                        **********
                        CALL PI
                        **********
            ELSIF   Process 13 Switch = 0 then
                        Set Process 13 Switch = 0
                        **********
                        CALL PA
                        **********
            ELSIF   Process 14 Switch = 0 then
                        Set Process 14 Switch = 0
                        **********
                        CALL CG
                        **********
            ELSIF   Process 15 Switch = 0 then
                        Set Process 15 Switch = 1
                        **********
                        CALL TS
                        **********
            ELSIF   Process 16 Switch = 0 then
                        Set Process 16 Switch = 0
                        **********
                        CALL PM
                        **********
            ELSIF   Process 17 Switch = 0 then
                        Set Process 17 Switch = 0
                        **********
                        CALL TL
                        **********
                        Set End AORS Switch = 1            Notes End of AORS Processing
            ELSE
                        NULL
            ENDIF
            ****************
            CALL SUBTRACTION SCHEDULER 62
            ****************
    ELSE
            Select all LOTS into Temporary Working Storage Table
            Licn/Acct/Asset/Purch/Amt/Cost/Unit-Cost/ROWID)
            Set Total Amount Sold = Data Entry Amount Sold
            IF Total Amount Sold > Total Amount Available then
                    Message "Total Amount Sold > Total Amount Available", Details
                    Goto Write Reject Report
            ENDIF
            Avg-Factor = 1
            IF Sell-Method = "AVG" then
                    Avg-Factor = (Total Amount Sold / Total Amount Available)
```

-continued

```
        ENDIF
<<Sell Multiple Lot Routine>>
DO While Total Amount Sold = 0
                IF Total Amount Sold > 0 then
                        IF Sell-Method = 'FIF' or ' ' then
                                Select LOT Amount Available into WS Lot Amount
                                        Where Purch = MIN (Purch)
                        ENDIF
                ELSIF
                        IF Sell-Method = 'LIF"
                                Select LOT Amount Available into WS Lot Amount
                                        Where Purch = MAX(Purch)
                        ENDIF
                ELSIF
                        IF Sell-Method = 'LCF'
                                Select LOT Amount Available into WS Lot Amount
                                        Where Unit-Cost = MIN(Unit-Cost)
                        ENDIF
                ELSIF
                        IF Sell-Method = 'HCF"
                                Select LOT Amount Available into WS Lot Amount
                                        Where Unit-Cost = MAX(Unit-Cost)
                        ENDIF
                ELSE
                        <<for Sell-Method = 'AVG' or 'ALL'>>
                        IF Amount Sold * Avg Factor < WS Lot Amount then
                                UPDATE Temporary Table Lot Amount for Amount Sold
                        ELSE
                                DELETE Total Row Temporary Table
                        ENDIF
                        **********
                IF      Process 11 Switch = 0 then
                        Set Process 11 Switch = 0
                        **************
                        CALL BS
                        **************
                ELSIF   Process 12 Switch = 0 then
                        Set Process 12 Switch = 0
                        **********
                        CALL PI
                        **********
                ELSIF   Process 13 Switch = 0 then
                        Set Process 13 Switch = 0
                        **********
                        CALL PA
                        **********
                ELSIF   Process 14 Switch = 0 then
                        Set Process 14 Switch = 0
                        **********
                        CALL CG
                        **********
                ELSIF   Process 15 Switch = 0 then
                        Set Process 15 Switch = 1
                        **********
                        CALL TS
                        **********
                ELSIF   Process 16 Switch = 0 then
                        Set Process 16 Switch = 0
                        **********
                        CALL PM
                        **********
                ELSIF   Process 17 Switch = 0 then
                        Set Process 17 Switch = 0
                        **********
                        CALL TL
                        **********
                        Set End AORS Switch = 1         Notes End of AORS Processing
                ELSE
                        NULL
                ENDIF
                Decrement Total Amount Sold by Cap Gain Lot Amount
                Increment the e LOT Number
                *****************
                CALL SUBTRANSACTION SCHEDULE 62
                *****************
        ENDIF
    ENDDO
ENDIF
<<EOJ>>
```

```
    NULL
END
```

| Originate Sell Routine |
|---|
| BEGIN |
|   IF Sell-Method = 'LOT' then |
|   Select LOT Amount into Working Storage from BS record. |
|   IF Amount Sold > Lot Amount in Working Storage then |
|     Message "Lot Amount > Amount Available" |
|     Goto Write Reject Report |
|   ELSE |
|     ************** |
|     CALL BS Routine |
|     ************** |
|   ENDIF |
|   ********* |
|   CALL PIPA |
|   ********* |
|   ********* |
|   CALL CG |
|   ********* |
|   ********* |
|   CALL TS |
|   ********* |
|   ********* |
|   CALL PM |
|   ********* |
|   ********* |
|   CALL CG |
|   ********* |
|   ********* |
|   CALL TL |
|   ********* |
|   ********* |
| ELSE |
|   Select All LOTS into Temporary Working Storage Table |
|   Licn/Acct/Asset/Purch/Amt/Cost/Unit-Cost/ROWID) |
|   Set Total Amount Sold = Data Entry Amount Sold |
|   IF Total Amount Sold > Total Amount Available then |
|     Message "Total Amount Sold > Total Amount Available", Details |
|     Goto Write Reject Report |
|   ENDIF |
|   Avg-Factor = 1 |
|   IF Sell-Method = 'AVG' then |
|   Avg-Factor = (Total Amount Sold/Total Amount Available) |
|   ENDIF |
|   DO While Total Amount Sold = 0 |
|   IF Total Amount Sold > 0 then |
|   IF Sell-Method = 'FIF' or ' ' then |
|   Select LOT Amount Available into WS Lot Amount |
|   Where Purch = MIN (Purch) |
|   ENDIF |
|   ELSIF |
|     IF Sell-Method = 'LIF'' |
|     Select LOT Amount Available into WS Lot Amount |
|     Where Purch = MAX(Purch) |
|     ENDIF |
|   ELSIF |
|     IF Sell-Method = 'LCF' |
|     Select LOT Amount Available into WS Lot Amount |
|     Where Unit-Cost = MIN(Unit-Cost) |
|     ENDIF |
|   ELSIF |
|     IF Sell-Method = 'HCF' |
|     Select LOT Amount Available into WS Lot Amount |
|     Where Unit-Cost MAX(Unit-Cost) |
|     ENDIF |
|   ELSE |
|     <<for Sell-Method = 'AVG' or 'ALL'>> |
|     IF Amount Sold * Avg Factor < WS Lot Amount then |
|     UPDATE Temporary Table Lot Amount for Amount Sold |
|     ELSE |

| Originate Sell Routine |
|---|
|     DELETE Total Row Temporary Table |
|     ENDIF |
|     ********* |
|     CALL BS with the amount of LOT sold |
|     ********* |
|     ENDIF |
|     ********* |
|     CALL PIPA |
|     ********* |
|     ********* |
|     CALL TS |
|     ********* |
|     ********* |
|     CALL PM |
|     ********* |
|     ********* |
|     CALL CG with the amount of LOT sold |
|     ********* |
|     CALL TL |
|     ********* |
|     Decrement Total Amount Sold by Cap Gain Lot Amount |
|     Increment the LOT Number |
|     ENDIF |
|   ENDDO |
| ENDIF |
| Goto EOJ |
| <<Write Reject Report>> |
|   INSERT into Reject Table |
|   IF Error then |
|   STOP |
|   ENDIF |
|   <<EOJ>> |
| END |

| Pseudo-Code for Reverse of Original Sell Module 126 Processing | |
|---|---|
| BEGIN | |
| IF | Process 18 Switch = 0 then |
| | Set Process 18 Switch = 1 |
| | ******** |
| | CALL BS with the amount of LOT sold |
| | ******** |
| ELSIF | Process 19 Switch = 0 then |
| | Set Processor 19 Switch = 1 |
| | ******** |
| | CALL PI |
| | ******** |
| ELSIF | Process 20 Switch = 0 then |
| | Set Process 20 Switch = 1 |
| | ******** |
| | CALL PA |
| | ******** |
| ELSIF | Process 21 Switch = 0 then |
| | Set Process 21 Switch = 1 |
| | ******** |
| | CALL TS |
| | ******** |
| ELSIF | Process 22 Switch = 0 then |
| | Set Process 22 Switch = 1 |
| | ******** |
| | CALL PM |
| | ******** |
| ELSIF | Process 23 Switch = 0 then |

Pseudo-Code for Reverse of Original Sell Module 126 Processing

```
            Set Process 23 Switch = 1
            ********
            CALL CG with the amount of LOT sold
            ********
    ELSIF   Process 24 Switch = 0 then
            Set Process 24 Switch = 1
            ********
            CALL TL
            ********
            Set End AORL Switch = 1 Notes End of AORS
Processing
    ELSE
        NULL
    ENDIF
    ****************
    CALL Subtransaction Scheduler 62
    ****************
END
```

Pseudo-Code for Processing Model #4
For All INSERTS, UPDATES, and DELETES to all Tables

```
BEGIN
    IF Trxn is 'ADD' then
        SELECT Data in Working Storage
        IF Error then
            INSERT INTO Table,Details
            IF Error then
                Message "INSERT Error", Details
                Goto Write Reject Report
            ENDIF
        ELSE
            Increment the Details
            UPDATE Set Table, Details
            IF Error then
                Message "UPDATE Error ADD", Details
                Goto Write Reject Report
            ENDIF
        ENDIF
    ELSIF Trxn is 'SUBTRACT' then
        SELECT Data into Working Storage
```

Pseudo-Code for Processing Model #4
For All INSERTS, UPDATES, and DELETES to all Tables

```
        IF Error then
            Message "SELECT Error Subtract", Details
            Goto Write Reject Report
        ENDIF
        If One or More Amounts > One or More Values from Existing
Record then
            ADD to Reject Report
            IF Error then
                Message "INSERT Reject SUBTRACT", Details
                Goto Write Reject Report
            ENDIF
        IF Details = 'ALL" then
            DELETE From Table, Details
            IF Error then
                Message "DELETE Error", Details
                Goto Write Reject Report
            ENDIF
        ELSE
            Decrement the Details
            UPDATE SET, Details
            IF Error then
                Message "UPDATE Error SUBTRACT", Details
                Goto Write Reject Report
            ENDIF
        ENDIF
    ENDIF
    Goto EOJ
    <<Write Reject Report>>
    INSERT INTO Reject Table, Details
    IF Error then
        Message "INSERT Reject Table Error", Details
        STOP
    ENDIF
    <<EOJ>>
    NULL
END
```

Pseudo-Code for Processing the Trade Settlement Table 142

```
BEGIN
    IF  Trxn = 'A' and Type = 'O' OR Trxn = 'S' and Type = 'O'  (which means ADD)
        INSERT into TS table, Details
        IF Error then
            Message "INSERT TS Error 1", Details
            Goto Write Report Error
        END
    ELSIF Trxn = 'A' and Type = 'R' OR Trxn = 'S' and Type = 'R' (which means SUBTRACT)
        SELECT Data into Working Storage from TS Record
        IF Error then
            Message "SELECT TS Error 2", Details
            Goto Write Report Error
        ENDIF
        DELETE from Table / Row
        IF Error
            Message "DELETE TS Error", Details
            Goto Write Report Error
        ENDIF
    ELSE
        Null
    ENDIF
    Goto EOJ
```

-continued

Pseudo-Code for Processing
the Trade Settlement Table 142

```
<<Write Reject Report>>
INSERT into Reject Table, Details
    IF Error
        STOP
    ENDIF
<<EOJ>>
Null
END
```

Pseudo-Code for Processing the Customer Cash Flow
(Receipts/Disbursements) Table 100

```
BEGIN
    IF Trxn = 'Receipt' and Type = 'O'  (which means ADD)
    OR Trxn = 'Disbursement' and Type = 'O' then
        SELECT Data into Working Storage from RD Record
        IF Error then
            INSERT INTO RD Table, Details
            IF Error then
                Message "INSERT RD Error", Details
                Goto Write Report Error
            ENDIF
        ELSE
            Increment Units by amount to be increased
            UPDATE Data to Table / Row
            IF Error then
                Message "UPDATE RD Error 1", Details
                Goto Write Report Error
            ENDIF
        ENDIF
    ELSIF Trxn = 'Receipt' and Type = 'R' (which means SUBTRACT)
    OR   Trxn = 'Disbursement' and Type = 'R'
        SELECT Data into Working Storage from RD Record
        IF Error then
            Message "SELECT RD Error 2", Details
            Goto Write Report Error
        ENDIF
        IF Units = 'ALL" then
            DELETE from Table / Row
            IF Error
                Message "DELETE RD Error", Details
```

-continued

Pseudo-Code for Processing the Customer Cash Flow
(Receipts/Disbursements) Table 100

```
                Goto Write Report Error
            ENDIF
        ELSE
            Decrement Units by Amount to be reduced
            UPDATE IE SET Details
            IF Error then
                Message "UPDATE RD Error 2", Details
                Goto Write Report Writer
            ENDIF
        ENDIF
    ELSE
        Null
    ENDIF
    Goto EOJ
    <<Write Reject Report>>
    INSERT into Reject Table, Details
        IF Error then
            STOP
        ENDIF
    <<EOJ>>
    Null
END
```

Pseudo-Code for Processing
the Pending Adjustment Table 138

```
BEGIN
    IF  Trxn = 'A' and Type = 'O' OR Trxn = 'S' and Type = 'R' (which means ADD)
    AND Trade Date < Income Ex-Date then
        SELECT Data into Working Storage from PA Record
        IF Error then
            INSERT INTO PA Table, Details
            IF Error then
                Message "INSERT PA-Error", Details
                Goto Write Report Error
            ENDIF
        ELSE
            Increment Units by amount to be increased
            UPDATE Data to Table / Row
            IF Error
                Message "UPDATE PA Error 1", Details
                Goto Write Report Error
            ENDIF
        ENDIF
    ELSIF  Trxn = 'A' and Type = 'R' OR Trxn = 'S' and Type = 'O' (which means SUBTRACT)
    AND   Trade Date > Income Ex-date + 1 then
```

| Pseudo-Code for Processing the Pending Adjustment Table 138 |
|---|

```
    SELECT Data into Working Storage from PA Record
    IF Error then
        Message "SELECT PA Error 2", Details
        Goto Write Report Error
    ENDIF
    IF Units = 'ALL" then
        DELETE from Table / Row
        IF Error
            Message "DELETE PA Error", Details
            Goto Write Report Error
        ENDIF
    ELSE
        Decrement Units by Amount to be reduced
        UPDATE PA SET Details
        IF Error then
            Message "UPDATE PA Error 2", Details
            Goto Write Report Writer
        ENDIF
    ENDIF
 ELSE
    Null
 ENDIF
 Goto PA-EOJ
 <<Write Reject Report>>
 INSERT into Reject Table, Details
    IF Error
        STOP
    ENDIF
 <<PA-EOJ>>
    Null
END
```

| Pseudo-Code for Processing the Pending Income Table 134 |
|---|

```
BEGIN
    IF  Trxn = 'A' and Type = 'O' OR Trxn = 'S' and Type = 'R' (which means ADD)
    AND Trade Date < Income Ex-Date then
        SELECT Data into Working Storage from PI Record
        IF Error then
            INSERT INTO PI Table, Details
            IF Error then
                Message "INSERT PI Error", Details
                Goto Write Reject Report
            ENDIF
        ELSE
            Increment Units by amount to be increased
            UPDATE Data to Table / Row
            IF Error
                Message "UPDATE PI Error 1", Details
                Goto Write Report Error
            ENDIF
        ENDIF
    ELSIF Trxn = 'A' and Type = 'R' OR Trxn = 'S' and Type = 'O' (which means SUBTRACT)
    AND  Trade Date > Income Ex-date + 1 then
        SELECT Data into Working Storage from PI Record
        IF Error then
            Message "SELECT PI Error 2', Details
            Goto Write Report Error
        ENDIF
        IF Units = 'ALL" then
            DELETE from Table / Row
            IF Error
                Message "DELETE PI Error", Details
                Goto Write Report Error
            ENDIF
        ELSE
            Decrement Units by Amount to be reduced
            UPDATE PI SET Details
            IF Error then
                Message "UPDATE PI Error 2", Details
```

| Pseudo-Code for Processing the Pending Income Table 134 |
|---|
|         Goto Write Report Writer<br>      ENDIF<br>    ENDIF<br>  ELSE<br>    Null<br>  ENDIF<br>  Goto PI-EOJ<br>  <<Write Reject Report>><br>  INSERT into Reject Table, Details<br>    IF Error<br>      STOP<br>    ENDIF<br>  <<PI-EOJ>><br>    Null<br>END |

Figure 4A:
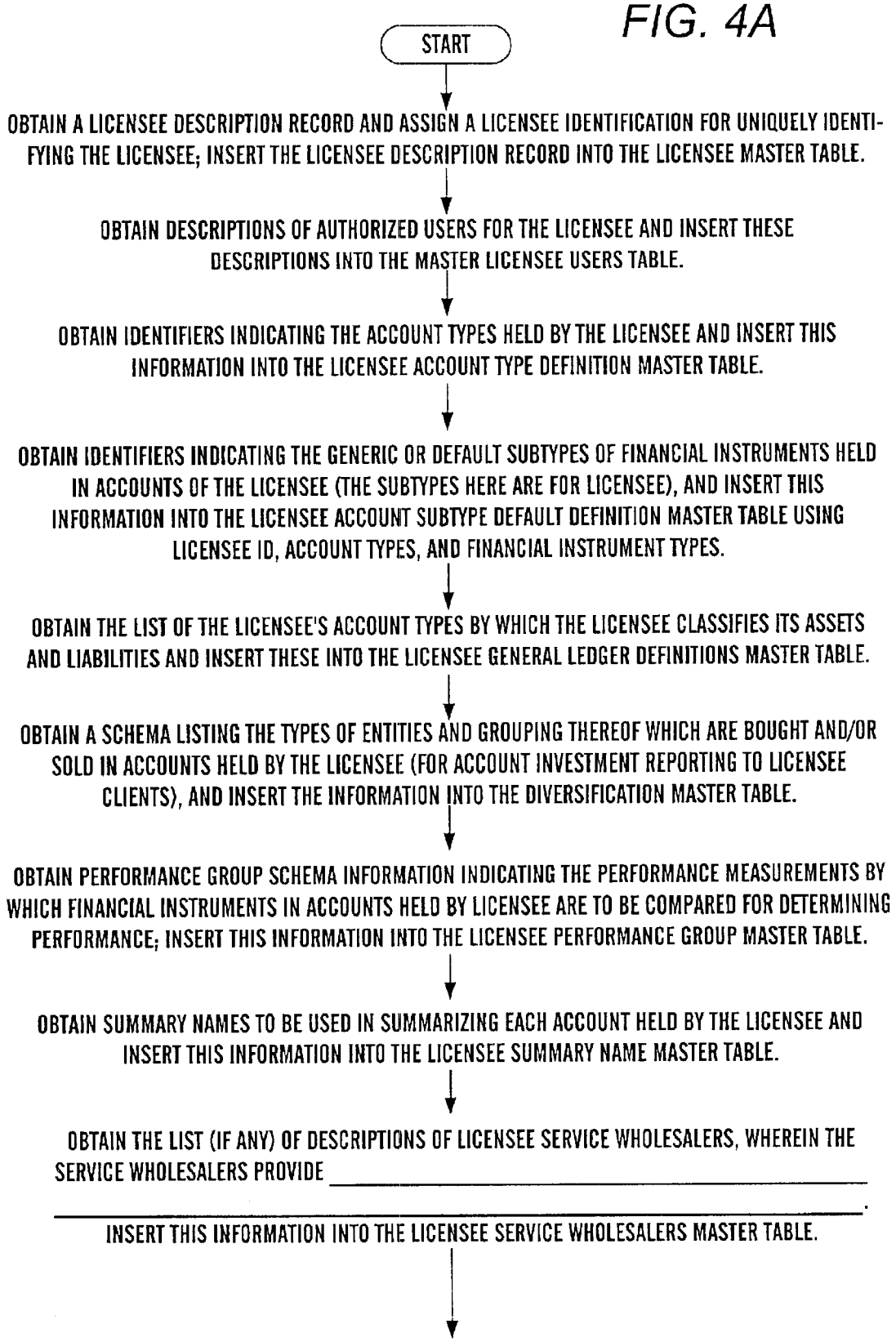
FIGS. 4-A through 4-E illustrate the steps of a flowchart for initializing the database tables of the present invention for a new business enterprise licensee that is to have its financial transactions subsequently processed by the present invention.

| N_gine File (or Table) Structure and Likely Order of Creation corresponding with FIGS. 4-A through 4-E | | |
|---|---|---|
| | | Data Source |
| Institutional Profile | | |
| LM | Licensee Master | User-Definable |
| LU | Licensee Users | User-Definable |
| LT | Licensee Account Type | User-Definable |
| LD | Licensee Default Definitions | User-Definable |
| LL | Licensee General Ledger Definitions | User-Definable |
| LS | Licensee Diversification Scheme | User-Definable |
| LP | Licensee Performance Group | User-Definable |
| LN | Licensee Summary Names | User-Definable |
| LW | Licensee Service Wholesalers | User-Definable |
| LR | Licensee Service Resellers | User-Definable |
| Customer Profile | | |
| AO | Account Objective | User-Definable |
| AL | Account Legal Capacity | User-Definable |
| AJ | Account Jurisdiction | User-Definable |
| AR | Account Representatives | User-Definable |
| AN | Account Registration Names | User-Definable |
| AM* | Account Master | User-Definable |
| AC | Account Communication Links | User-Definable |
| Transaction Profile | | |
| TM** | Transaction Master | User-Definable "Driving" File |
| TP* | Transaction Processor | User-Definable "Driving" File |
| TR | Transactions-Recurring | User-Definable "Driving" File |
| Entity Profile | | |
| EM | Entity Master | Public Market Data |
| EA* | Entity Attribute | User-Definable |
| ET | Entity Transaction | User-Definable |
| Licensee Status | | |
| SG* | System General Ledger | User-Definable |
| SJ* | System Transaction Journal | System Defined "Driven" File |
| ST | System Trade Settlement | System Defined "Driven" File |
| SS | System Summary Table | System Defined |
| SR | System Reject Table | System Defined |
| SC | System Transaction Count | System Defined |
| Customer Status | | |
| CS | Customer Income Statement (Income/Expense) | System Defined "Driven" File |
| CF | Customer Cash Flow (Receipts/Disbursements) | System Defined "Driven" File |
| CB* | Customer Balance Sheet | System Defined "Driven" File |
| CG | Customer Capital Gain | System Defined "Driven" File |
| CI | Customer Pending Income | System Defined "Driven" File |
| CA | Customer Pending Capital Adjustments | System Defined "Driven" File |
| CP* | Customer Performance Measurement | System Defined "Driven" File |

-continued

| N_gine File (or Table) Structure and Likely Order of Creation corresponding with FIGS. 4-A through 4-E |
|---|
| Data Source |

Notes:
*denotes Primary Control Tables
**denotes "Driving Tables"

| TABLE DATA DESCRIPTTONS WITH EXAMPLES |
|---|

(LM)  Licensee Master

Primary Data consisting of
        Licensee Identifier
        Licensee Description
    Trade Settlement Data consisting of
        Licensee Trade Settlement Switch
        Trade Offset Buy Identifier
        Trade Offset Sell Identifier
        Settle Offset Buy Identifier
        Settle Offset Sell Identifier
    +
    Other Details
    +
    Audit Fields consisting of Processing Model 1
        Add Date
        Add Sequence Number
        Add User Identifier
        Change Date
        Change Sequence Number
        Change User Identifier
        Delete Date
        Delete Sequence Number
        Delete User Identifier
        Number of Modifications
        Archive Status
        Archive Date Example:

| Licensee Identifier | Licensee Description | Other Licensee Address | Licensee City/State/ZIP |
|---|---|---|---|
| LICN1 | First Licensee Name | Main Street | Denver, CO |
| LICN2 | Second Licensee Name | Broadway | New York, NY |
| LICN3 | Third Licensee Name | Michigan Ave. | Chicago. IL |

(LU)  Licensee Users

Primary Data consisting of
        Licensee Identifier
        User Identifier
        User Description
    +
    Other Details
    +
    Audit Fields consisting of Processing Model 1
        Add Date
        Add Sequence Number
        Add User Identifier
        Change Date
        Change Sequence Number
        Change User Identifier
        Delete Date
        Delete Sequence Number
        Delete User Identifier
        Number of Modifications
        Archive Status
        Archive Date -continued

TABLE DATA DESCRIPTIONS WITH EXAMPLES

Example:

| Licensee Identifier | User Identifier | User Description | Other User Address | User City/State/ZIP |
|---|---|---|---|---|
| LICN1 | FUN | First User Name | Lincoln Ave | Denver, CO |
| LICN2 | SUN | Second User Name | Park Ave | New York, NY |
| LICN3 | TUN | Third User Name | Montgomery | San Francisco, CA |

(LT)   Licensee Account Type

Primary Data consisting of
        Licensee Identifier
        Account Type Identifier
        Account Type Description
    +
    Other Details
    +
    Audit Fields consisting of Processing Model 1
        Add Date
        Add Sequence Number
        Add User Identifier
        Change Date
        Change Sequence Number
        Change User Identifier
        Delete Date
        Delete Sequence Number
        Delete User Identifier
        Number of Modifications
        Archive Status
        Archive Date Example:

| Licensee Identifier | Account Type Number | Account Type Name |
|---|---|---|
| LICN1 | 100 | Pension Trust |
| LICN1 | 200 | Investment Advisory |
| LICN1 | 300 | Estates |
| LICN1 | 400 | Settlements - Buy |
| LICN1 | 500 | Settlements - Sell |
| LICN2 | 1000 | Wireless Communications |
| LICN2 | 2000 | Landline Communications |
| LICN2 | 3000 | Satellite Broadcast |
| LICN3 | 9000 | Domestic Subsidiary |
| LICN3 | 10000 | Foreign Subsidiary |

(LD)   Licensee Default Definitions

Primary Data consisting of
        Licensee Identifier
        Default Class
        Demand or Overdraft
        Accounting Control Number
        Accounting Control Number Description
        Cash Record Pointer in EA Table
    +
    Other Details
    +
    Audit Fields consisting of Processing Model 1
        Add Date
        Add Sequence Number
        Add User Identifier
        Change Date
        Change Sequence Number
        Change User Identifier
        Delete Date
        Delete Sequence Number
        Delete User Identifier
        Number of Modifications
        Archive Status
        Archive Date -continued

TABLE DATA DESCRIPTIONS WITH EXAMPLES

Example:

| Licensee Identifier | Class Iden | Sub-Class Iden | Accounting Control Number | Accounting Control Name |
|---|---|---|---|---|
| LICN1 | IC | D | A01 | Income Cash Demand |
| LICN1 | IC | O | A02 | Income Cash Overdraft |
| LICN1 | IC | D | A03 | Principal Cash Demand |
| LICN1 | IC | O | A04 | Principal Cash Overdraft |
| LICN1 | UI |   | L05 | Uninvested Income |
| LICN1 | UP |   | L10 | Uninvested Principal |
| LICN1 | II |   | L15 | Invested Income |
| LICN1 | IP |   | L20 | Invested Principal |

(LL) Licensee General Ledger Definition

Primary Data consisting of
        Licensee Identifier
        Asset or Liability
        Account Type Identifier
        Account Type Description
    +
    Other Details
    +
    Audit Fields consisting of Processing Model 1
        Add Date
        Add Sequence Number
        Add User Identifier
        Change Date
        Change Sequence Number
        Change User Identifier
        Delete Date
        Delete Sequence Number
        Delete User Identifier
        Number of Modifications
        Archive Status
        Archive Date
    (See Details Provided)

(LS) Licensee Diversification Scheme

Primary Data consisting of
        Licensee Identifier
        Diversification Type Identifier
        Diversification Group Identifier
        Diversification Class Identifier
        Diversification Description
    +
    Other Details
    +
    Audit Fields consisting of Processing Model 1
        Add Date
        Add Sequence Number
        Add User Identifier
        Change Date
        Change Sequence Number
        Change User Identifier
        Delete Date
        Delete Sequence Number
        Delete User Identifier
        Number of Modifications
        Archive Status
        Archive Date Example:

| Licensee Identifier | Diversification Class | Diversification Group | Diversification Class | Diversification Name |
|---|---|---|---|---|
| LICN1 | 100 | 000 | 000 | Money Market Instruments |
| LICN1 | 100 | 100 | 000 | US Govt Bills |
| LICN1 | 100 | 200 | 000 | US Govt Notes |
| LICN1 | 100 | 300 | 000 | Par Notes |
| LICN1 | 100 | 400 | 000 | Discount Notes |
| LICN1 | 200 | 000 | 000 | Fixed Income Securities |
| LICN1 | 200 | 100 | 000 | US Govt Bonds |
| LICN1 | 200 | 200 | 000 | Municipal Bonds |
| LICN1 | 200 | 300 | 000 | Corporate Bonds |

-continued

TABLE DATA DESCRIPTIONS WITH EXAMPLES

| | | | | |
|---|---|---|---|---|
| LICN1 | 200 | 400 | 000 | Bond Funds |
| LICN1 | 300 | 000 | 000 | Equities |
| LICN1 | 300 | 100 | 000 | Preferred Stock |
| LICN1 | 300 | 200 | 000 | Convertible Preferred |
| LICN1 | 300 | 300 | 000 | Common Stock |
| LICN1 | 300 | 300 | 100 | Automotive |
| LICN1 | 300 | 300 | 200 | Building |
| LICN1 | 300 | 300 | 300 | Chemical |
| LICN1 | 300 | 300 | 400 | Drug |
| LICN1 | 300 | 400 | 000 | Oil Partnerships |
| LICN1 | 300 | 500 | 000 | Real Estate Partnerships |
| LICN2 | 100 | 000 | 000 | Communication Services |
| LICN2 | 100 | 100 | 000 | Wireless Communication |
| LICN2 | 100 | 200 | 000 | Landline Communication |
| LICN2 | 100 | 300 | 000 | Direct Satellite |
| LICN3 | 100 | 100 | 000 | Cash |
| LICN3 | 100 | 200 | 000 | Other Current Assets |
| LICN3 | 100 | 300 | 000 | Fixed Assets |
| LICN3 | 100 | 400 | 000 | Depreciation |
| LICN3 | 100 | 500 | 000 | Other Tangible Assets |
| LICN3 | 100 | 600 | 000 | Other Intangible Assets |
| LICN3 | 100 | 700 | 000 | Current Liabilities |
| LICN3 | 100 | 800 | 000 | Deferred Taxes |
| LICN3 | 100 | 900 | 000 | Long-Term Debt |
| LICN3 | 100 | 1000 | 000 | Net Worth |

(LP)     Licensee Performance Group

Primary Data consisting of
         Licensee Identifier
         Performance Type Identifier
         Performance Group Identifier
         Performance Class Identifier
         Performance Description
     +
     Other Details
     +
     Audit Fields consisting of Processing Model 1
         Add Date
         Add Sequence Number
         Add User Identifier
         Change Date
         Change Sequence Number
         Change User Identifier
         Delete Date
         Delete Sequence Number
         Delete User Identifier
         Number of Modifications
         Archive Status
         Archive Date Example:

| Licensee Identifier | Perf Meas Type | Perf Meas Group | Perf Meas Class | Perf Meas Name |
|---|---|---|---|---|
| LICN1 | 100 | 000 | 000 | Money Market |
| LICN1 | 100 | 100 | 000 | US Notes |
| LICN1 | 100 | 100 | 9710 | Maturing October 1997 |
| LICN1 | 100 | 100 | 9711 | Maturing November 1997 |
| LICN1 | 100 | 200 | 000 | Par Notes |
| LICN1 | 100 | 200 | 9711 | Maturing November 1997 |
| LICN1 | 100 | 200 | 9712 | Maturing December 1997 |
| LICN1 | 200 | 000 | 000 | Municipal Bonds |
| LICN1 | 200 | AAA | 000 | Rated AAA |
| LICN1 | 200 | AAA | 9803 | Maturing March 1998 |
| LICN1 | 200 | AAA | 9806 | Maturing June 1998 |
| LICN1 | 300 | 000 | 000 | Common Stock |
| LICN1 | 300 | 100 | 000 | Durables |
| LICN1 | 300 | 100 | 100 | Autos |
| LICN1 | 300 | 100 | 200 | Appl |
| LICN1 | 300 | 200 | 000 | Consumer Goods |
| LICN1 | 300 | 200 | 100 | Food |
| LICN1 | 300 | 200 | 200 | Beverage |

-continued

TABLE DATA DESCRIPTIONS WITH EXAMPLES (LN) Licensee Summary Names

Primary Data consisting of
        Licensee Identifier
        Summary Type Identifier
        Summary Number
        Summary Description
        +
    Other Details
        +
    Audit Fields consisting of Processing Model 1
        Add Date
        Add Sequence Number
        Add User Identifier
        Change Date
        Change Sequence Number
        Change User Identifier
        Delete Date
        Delete Sequence Number
        Delete User Identifier
        Number of Modifications
        Archive Status
        Archive Date Example:

| Licensee Identifier | Type Code | Group Code | Class Code | Summary Item Name |
|---|---|---|---|---|
| LICN1 | I | 0001 | | Dividends - Ordinary |
| LICN1 | I | 0002 | | Dividends - Partially Tax-Exempt |
| LICN1 | I | 0003 | | Dividends - Tax-Free |
| LICN1 | E | 0001 | | Management Fees |
| LICN1 | E | 0004 | | Legal Expenses |
| LICN1 | R | 0001 | I | Dividends |
| LICN1 | R | 0002 | I | Interest - Net |
| LICN1 | R | 0007 | P | Principal Contributions |
| LICN1 | R | 0008 | P | Principal Sale Proceeds |
| LICN1 | D | 0001 | I | Management Fees |
| LICN1 | D | 0009 | P | Principal Disbursements |

(LW) Licensee Service Wholesalers

Primary Data consisting of
        Licensee Identifier
        Wholesaler Identifier
        Wholesaler Address
        Number of Calls
        Value of Call
        +
    Other Details
        +
    Audit Fields consisting of Processing Model 1
        Add Date
        Add Sequence Number
        Add User Identifier
        Change Date
        Change Sequence Number
        Change User Identifier
        Delete Date
        Delete Sequence Number
        Delete User Identifier
        Number of Modifications
        Archive Status
        Archive Date Example:

| Licensee Identifier | Wholesaler Identifier | Wholesaler Name | Wholesaler Address | City/State/ZIP Codes |
|---|---|---|---|---|
| LICN1 | ABCD | AB Cellular Dealer | 100 Main Street | Denver, CO |
| LICN1 | RSTU | RS Telephone Utility | 230 Broadway | NY, NY |

-continued

| TABLE DATA DESCRIPTTONS WITH EXAMPLES |
| --- |

(LR) Licensee Reseller

Licensee Identifier
        Wholesaler Identifier
        Reseller Identifier
        Reseller Address
        +
    Other Details
        +
    Audit Fields consisting of Processing Model 1
        Add Date
        Add Sequence Number
        Add User Identifier
        Change Date
        Change Sequence Number
        Change User Identifier
        Delete Date
        Delete Sequence Number
        Delete User Identifier
        Number of Modifications
        Archive Status
        Archive Date Example:

| Licensee Identifier | Wholesaler Identifier | Reseller Identifier | Reseller Name | Reseller Address | City/State/ZIP Codes |
| --- | --- | --- | --- | --- | --- |
| LICN1 | ABCD | 123 | 123 Reseller | 200 Oak | Tulsa, OK |
| LICN1 | ABCD | 234 | 234 Reseller | 500 Elm | Okla City, OK |
| LIGN1 | RSTU | 678 | 678 Reseller | 300 Pine | Fresno, CA |
| LICN1 | STUV | 789 | 789 Reseller | 700 Cedar | Pittsburgh, PA |

(AO) Account Objective

Primary Data consisting of
        Licensee Identifier
        Objective Identifier
        Objective Description
        +
    Other Details
        +
    Audit Fields consisting of Processing Model 1
        Add Date
        Add Sequence Number
        Add User Identifier
        Change Date
        Change Sequence Number
        Change User Identifier
        Delete Date
        Delete Sequence Number
        Delete User Identifier
        Number of Modifications
        Archive Status
        Archive Date Example:

| Licensee Identifier | Objective Identifier | Objective Name |
| --- | --- | --- |
| LICN1 | 0100 | Growth |
| LICN1 | 0200 | Income |
| LICN1 | 0300 | Growth with Income |
| LICN1 | 0400 | Capital Preservation |
| LICN1 | 0500 | High-Risk |

(AL) Account Legal Capacity

Primary Data consisting of
        Licensee Identifier
        Legal Capacity Identifier
        Legal Capacity Description
        +
    Other Details
        +
    Audit Fields consisting of Processing Model 1

TABLE DATA DESCRIPTIONS WITH EXAMPLES
-continued

Add Date
Add Sequence Number
Add User Identifier
Change Date
Change Sequence Number
Change User Identifier
Delete Date
Delete Sequence Number
Delete User Identifier
Number of Modifications
Archive Status
Archive Date Example:

| Licensee Identifier | Legal Capacity Number | Legal Capacity Name |
|---|---|---|
| LICN1 | 010 | Trustee |
| LICN1 | 020 | Broker |
| LICN1 | 030 | Advisor |
| LICN1 | 040 | Agent |
| LICN1 | 050 | Escrow |
| LICN1 | 060 | Executor |
| LICN1 | 070 | Administrator |

(AJ) Account Jurisdiction

Primary Data consisting of
        Licensee Identifier
        Jurisdiction Identifier
        Jurisdiction Description
    +
    Other Details
    +
    Audit Fields consisting of Processing Model 1
        Add Date
        Add Sequence Number
        Add User Identifier
        Change Date
        Change Sequence Number
        Change User Identifier
        Delete Date
        Delete Sequence Number
        Delete User Identifier
        Number of Modifications
        Archive Status
        Archive Date Example:

| Licensee Identifier | Jurisdiction Identifier | Jurisdiction Name |
|---|---|---|
| LICN1 | CA | California |
| LICN1 | PA | Pennsylvania |
| LICN1 | VI | Virgin Islands |
| LICN1 | NA | Netherlands Antilles |

(AR) Account Representative

Primary Data consisting of
        Licensee Identifier
        Account Representative Identifier
        Account Representative Name
    +
    Other Details
    +
    Audit Fields consisting of Processing Model 1
        Add Date
        Add Sequence Number
        Add User Identifier
        Change Date
        Change Sequence Number
        Change User Identifier
        Delete Date
        Delete Sequence Number -continued

TABLE DATA DESCRIPTTONS WITH EXAMPLES

Delete User Identifier
    Number of Modifications
    Archive Status
    Archive Date Example:

| Licensee Identifier | Representative Identifier | Representative Name |
|---|---|---|
| LICN1 | RR | Rhonda Red |
| LICN1 | WW | Wanda White |
| LICN1 | BB | Bill Brown |
| LICN1 | GG | Glenn Green |

(AN)    Account Registration Name

Primary Data consisting of
        Licensee Identifier
        Registration Identifier
        Registration Description
        +
    Other Details
        +
    Audit Fields consisting of Processing Model 1
        Add Date
        Add Sequence Number
        Add User Identifier
        Change Date
        Change Sequence Number
        Change User Identifier
        Delete Date
        Delete Sequence Number
        Delete User Identifier
        Number of Modifications
        Archive Status
        Archive Date Example:

| Licensee Identifier | Registration Identifier | Registration Name |
|---|---|---|
| LICN1 | AA | Able & Company |
| LICN1 | BB | Baker & Company |
| LICN1 | CC | Charlie & Company |

(AM)    Account Master

Primary Data consisting of
        Licensee Identifier
        Account Identifier
        Account Description
        Account Address
        Account Fiscal Year - MM
        Account Fiscal Year - DD
        Account Fiscal Year - Number of Periods
        Income Posting Code
        Account Type
        Account Objective
        Account Legal Capacity
        Account Jurisdiction
        Account Representative
        Account Registration Name
        Income / Expense Switch
        Receipts / Disbursement Switch
        Performance Measurement Switch
        Licensee Wholesaler
        Licensee Reseller
        Account Settlement Switch
        +
    Other Details
        +
    System Control Data consisting of
        Income Cash
        Principal Cash
        Invested Income

| TABLE DATA DESCRIPTTONS WITH EXAMPLES | | |
|---|---|---|
| | Invested Principal<br>Total Units - Assets<br>Liabilities<br>Total Units - Liabilities<br>+<br>Capital Gain Control Fields consisting of<br>    Total Units<br>    Total Cost Basis<br>System Control Fields consisting of<br>    Total Income<br>    Total Expense<br>    Total Receipts<br>    Total Disbursements<br>    +<br>Pending Income consisting of<br>    Total Units<br>    Total Cost Basis<br>    Total Pending Income<br>    +<br>Pending Cap Adj Out consisting of<br>    Cap Adj Out - Units<br>    Cap Adj Out - Cost Basis<br>    Cap Adj In - Units<br>    Cap Adj In - Cost Basis<br>    +<br>Audit Fields consisting of Processing Model 1<br>    Add Date<br>    Add Sequence Number<br>    Add User Identifier<br>    Change Date<br>    Change Sequence Number<br>    Change User Identifier<br>    Delete Date<br>    Delete Sequence Number<br>    Delete User Identifier<br>    Number of Modifications<br>    Archive Status<br>    Archive Date | |
| (AC) | Account Communication Links | |
| | Primary Data consisting of<br>    Account Identifier<br>    Communications Number<br>    +<br>Other Details<br>    +<br>Audit Fields consisting of Processing Model 1<br>    Add Date<br>    Add Sequence Number<br>    Add User Identifier<br>    Change Date<br>    Change Sequence Number<br>    Change User Identifier<br>    Delete Date<br>    Delete Sequence Number<br>    Delete User Identifier<br>    Number of Modifications<br>    Archive Status<br>    Archive Date | |

Example:

| Licensee<br>Identifier | Account<br>Identifier | Communications<br>Identifier |
|---|---|---|
| LICN1 | 123456 | ATI-001 |
| LICN1 | 123456 | TCI-345 |
| LICN1 | 234567 | US-West |
| LICN1 | 234567 | ATT-002 |
| LICN1 | 234567 | MCI |
| LICN1 | 456789 | Sprint |

| (TM) | Transaction Master |
|---|---|
| | Primary Data consisting of<br>    Licensee Identifier<br>    Transaction Identifier |

TABLE DATA DESCRIPTIONS WITH EXAMPLES
*-continued*

Income Posting Code
    Transaction Description
    Add or Subtract Switch
    Settlement Transaction Identifier
    Terminate Settlement Switch
    +
Other Details
    +
Audit Fields consisting of Processing Model 1
    Add Date
    Add Sequence Number
    Add User Identifier
    Change Date
    Change Sequence Number
    Change User Identifier
    Delete Date
    Delete Sequence Number
    Delete User Identifier
    Number of Modifications
    Archive Status
    Archive Date Example:

| Licensee Identifier | Transaction Identifier | Income Posting Code | Transaction Name |
|---|---|---|---|
| LICN1 | D01 | I | Paid Management Fee |
| LICN1 | D01 | I | Paid Management Fee |
| LICN1 | D01 | I | Paid Management Fee |
| LICN1 | SE | I | Sell Equity |
| LICN1 | SE | P | Sell Equity |
| LICN1 | SE | B | Sell Equity |
| LICN2 | D01 | P | Cellular Charge |
| LICN2 | D02 | P | Landline Charge |
| LICN2 | D03 | P | Direct Satellite Charge |
| LICN2 | D04 | P | America On-Line Charge |

(TP)    Transaction Processor

Primary Data consisting of
        Licensee Identifier
        Transaction Identifier
        Transaction Income Posting Code
        Transaction Process Description
    +
    Other Details
    +
    Audit Fields consisting of Processing Model 1
        Add Date
        Add Sequence Number
        Add User Identifier
        Change Date
        Change Sequence Number
        Change User Identifier
        Delete Date
        Delete Sequence Number
        Delete User Identifier
        Number of Modifications
        Archive Status
        Archive Date Example:

| Licensee Identifier Suffix | Transaction Identifier | Income Posting Code | Operator | Operand 1 | Operand 2 |
|---|---|---|---|---|---|

(TR)    Transactions - Recurring

Primary Data consisting of
        Licensee Identifier
        Account Identifier
        Transaction Identifier
        Transaction Amount
        Begin Paying
        End Paying

TABLE DATA DESCRIPTIONS WITH EXAMPLES
-continued

User Identifier
    +
Other Details
    +
Audit Fields consisting of Processing Model 1
    Add Date
    Add Sequence Number
    Add User Identifier
    Change Date
    Change Sequence Number
    Change User Identifier
    Delete Date
    Delete Sequence Number
    Delete User Identifier
    Number of Modifications
    Archive Status
    Archive Date Example:

| Licensee Identifier | Account Identifier | Transaction Identifier | Transaction Amount | Begin Date | End Date | User Identifier |
|---|---|---|---|---|---|---|

(EM)   Entity Master

Primary Data consisting of
    Entity Identifier
    Entity Description
    Asset or Liability Code
    Settlement Days
    +
Income Collection Data consisting of
    Income Rate
    Income Ex-Date
    Income Record Date
    Income Payment Date
    +
Capital Adjustment Data consisting of
    Capital Adjustment Rate
    Capital Adjustment Ex-Date
    Capital Adjustment Record Date
    Capital Adjustment Payment Date
    Capital Adjustment New Entity
    +
Other Details
    +
Audit Fields consisting of Processing Model 1
    Add Date
    Add Sequence Number
    Add User Identifier
    Change Date
    Change Sequence Number
    Change User Identifier
    Delete Date
    Delete Sequence Number
    Delete User Identifier
    Number of Modifications
    Archive Status
    Archive Date (EA)   Entity Attribute Primary Data consisting of
    Licensee Identifier
    Entity Identifier
    +
Management Decision-Making Data consisting of
    Diversification Type
    Diversification Group
    Diversification Class
    +
Performance Measurement Data consisting of
    Performance Type
    Performance Group
    Performance Class
    +
Accounting Data consisting of
    Accounting Control Number - Asset

TABLE DATA DESCRIPTIONS WITH EXAMPLES

-continued

Accounting Control Number - Liability
        +
    System Control Data consisting of
        Invested Income
        Invested Principal
        Total Units - Assets
        Liabilities
        Total Units - Liabilities
        +
    Settlement Data consisting of
        Buy - In Units
        Buy - Out Cost Basis
        Sell - In Proceeds
        Sell - Out Units
        +
    Other Details
        +
    Audit Fields consisting of Processing Model 1
        Add Date
        Add Sequence Number
        Add User Identifier
        Change Date
        Change Sequence Number
        Change User Identifier
        Delete Date
        Delete Sequence Number
        Delete User Identifier
        Number of Modifications
        Archive Status
        Archive Date (ET)    Entity Transaction Primary Data consisting of
        Licensee Identifier
        Entity Identifier
        Transaction Identifier
        +
    Other Details
        +
    Audit Fields consisting of Processing Model 1
        Add Date
        Add Sequence Number
        Add User Identifier
        Change Date
        Change Sequence Number
        Change User Identifier
        Delete Date
        Delete Sequence Number
        Delete User Identifier
        Number of Modifications
        Archive Status
        Archive Date Example:

| Licensee Identifier | Entity Identifier | Transaction Identifier |
| --- | --- | --- |
| LICN1 | GM | BE |
| LICN1 | GM | XO |
| LICN1 | GM | XI |

(SG)    System General Ledger

Primary Data consisting of
    Licensee Identifier
    +
    Control Fields consisting of
        Asset or Liability
        Account Type Identifier
        Accounting Control Number
        Account Balance
        +
    Other Details
        +
    Audit Fields consisting of Processing Model 1
        Add Date

TABLE DATA DESCRIPTIONS WITH EXAMPLES -continued

Add Sequence Number
    Add User Identifier
    Change Date
    Change Sequence Number
    Change User Identifier
    Delete Date
    Delete Sequence Number
    Delete User Identifier
    Number of Modifications
    Archive Status
    Archive Date Example:

(See Details provided)

(SJ)    System Transaction Journal

Primary Data consisting of
    Licensee Identifier
    Account Identifier
    Transaction Identifier and either

| Buys / Sells | | Debits / Credits |
|---|---|---|
| Entity Identifier | | Entity Identifier (if any) |
| Purchase Date | | Principal |
| Amount Units | or | Income |
| Net Amount | | Net Amount |
| Cost Basis (if Sell) | | |

+
Other Details
    +
Currency Fields consisting of
    Currency Rate
    Currency From
    Currency To
    Currency Date
    +
Sell Data consisting of
    Sell Date
    Sell Price
    Sell Proceeds
    Sell Transaction Date
    Sell Transaction Sequence Number
    Sell Transaction Lot
    Sell To
    Capital Gain Amount
    Capital Gain Period
    +
Sell Currency Data consisting of
    Sell Currency Rate
    Sell Currency From
    Sell Currency To
    Sell Currency Date
    +
Audit Fields consisting of Processing Model 2
    Transaction Date
    Transaction Sequence Number
    Transaction Lot
    Reversing Transaction Date
    Reversing Sequence Number
    Reversing Transaction Lot
    Reversed By Transaction Date
    Reversed By Transaction Sequence Number
    Reversed By Transaction Lot
    Trade Date
    Archive Status
    Archive Date (ST)    System Trade Settlement Primary Data consisting of
    Licensee Identifier
    Account Identifier
    Entity Identifier
    Purchase Date
    Amount Units
    Cost Basis

TABLE DATA DESCRIPTIONS WITH EXAMPLES

Buyer / Seller
        Trade Settlement Date
        +
    Currency Fields consisting of
        Currency Ratio
        Currency From
        Currency To
        Currency Date
        +
    Other Details
        +
        Transaction Date
        Transaction Sequence Number
        Transaction Lot
        +
    Audit Data consisting of
        Add Date
        Add User Identifier
        Archive Status
        Archive Date (SS)    System Summary Table Primary Data consisting of
        Licensee Identifier
        Job Number
        Job Name
        Begin Time
        End Time
        Number of Accepts
        Number of Rejects
        Total Items
        +
    Audit Data consisting of
        Add Date
        Add User Identifier
        Archive Status
        Archive Date Example:

| Licensee Identifier | Job Number | Job Name | Begin Time | End Time | Total Transactions | Number Accepts | Number Rejects |
|---|---|---|---|---|---|---|---|

(SR)    System Reject Table

Primary Data consisting of
        Licensee Identifier
        Licensee Record
        +
    Audit Data consisting of
        Add Date
        Add User Identifier
        Archive Status
        Archive Date Example:

| License Identifier | Transaction Record |
|---|---|

(SC)    System Transaction Count

Primary Data consisting of
        Licensee Identifier
        Today's Date
        Transaction Identifier
        Transaction Count - Originate
        Transaction Count - Reversal
        +
    Audit Data consisting of
        Add Date
        Add User Identifier
        Archive Status
        Archive Date -continued

TABLE DATA DESCRIPTIONS WITH EXAMPLES

Example:

| License Identifier | Transaction Identifier | Transaction Identifier | Transaction Count - Orig | Transaction Count - Rev |
|---|---|---|---|---|

(CS) Customer Income Statement (Income / Expense)

Primary Data consisting of
        Licensee Identifier
        Account Identifier
        Fiscal Year - YYYY
        Fiscal Year - Period
        Income / Expense
        Income / Expense Number
        Income / Expense Balance
        +
    Audit Fields consisting of
        Add Date
        Add User Identifier
        Archive Status
        Archive Date Example:

| Licensee Identifier | Account Identifier | Fiscal Year | Fiscal Period | Inc / Exp Identifier | Inc / Exp Number | Inc / Exp Balance |
|---|---|---|---|---|---|---|
| LICN1 | | | | | | |

(CF) Customer Cash Flow (Receipts / Disbursements)

Primary Data consisting of
        Licensee Identifier
        Account Identifier
        Fiscal Year - YYYY
        Fiscal Year - Period
        Receipt / Disbursement
        Receipt / Disbursement Number
        Receipt / Disbursement Balance
        +
    Audit Fields consisting of
        Add Date
        Add User Identifier
        Archive Status
        Archive Date Example:

| Licensee Identifier | Account Identifier | Fiscal Year | Fiscal Period | Rec / Dis Identifier | Rec / Dis Number | Rec / Dis Balance |
|---|---|---|---|---|---|---|
| LICN1 | | | | | | |

(CB) Customer Balance Sheet

Primary Data consisting of
        Licensee Identifier
        Account Identifier
        Entity Identifier
        Purchase Date
        Amount Units
        Cost Basis
        +
    Currency Data consisting of
        Currency Rate
        Currency From
        Currency To
        Currency Date
        +
    Other Details
        +
    Transaction Identification consisting of
        Transaction Date
        Transaction Sequence Number
        Transaction Lot
        +
    Audit Fields consisting of -continued

TABLE DATA DESCRIPTIONS WITH EXAMPLES

Add Date
   Add User Identifier
   Archive Status
   Archive Date
(CG) Customer Capital Gains Primary Data consisting of
   Licensee Identifier
   Account Identifier
   Entity Identifier
   Purchase Date
   Amount Units
   Cost Basis
   Purchase Price
   Buy From
   +
  Transaction Identification consisting of
   Transaction Date
   Transaction Sequence Number
   Transaction Lot
   +
  Buy Currency Fields consisting of
   Current Rate
   Currency From
   Currency To
   Currency Date
   +
  Sell Data consisting of
   Sell Date
   Sell Price
   Sell Proceeds
   Sell Transaction Date
   Sell Transaction Sequence Number
   Sell Transaction Lot
   Sell To
   Capital Gain Amount
   Capital Gain Period
   +
  Sell Currency Data consisting of
   Sell Currency Rate
   Sell Currency From
   Sell Currency To
   Sell Currency Date
   +
  Audit Fields consisting of
   Add Date
   Add User Identifier
   Archive Status
   Archive Date
(CI) Customer Pending Income Primary Data consisting of
   Licensee Identifier
   Account Identifier
   Entity Identifier
   Purchase Date
   Amount Units
   Cost Basis
   Purchase Price
   +
  Transaction Identification consisting of
   Transaction Date
   Transaction Sequence Number
   Transaction Lot
   +
  Payment Date Data consisting of
   Income - Ex-Date
   Income - Record Date
   Income - Payment Date
   +
  Audit Fields consisting of
   Add Date
   Add User Identifier
   Archive Status
   Archive Date -continued

TABLE DATA DESCRIPTIONS WITH EXAMPLES (CA) Pending Capital Adjustment

Primary Data consisting of
        Licensee Identifier
        Account Identifier
        +
    Pending Out Data consisting of
        Entity Identifier (Old Entity)
        Purchase Date
        Transaction Identifier (Exchange Out)
        Amount Units (Old Amount)
        Cost Basis
        Purchase Price
        +
    Transaction Identification consisting of
        Transaction Date
        Transaction Sequence Number
        Transaction Lot
        +
    Pending In Data consisting of
        Transaction Identifier (Exchange In)
        Entity Identifier (New Entity)
        Amount Units (New Amount)
        +
    Payment Date Data consisting of
        Capital Adjustment - Ex-Date
        Capital Adjustment - Record Date
        Capital Adjustment - Payment Date
        +
    Audit Fields consisting of
        Add Date
        Add User Identifier
        Archive Status
        Archive Date (CP) Customer Performance Measurement Primary Data consisting of
        Licensee Identifier
        Account Identifier
        Fiscal Year - YYYY
        Fiscal Year - Period
        Performance Measurement - Type
        Performance Measurement - Group
        Performance Measurement - Class
        Beginning Value
        Beginning Units
        Contributions
        Distributions
        Income
        Expenses
        Management Fees
        Commissions
        Federal Taxes
        State Taxes
        Local Taxes
        Ending Value
        Ending Units
        Ending Net Asset Value
        +
    Capital Gain Control Fields consisting of
        Total Units
        Total Cost Basis
    System Control Fields consisting of
        Total Income
        Total Expense
        Total Receipts
        Total Disbursements
        +
    Pending Income consisting of
        Total Units
        Total Cost Basis
        Total Pending Income
        +
    Pending Cap Adj Out consisting of
        Cap Adj Out - Units
        Cap Adj Out - Cost Basis
        Cap Adj In - Units

TABLE DATA DESCRIPTIONS WITH EXAMPLES

Cap Adj In - Cost Basis
+
Audit Fields consisting of
   Add Date
   Add User Identifier
   Archive Status
   Archive Date

SAMPLE DATA FOR LICENSE GENERAL LEDGER DEFINITION TABLE (LL)

| Licensee Identifier | Asset or Liab | Accounting Control Number | Accounting Name |
|---|---|---|---|
| LICN1 | A | A05 | Municipal Bonds |
| LICN1 | A | A07 | Corporate Bonds |
| LICN1 | A | A10 | Common Stocks |
| LICN1 | A | A12 | Mutual Funds |
| LICN1 | A | A13 | International Currencies |
| LICN1 | A | A15 | Oil Partnerships |
| LICN1 | A | A20 | Real Estate Partnerships |
| LICN1 | A | A30 | Foreign Equities |
| LICN1 | A | A35 | Objects of Art |
| LICN1 | A | A40 | Jewelry |
| LICN1 | A | A45 | Homes |
| LICN | A | A50 | Automobiles |
| LICN | A | A90 | Derivatives |
| LICN2 | A | W10 | MSA/RSA-North |
| LICN2 | A | W20 | MSA/RSA-East |
| LICN2 | A | W30 | MSA/RSA-South |
| LICN2 | A | W40 | MSA/RSA-West |
| LICN2 | A | L10 | Alabama |
| LICN2 | A | L20 | Alaska |
| • | • | • | • |
| • | • | • | • |
| • | • | • | • |
| LICN2 | A | L500 | Wyoming |
| LICN2 | A | S10 | Major Market 1 |
| LICN2 | A | S20 | Major Market 2 |
| LICN2 | A | S30 | Major Market 3 |
| • | | • | • |
| • | | • | • |
| • | | • | • |
| LICN2 | A | S1000 | Major Market N |
| LICN3 | A | C10 | Cash |
| LICN3 | A | C20 | Other Current Assets |
| LICN3 | A | C30 | Fixed Assets |
| LICN3 | A | C40 | Depreciation |
| LICN3 | A | C50 | Intangible Assets |
| LICN1 | L | L05 | Uninvested Income |
| LICN1 | L | L10 | Invested Income |
| LICN1 | L | L15 | Uninvested Principal |
| LICN1 | L | L20 | Invested Principal |
| LICN1 | L | L30 | Personal Notes |
| LICN1 | L | L40 | Mortgages |
| LICN1 | L | L90 | Income |
| LICN1 | L | L60 | Short-Term Liabilities |
| LICN1 | L | L65 | Deferred Taxes |
| LICN1 | L | L70 | Long-Term Liabilities |
| LICN1 | L | L75 | Net Worth |

SAMPLE DATA FOR SYSTEM GENERAL LEDGER TABLE

| Licensee Master | Asset or Liab | Account Type | Accounting Control Number | Accounting Name |
|---|---|---|---|---|
| LICN1 | A | 000 | 000 | Financial Services Assets |
| LICN1 | A | 100 | 000 | Pension Trust |
| LICN1 | A | 100 | A01 | Income Cash Demand |
| LICN1 | A | 100 | A02 | Income Cash Overdraft |
| LICN1 | A | 100 | A03 | Principal Cash Demand |
| LICN1 | A | 100 | A04 | Principal Cash Overdraft |
| LICN1 | A | 100 | A07 | Corporate Bonds |
| LICN1 | A | 100 | A10 | Common Stocks |
| LICN1 | A | 100 | A15 | Oil Partnerships |
| LICN1 | A | 100 | A20 | Real Estate Partnerships |
| LICN1 | A | 100 | A30 | Foreign Equities |
| LICN1 | A | 200 | 000 | Investment Advisory |
| LICN1 | A | 200 | A01 | Income Cash Demand |
| LICN1 | A | 200 | A02 | Income Cash Overdraft |
| LICN1 | A | 200 | A03 | Principal Cash Demand |
| LICN1 | A | 200 | A04 | Principal Cash Overdraft |
| LICN1 | A | 200 | A05 | Municipal Bonds |
| LICN1 | A | 200 | A07 | Municipal Bonds |
| LICN1 | A | 200 | A10 | Coommon Stocks |
| LICN1 | A | 200 | A12 | Mutual Funds |
| LICN1 | A | 200 | A13 | International Currencies |
| LICN1 | A | 200 | A15 | Oil Partnerships |
| LICN1 | A | 200 | A20 | Real Estate Partnerships |
| LICN1 | A | 100 | A30 | Foreign Equities |
| LICN1 | A | 100 | A90 | Financial Derivatives |
| LICN1 | A | 300 | 000 | Estates |
| LICN1 | A | 300 | A01 | Income Cash Demand |
| LICN1 | A | 300 | A02 | Income Cash Overdraft |
| LICN1 | A | 300 | A03 | Principal Cash Demand |
| LICN1 | A | 300 | A04 | Principal Cash Overdraft |
| LICN1 | A | 300 | A05 | Municipal Bonds |
| LICN1 | A | 300 | A07 | Corporate Bonds |
| LICN1 | A | 300 | A10 | Common Stocks |
| LICN1 | A | 300 | A12 | Mutual Funds |
| LICN1 | A | 300 | A15 | Oil Partnerships |
| LICN1 | A | 300 | A20 | Real Estate Partnerships |
| LICN1 | A | 300 | A30 | Foreign Equities |
| LICN1 | A | 300 | A35 | Objects of Art |
| LICN1 | A | 300 | A40 | Jewelry |
| LICN1 | A | 300 | A40 | Homes |
| LICN1 | A | 300 | A50 | Automobiles |
| LICN1 | A | 400 | 000 | Settlement Accounts-Buy |
| LICN1 | A | 400 | A01 | Income Cash Demand |

-continued

| | | | | |
|---|---|---|---|---|
| LICN1 | A | 400 | A02 | Income Cash Overdraft |
| LICN1 | A | 400 | A03 | Principal Cash Demand |
| LICN1 | A | 400 | A04 | Principal Cash Overdraft |
| LICN1 | A | 400 | A05 | Corporate Bonds |
| LICN1 | A | 400 | A07 | Municipal Bonds |
| LICN1 | A | 400 | A10 | Common Stocks |
| LICN1 | A | 400 | A15 | Oil Partnerships |
| LICN1 | A | 400 | A20 | Real Estate Partnerships |
| LICN1 | A | 400 | A30 | Foreign Equities |
| LICN1 | A | 500 | 000 | Settlement Accounts-Sell |
| LICN1 | A | 500 | A01 | Income Cash Demand |
| LICN1 | A | 500 | A02 | Income Cash Overdraft |
| LICN1 | A | 500 | A03 | Principal Cash Demand |
| LICN1 | A | 500 | A04 | Principal Cash Overdraft |
| LICN1 | A | 500 | A05 | Corporate Bonds |
| LICN1 | A | 500 | A07 | Municipal Bonds |
| LICN1 | A | 500 | A10 | Common Stocks |
| LICN1 | A | 500 | A15 | Oil Partnerships |
| LICN1 | A | 500 | A20 | Real Estate Partnerships |
| LICN1 | A | 500 | A30 (AND/OR) | Foreign Equities |
| LICN2 | A | 1000 | 000 | Communication Assets |
| LICN2 | A | 1000 | W00 | Wireless Communications |
| LICN2 | A | 1000 | W10 | MSA/RSA-North |
| LICN2 | A | 1000 | W20 | MSA/RSA-East |
| LICN2 | A | 1000 | W30 | MSA/RSA-South |
| LICN2 | A | 1000 | W40 | MSA/RSA-West |
| LICN2 | A | 2000 | L00 | Landline Communications |
| LICN2 | A | 2000 | L10 | Alabama |
| LICN2 | A | 2000 | L20 | Alaska |
| . | | | | . |
| . | | | | . |
| . | | | | . |
| LICN2 | A | 2000 | L500 | Wyoming |
| LICN2 | A | 3000 | S00 | Satellite Broadcast |
| LICN2 | A | 3000 | S10 | Major Market 1 |
| LICN2 | A | 3000 | S20 | Major Market 2 |
| LICN2 | A | 3000 | S30 | Major Market 3 |
| . | | | | . |
| . | | | | . |
| . | | | | . |
| LICN2 | A | 3000 | S1000 (AND/OR) | Major Market 4 |
| LICN3 | A | 0000 | S1000 | Corporate Assets |
| LICN3 | A | 9000 | 000 | Domestic Subsidiary |
| LICN3 | A | 9000 | C10 | Cash |
| LICN3 | A | 9000 | C20 | Other Current Assets |
| LICN3 | A | 9000 | C30 | Fixed Assets |
| LICN3 | A | 9000 | C40 | Depreciation |
| LICN3 | A | 9000 | C50 | Intangible Assets |
| LICN3 | A | 9000 | 000 | Foreign Subsidiary |
| LICN3 | A | 9000 | C10 | Cash |
| LICN3 | A | 9000 | C20 | Other Current Assets |
| LICN3 | A | 9000 | C30 | Fixed Assets |
| LICN3 | A | 9000 | C40 | Depreciation |
| LICN3 | A | 9000 | C50 | Intangible Assets |
| LICN1 | L | 000 | 000 | Financial Services Liabilities |
| LICN1 | L | 100 | 000 | Pension Trust |
| LICN1 | L | 100 | L15 | Uninvested Principal |
| LICN1 | L | 100 | L20 | Invested Principal |
| LICN1 | L | 200 | 000 | Investment Advisory |
| LICN1 | L | 200 | L05 | Uninvested Income |
| LICN1 | L | 200 | L10 | Invested Income |
| LICN1 | L | 200 | L15 | Uninvested Principal |
| LICN1 | L | 200 | L20 | Invested Principal |
| LICN1 | L | 300 | 000 | Estates |
| LICN1 | L | 300 | L05 | Uninvested Income |
| LICN1 | L | 300 | L10 | Invested Income |
| LICN1 | L | 300 | L15 | Uninvested Principal |
| LICN1 | L | 300 | L20 | Invested Principal |
| LICN1 | L | 300 | L30 | Personal Notes |
| LICN1 | L | 300 | L40 | Mortgages |
| LICN1 | L | 400 | 000 | Settlement-Buy |
| LICN1 | L | 400 | L15 | Uninvested Principal |
| LICN1 | L | 400 | L20 | Invested Principal |
| LICN1 | L | 500 | 000 | Settlement-Buy |
| LICN1 | L | 500 | L15 | Uninvested Principal |
| LICNI | L | 500 | L20 (AND/OR) | Invested Principal |
| LICN2 | L | 1000 | 000 | Communications |
| LICN2 | L | 1000 | 000 | Wireless |
| LICN2 | L | 1000 | L90 | Income |
| LICN2 | L | 2000 | 000 | Landline |
| LICN2 | L | 2000 | L90 | Income |
| LICN2 | L | 3000 | 000 | Satellite Broadcast |
| LICN2 | L | 3000 | L90 (AND/OR) | Income |
| LICN3 | L | 9000 | 000 | Domestic Subsidiary |
| LICN3 | L | 9000 | L60 | Short-Term Liabilities |
| LICN3 | L | 9000 | L65 | Deferred Taxes |
| LICN3 | L | 9000 | L70 | Long-Term Liabilities |
| LICN3 | L | 9000 | L75 | Net Worth |
| LICN3 | L | 9000 | 000 | Foreign Subsidiary |
| LICN3 | L | 9000 | L60 | Short-Term Liabilities |
| LICN3 | L | 9000 | L65 | Deferred Taxes |
| LICN3 | L | 9000 | L70 | Long-Term Liabilities |
| LICN3 | L | 9000 | L75 | Net Worth |

A Standardized Method for Naming the Programs (or SQL Scripts) and Data Elements of Real-time Multiprocessed Automated Applications The specific invention is a standardized file naming convention to be used in the automatic generation of program code for multiple large-scale transaction processing applications (such as securities trading, telecommunications billing, and work management) on multi-processing computers (using 4, 8, 16, 32 processors) with 100% auditability of user-defined controls. The standardized file naming convention is totally independent of any specific a.) application such as accounts receivable, customer billing, etc., b.) industry such as financial services, telecommunications, or work management, c.) hardware manufacturer such as Compaq, Digital, HP, IBM, NCR, Unisys, d.) operating system such as MS-DOS, UNIX, OpenVMS, MVS, etc., e.) relational database management system such as Oracle, Sybase, MS-SQL Server, f.) computer language such as SQL, COBOL, Fortran, PL/1, etc.

The standard naming convention contains the fewest number of characters in any naming conventions; namely, eleven characters used by MS-DOS. The naming convention of MS-DOS uses eight characters as a file name and three characters as a file extension wherein the user may define a file name using the alphabet and selected other characters. While this flexibility is suitable for home use are a small number of files and users, it is not acceptable for large-scale enterprise-wide applications with large number of files and large number of supporting technicians. Hence, the need for enterprise-wide-standards.

The standard file naming convention contains six elements that permit the technician to readily identify the functionality of the specific script (or program) without looking at its contents. Using ANSI Standard structured Query Language as an example language, the six elements are:

a.) a 2-character mnemonic for the SQL commands such as:

| Mnemonic | ANSI Standard SOL Commands |
|---|---|
| CT | Create Table |
| SF | Select From Table |
| DF | Delete From |
| DT | Drop Table |
| II | Insert Into |
| SI | Select Into |
| CS | Create Sequence |
| DS | Drop Sequence |
| CI | Create Index |
| DI | Drop Index |
| RV | Review |
| RT | Retest |
| RS | Reset, etc. | b.) a 2-character mnemonic for the application name such as Mnemonic User Defined Application Name Examples

| ST | Securities Trading |
|---|---|
| TC | Telecommunications Billing |
| WM | Work Management, etc. | c.) a 2-character mnemonic for the table (or file name) such as
Mnemonic User-Defined Table Name Examples

| AM | Account Master Name/Address/Etc. |
|---|---|
| SM | Securities Master |
| DC | Detail Calls |
| XB | External Billing, etc. | d.) a 1-character mnemonic for the table-cluster role such as Mnemonic Standard Table Roles

| M | Master |
|---|---|
| I | Input |
| A | Accepts |
| R | Rejects |
| H | History |
| S | Summary |
| 1 | Master History |
| 2 | Accepts History |
| 0 | Output | e.) a 1-character mnemonic for the table cluster type such as Mnemonic Standard Table Types

| M | Master |
|---|---|
| J | Journal |
| T | Temporary |
| 1–9 | Index Numbers | f.) a 3-character extension is then added to the file name depending upon
the type of operating system being used such as MS-DOS, UNIX, OpenVMS, etc. and
whether or not the file is a source file for programmer use or a compiled file (or stored procedure) for machine use.

Hence, script name examples are:

CTXBMDMM.SQL—Create Table for the External Billing System, Master Definition Table Cluster, Master Table, and Master Role for SQL use.

DTXBDCOJ.SQL—Drop Table for the External Billing System, Detail Call Cluster, Output Table, and Journal Role for SQL use.

Circumstances Leading to the Invention

The circumstances leading to the invention of a standard SQL script naming convention are:

a.) one programmer will rarely adhere to the same naming conventions over time and unless an acceptable standard is defined each succeeding programmer added to the job will only complicate the issue by bringing their own standards. Hence, software maintenance becomes a matter of knowing which programmer wrote which program at what time.

b.) without a naming standard any programmer has no idea of what functions the programming is performing without opening the program and examining the program code. This process produces create inefficient maintenance by existing programmers and inefficient training for new programmers.

c.) Competitive pressures are mounting for the efficient of software maintenance.

Advantage of the Invention

Because no duplicate script names are permitted the name of each SQL Script should a.) convey to the user the precise use of each SQL Script and b.) permit the storage of all SQL scripts in a one SQL Script Library, or directory.

A standard naming convention also permits the user to determine what scripts may be automatically executed in sequence by use of a SQL command script, which is a single SQL script containing a list of SQL scripts to be executed in requence. Hence, any single SQL scripts contained in the SQL Library-can be reused in many different SQL command scripts.

Although any standard naming convention represents a unique entity separate and apart from the other technologies described immediately above, this particular naming convention is unique in that it embraces all of the logical information necessary to readily identify the role of the script in the total system.

Detailed Description of Invention:

std_name is a standard naming convention that constructs names for programs (or SQL Scripts), system tables, table clusters, and data elements. The seven basic elements are:

| 1.) | org_name | Organization | 2 |
|---|---|---|---|
| 2.) | com_name | SQL Command | 2 |
| 3.) | app_name | Application | 2 |
| 4.) | tab_name | Table | 2 |
| 5.) | rol_name | Table Role | 1 |
| 6.) | typ_name | Table Type | 1 |
| 7.) | col_name | Column (or Field) | 4 | std_name defines both "external" names used by the operating system and "internal" names used by the specific program.

The "external" resulting names are:

| | | | |
|---|---|---|---|
| 1.) | clu_name | Cluster Name | 4 |
| 2.) | sys_name | System Table Name | 6 |
| 3.) | ext_name | Extension Name | 3 |
| 4.) | sql_name | SQL Script Name | 11 (8 name plus 3 extension) | where the SQL Script Names are used by the operating systems.

The "internal" resulting names are:

| | | | |
|---|---|---|---|
| 1.) | tab_iden | Table Iden Name | 4 |
| 2.) | col_name | Column (or Field) Name | 4 |
| 3.) | dat_name | Data Element Name | 8 or more, in increments of 4 | where the Data Element Names are used by the programs (or SQL Scripts).

External Names used by the operating system in identifying programs (or SQL Scripts) rare created by employing the following naming components:

```
com_name       SQL Command Mnemonic
   app_name       Application Name Mnemonic
      tab_name       Table Name Mnemonic
         rol_name       Table Role Name Mnemonic
            tab_name       Table Type Name Mnemonic
               ext_name       Extension Mnemonic
```

```
             1   2   3   4   5   6   7   8   .   9   10  11
Examples:    C   T   X   B   M   D   M   M   .   S   Q   L
             S   F   X   B   M   D   M   M   .   S   Q   L
                     clu_name
                             tab_iden
                     sys_name        ext_name
                     sql_name
```

Internal Names used by the program (or SQL Script) in processing the data elements are created by employing the following naming components:

```
                  5   6   7   8
                  tab_name   Table Name Mnemonic
                     rol_name   Role Name Mnemonic
                        typ_name   Type Name Mnemonic
                           col_name   Column Name
Examples:   M   D   M   M   LNAM    ...   for last name
            M   D   M   M   FNAM    ...   for first name
            M   D   M   N   MNAM    ...   for middle name
            M   D   M   M   ADR1    ...   address-1st line
            M   D   M   M   ADR2    ...   address-2cd line
            M   D   M   M   CITY    ...   city
            M   D   M   M   STAT    ...   state
            M   D   M   M   ZIPC    ...   zip code
            dat_name
```

Data Tracing

By addressing both the external names for the operating system and the internal names for a specific program, the naming convention is global in nature. In the event that one data element derives its source of input from another table rather than its own specific input screen, then the data name is extended by placing the table identifier of the table supplying the data between the first four and second four characters of the intended data name. Should the data be derived from another table that also derived its data from another table, then eight characters are placed between the first four characters and the last four characters of the intended data name. In the fashion, the data name points backwards through all of the preceding tables to the original source of data and its input form. This process is called "data tracing", and it provides benefits to programmers in the testing and debugging stages of software development by identifying the original source of data. Thus, "data tracing" provides the programmer with thorough documentation of the data flow throughout an entire system.

Standard naming conventions do not apply to certain language extensions such as the script footings that, for example, specify the size of the table to be created in a "Create Table" script.

The foregoing discussion of the invention has been presented for purposes of illustration and description. Further, comments and description is not intended to limit the invention to the form disclosed herein. Consequently, variation and modification commensurate with the above teachings, and within the skill and knowledge of the relevant art, are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for processing financial transactions of an enterprise on a multiprocessing machine having a plurality of processors, each financial transaction having financial transaction data, the method comprising:

defining a set of user-defined financial reports that identifies a financial status of the enterprise, each financial report comprising one or more data records;

defining a set of user-defined financial transaction types;

associating each financial transaction processed by the enterprise in a fiscal year with one of the set of user-defined financial transaction types;

creating a transaction processing table that associates with each user-defined financial transaction type a unique plurality of user-defined algorithms. (1) each user-defined algorithm independently and simultaneously processable on any one of the plurality of processors in the multiprocessing machine to change a data record and (2) each unique plurality of user-defined algorithms when processed on financial transaction data changing the data records as necessary to show the financial status of the enterprise after processing a financial transaction having its associated user-defined financial transaction type and the financial transaction data;

receiving a first financial transaction having a first user-defined financial transaction type and first financial transaction data;

identifying a first unique plurality of user-defined algorithms associated with the first user-defined financial transaction type via the transaction processing table;

processing the first unique plurality of user-defined algorithms on the first financial transaction data thereby changing the user-defined data records in the set of user-definable financial reports to show the financial status of the enterprise after processing the first financial transaction, wherein the processing includes concurrently processing at least two of the unique plurality of user-defined algorithms;

receiving a second financial transaction having a second user-defined financial transaction type and second user defined data, the second user defined financial transaction type associated with a second unique plurality of user-defined algorithms; and wherein the processing includes processing all of the first unique plurality of user-defined algorithms prior to processing any of the second plurality of user-defined algorithms.

2. The method of claim 1, wherein each user-defined algorithm changes only one data record in only one user-defined financial report and includes an operator, a first operand that identifies input data from the financial transaction data, and a second operand that identifies the only one data record.

3. The method of claim 2, wherein each unique plurality of user-defined algorithms includes only one user-defined algorithm for each financial report that is changed by processing the unique plurality of user-defined algorithms.

4. The method of claim 1, wherein the processing further comprises:

queuing each of the first unique plurality of user-defined algorithms in a multiprocessor queue; and concurrently processing the first unique plurality of user-defined algorithms on different processors in the multiprocessing machine.

5. The method of claim 1 further comprising:

defining a set of control tables; and associating one or more user-defined control algorithms with each user-defined transaction type, each user-defined control algorithm when processed on financial transaction data updating one or more data records in one or more control tables.

6. A method for processing financial transactions for disparate applications, comprising:

providing a system that facilitates (1) user definability to satisfy customized needs of an enterprise or individual, (2) auditability to track all financial transactions from data inception to permanent archives, without substantial error, and (3) multi-processing of each individual transaction to expedite response times, said user definability consists essentially of steps (a)–(e):

(a) defining a set of driven tables comprising a set of first data records, wherein each of the first set of data records is used in one or more financial reports selected from a group consisting of balance sheets, income statements, cash flow statements, capital gains, pending income/expense, pending capital adjustments, general ledger, and transaction ledger;

(b) defining a set of second data records that provides verification of incoming data for the processing of accounts, financial entities, account structures, and any of said financial reports;

(c) defining a first driving table comprising a set of third data records, wherein each of the set of third data records is a disparate financial transaction used to update any one or more of said financial reports set forth in step (a), each said financial transaction having one entry in said first driving table which identifies a transaction name;

(d) defining a second driving table comprising a set of fourth data records, wherein each of the set of fourth data records identifies a disparate processing algorithm for each transaction in step (c), each of said algorithms containing one operator and first and second operands, said first operand identifying a specific input variable in said set of first data records and said second operand identifying a specific output value to be updated in one or more of the driven tables set forth in step (a);

(e) aggregating a set of incoming random disparate financial transactions into a single machine readable input table;

wherein said multi-processing consists essentially of:

(f) reading an input record for a first transaction from said input table, said input record containing at least three or more variables, two of said variables which comprise at least a licensee identifier and a transaction identifier and one or more remaining variables representing input values;

(g) matching said licensee identifier and said transaction identifier with a like licensee identifier and transaction identifier in said- first driving table, said first driving table containing a list of all financial transactions as set forth in step (c);

(h) matching said licensee identifier and said transaction identifier on said input record with a set of algorithms in said second driving table as set forth in step (d);

(i) queuing each of the set of algorithms matched in step (h) from said second driving table to be processed by a next available processor in a multi-processing machine to update one or more values in said driven table with a specific value identified in said input record;

(j) repeating step (i) until all of said algorithms for said first transaction are processed;

(k) repeating steps (f) through 6) until all of said input records are processed;

(l) adding subsequent first data records to said driven tables as set forth in step (a);

(m) adding subsequent third data records to said first driving table as set forth in step (c); and (n) adding subsequent fourth data records to said second driving table set forth in step (d).

7. The method as set forth in claim 6, further comprising:

(o) creating at least three control fields for every one of said second data records in at least three control tables;

(p) updating said control fields for a specific one of said second data records in each of said control tables with the values from each transaction; and (q) aggregating said control fields in all of said second data records in said control tables.

8. The method as set forth in claim 6, wherein at least some of said first data records are transferred from a first set of tables to a second set of tables, wherein data records in said second set of tables cannot be changed.

9. The method as set forth in claim 6, wherein said first data records comprise a data field selected from a group consisting of:

(1) Insert Date;

(2) Insert Sequence Number;

(3) Insert User Identifier;

(4) Insert-Update Date;

(5) Update Sequence Number;

(6) Update User Identifier;

(7) Delete Date;

(8) Delete Sequence Numbers;

(9) Delete User Identifier; and

(10) Number of Times Updated.

10. The method as set forth in claim 6, further comprising reversing one of the first transactions processed as set forth in step (k).

11. The method as set forth in claim 6, wherein said set of algorithms are processed on separate processors.

12. The method as set forth in claim 6, wherein said multi-processing comprises concurrent processing of at least two of said algorithms.

13. The method as set forth in claim 6, wherein said multi-processing is performed on a multi-processing machine.

* * * * *